United States Patent
Choi et al.

(10) Patent No.: US 11,387,575 B2
(45) Date of Patent: Jul. 12, 2022

(54) ELECTRONIC DEVICE HAVING ANTENNAS

(71) Applicant: LG ELECTRONICS INC., Seoul (KR)

(72) Inventors: Deuksu Choi, Seoul (KR); Moonsoo Song, Seoul (KR); Kyoungsun Hwang, Seoul (KR); Yoonjae Won, Seoul (KR); Chisang You, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 109 days.

(21) Appl. No.: 17/033,631

(22) Filed: Sep. 25, 2020

(65) Prior Publication Data

US 2021/0336356 A1 Oct. 28, 2021

(30) Foreign Application Priority Data

Apr. 23, 2020 (WO) ................ PCT/KR2020/005340

(51) Int. Cl.
*H01Q 1/24* (2006.01)
*H04M 1/02* (2006.01)
(Continued)

(52) U.S. Cl.
CPC .......... *H01Q 21/28* (2013.01); *G06F 1/1652* (2013.01); *H01Q 1/243* (2013.01); *H01Q 5/328* (2015.01);
(Continued)

(58) Field of Classification Search
CPC ........ H01Q 21/28; H01Q 1/243; H01Q 5/328; H01Q 9/42; G06F 1/1652; G06F 1/1698;
(Continued)

(56) References Cited

U.S. PATENT DOCUMENTS 10,938,970 B1 * 3/2021 Lee ...................... H04M 1/0237
10,955,876 B1 * 3/2021 Song ...................... G06F 1/1656
(Continued)

FOREIGN PATENT DOCUMENTS

KR 1020170056292 5/2017
KR 1020170073964 6/2017
(Continued)

OTHER PUBLICATIONS

An Optically Invisible Antenna-on-Display (AoD) Concept for Millimeter-wave 5G Cellular Devices. Junho Park et al. (Year: 2018).*
(Continued)

*Primary Examiner* — Vibol Tan
(74) *Attorney, Agent, or Firm* — Lee Hong Degerman Kang & Waimey

(57) ABSTRACT

An electronic device according to one implementation includes a flexible display having a first region coupled to a front surface of a first frame, a second region coupled to a third frame, and a third region located between the first region and the second region, and an antenna implemented as one of a plurality of metal rims formed on one of the first frame and the third frame, and connected to a feeding unit at one point and a ground at another point through a switching unit to radiate signals through different bands.

20 Claims, 37 Drawing Sheets

(a)

(b)

(51) Int. Cl.
*G06F 1/16* (2006.01)
*H01Q 21/28* (2006.01)
*H01Q 5/328* (2015.01)

(52) U.S. Cl.
CPC ....... *H04M 1/0237* (2013.01); *H04M 1/0247* (2013.01); *H04M 1/0268* (2013.01)

(58) Field of Classification Search
CPC ............. H04M 1/0237; H04M 1/0247; H04M 1/0268; H04M 1/026
See application file for complete search history.

(56) References Cited

U.S. PATENT DOCUMENTS

| | | | | |
|---|---|---|---|---|
| 11,003,219 B1* | 5/2021 | Kim | .................. | G06F 1/1624 |
| 11,012,546 B1* | 5/2021 | Song | .................. | H04M 1/0237 |
| 11,025,761 B1* | 6/2021 | Shim | .................. | H04M 1/0202 |
| 11,050,866 B1* | 6/2021 | Choi | .................. | H04M 1/0268 |
| 11,057,514 B1* | 7/2021 | Noh | .................. | G06F 3/0488 |
| 11,226,655 B2* | 1/2022 | Shim | .................. | G06F 1/1643 |
| 11,228,093 B2* | 1/2022 | Won | .................. | H01Q 21/28 |
| 11,243,577 B2* | 2/2022 | Kim | .................. | G06F 1/1652 |
| 11,245,781 B2* | 2/2022 | Song | .................. | H04M 1/0237 |
| 2018/0358699 A1 | 12/2018 | Li et al. | | |

FOREIGN PATENT DOCUMENTS

| | | |
|---|---|---|
| KR | 1020180014630 | 2/2018 |
| KR | 1020190143029 | 12/2019 |

OTHER PUBLICATIONS

Antenna-on-Display (AoD) for Millimeter-wave 5G Mobile Devices. IEEE2019—Junho Park et al. (Year: 2019).*

Patent Cooperation Treaty PCT Statement of Opinion of the International Searching Authority. (PCT/KR2020/0053340—English Machine Translation). (Year: 2020).*

PCT International Application No. PCT/KR2020/005340, International Search Report dated Jan. 19, 2021, 11 pages.

* cited by examiner (a)

| SUBCARRIER SPACING: $f_o \times 2^\mu$, $f_o = 15$kMz AND SCALING VALUE $2^\mu \in \{-2, 0, 1, 2,..., 5\}$ ||||||||
|---|---|---|---|---|---|---|---|
| $\mu$ | -2 | 0 | 1 | 2 | 3 | 4 | 5 |
| SUBCARRIER SPACING [kHz] | 3.75 | 15 | 30 | 60 | 120 | 240 | 480 |
| LENGTH OF OFDM SYMBOL [$\mu s$] | 266.67 | 66.67 | 33.33 | 16.67 | 8.333 | 4.17 | 2.08 |

15kHz 1 SLOT(14 SYMBOLS) : 1ms SUBFRAME

| 0 | 1 | 2 | 3 | 4 | 5 | 6 | 7 | 8 | 9 | 10 | 11 | 12 | 13 |

| 0 | 1 | 2 | 3 | 4 | 5 | 6 | 7 | 8 | 9 | 10 | 11 | 12 | 13 | 30kHz 1 SLOT(14 SYMBOLS) : 0.5ms

| 0 | 1 | 15kHz 1 SLOT(2 SYMBOLS) : 0.2ms

| 0 | 1 | 2 | 3 | 30kHz MINI SLOT(4 SYMBOLS) : 0.2ms

| 0 | 1 | 2 | 3 | 4 | 5 | 6 | 60kHz MINI SLOT(7 SYMBOLS) : 0.125ms

FIG. 16

LTE (4G) + NR FR 1 (5G) EN-DC SCENARIO

| LTE Tx. | LTE Rx. MIMO | NR Tx. | NR Rx. MIMO |
|---|---|---|---|
| O | 2x2 or 4x4 | O | 4x4 MIMO |

(a)

| BAND | Tx. | Rx. |
|---|---|---|
| B5/N5 | 824~849 | 869~894 |
| B66/N66 | 1710~1780 | 2110~2200 |
| B2/N2 | 1850~1910 | 1930~1990 |
| B41/N41 | 2496~2690 | |
| N78 | 3300~3800 | |

(b)

ELECTRONIC DEVICE HAVING ANTENNAS

CROSS-REFERENCE TO RELATED APPLICATIONS

Pursuant to 35 U.S.C. § 119, this application claims the benefit of earlier filing date and right of priority to International Application No. PCT/KR2020/005340, filed on Apr. 23, 2020, the contents of which are all hereby incorporated by reference herein in its entirety.

BACKGROUND

1. Technical Field

The present disclosure relates to an electronic device having antennas. One particular implementation relates to an antenna arrangement in an electronic device with a rollable or foldable device.

2. Description of the Related Art

Electronic devices may be divided into mobile/portable terminals and stationary terminals according to mobility. Also, the electronic device may be classified into handheld types and vehicle mount types according to whether or not a user can directly carry.

Functions of electronic devices are diversified. Examples of such functions include data and voice communications, capturing images and video via a camera, recording audio, playing music files via a speaker system, and displaying images and video on a display. Some electronic devices include an additional functionality which supports electronic game playing or perform multimedia player functions. Specifically, in recent time, mobile terminals may receive broadcast and multicast signals to allow viewing of video or television programs.

As it becomes multifunctional, an electronic device can be allowed to capture still images or moving images, play music or video files, play games, receive broadcast and the like, so as to be implemented as an integrated multimedia player.

Efforts are ongoing to support and increase the functionality of electronic devices. Such efforts include software and hardware improvements, as well as changes and improvements in the structural components.

In addition to those attempts, the electronic devices provide various services in recent years by virtue of commercialization of wireless communication systems using an LTE communication technology. In the future, it is expected that a wireless communication system using a 5G communication technology will be commercialized to provide various services. Meanwhile, some of LTE frequency bands may be allocated to provide 5G communication services.

In this regard, the electronic device may be configured to provide 5G communication services in various frequency bands. Recently, attempts have been made to provide 5G communication services using a Sub-6 band below a 6 GHz band. In the future, it is also expected to provide 5G communication services by using a millimeter wave (mm-Wave) band in addition to the Sub-6 band for faster data rate.

Recently, flexible displays which are largely deformable by virtue of sufficient elasticity have been developed. The flexible display may be deformed to a degree that it can be rolled. A mobile terminal accommodates the rolled flexible display and allows the display to protrude to outside of a body by a desired size. Accordingly, the electronic device may have a more compact structure by using such a flexible display. In addition, by including such a rollable display, the mobile terminal can be called a rollable electronic device.

To use such a rollable electronic device, the display can be drawn out of the body, and simultaneously be expanded to a size desired by a user. However, the display may be expanded in various directions by the user, and a relative orientation or arrangement of the display with respect to the user may also vary depending on an expanded direction. Therefore, in order to show an intended content or screen to the user well, the mobile terminal needs to orient the content or screen on the display in consideration of the changing display or the relative orientation of the user. Furthermore, the mobile terminal also needs to adjust the oriented content in consideration of an expanded direction and orientation.

Meanwhile, such a rollable electronic device may also provide 5G communication services. An antenna operating in a 5G Sub-6 band may be provided in the form of a metal rim on a side surface of the rollable device. However, when existing LTE antennas and some 5G antennas are already provided in the form of metal rims on side surfaces of the electronic device, a space limitation problem may occur for some of the antennas operating in the Sub-6 band.

Also, if a plurality of antennas is arranged in a rollable electronic device, antenna characteristics may change as a slide is opened and closed.

SUMMARY

The present disclosure is directed to solving the aforementioned problems and other drawbacks. Another aspect of the present disclosure is to provide an electronic device having a plurality of antennas, which can be implemented as a metal frame of the electronic device.

Another aspect of the present disclosure is to provide an antenna structure capable of securing characteristics of antennas disposed in a rollable device.

Another aspect of the present disclosure is to provide an antenna structure capable of maintaining antenna performance when a display region of a rollable device is expanded and reduced.

Another aspect of the present disclosure is to provide an antenna structure capable of securing antenna performance in a display structure with a minimized bezel region in a rollable device.

Another aspect of the present disclosure is to reduce antenna characteristic deviation caused as a slide is opened and closed in case where a plurality of antennas is arranged in a rollable device.

An electronic device according to one implementation may include a flexible display having a first region coupled to a front surface of a first frame, a second region coupled to a third frame, and a third region located between the first region and the second region, and an antenna implemented as one of a plurality of metal rims formed on one of the first frame and the third frame, and connected to a feeding unit at one point and connected to a ground through a switching unit at another point to radiate signals through different bands.

According to one implementation, one of the first frame and the third frame may be configured as a metal frame formed on a side surface of the electronic device and having a plurality of metal rims.

According to one implementation, the antenna may be disposed on a lower region of the electronic device. The electronic device may further include a first antenna disposed on the lower region and one side region thereof. The first antenna may be configured to operate in a first band of a fourth generation (4G) communication system, and the antenna may be configured to operate in a second band higher than the first band and a third band higher than the second band.

According to one implementation, the antenna may be configured such that one end portion and another end portion of a conductive member, as one of the plurality of metal rims, are connected to the ground. The one end portion of the conductive member may be connected to the ground through the switching unit.

According to one implementation, the antenna may be configured to operate in the first to third bands and a Sub-6 band of a fifth generation (5G) communication system by way of switching output terminals of the switching unit.

According to one implementation, the antenna may include the conductive member, and a metal pattern formed on a circuit board to extend from the feeding unit by a predetermined length at one point of the conductive member. The one point of the metal pattern may be connected to a ground of the circuit board.

According to one implementation, the switching unit may be configured as an SP4T switch having first to fourth output terminals. The electronic device may further include a transceiver circuit operably coupled to the antenna and configured to control the switching unit.

According to one implementation, the transceiver circuit may be configured to control the switching unit to connect the first output terminal to the ground through a first impedance matching circuit, such that the antenna operates in the Sub-6 band. The transceiver circuit may control the switching unit to connect the second to fourth output terminals to the ground through second to fourth impedance matching circuits, respectively, such that the antenna operates in different bands.

According to one implementation, the transceiver circuit may be configured to control the switching unit to connect the second output terminal to the ground through the second impedance matching circuit, such that the antenna operates in a first sub-band within the second band. The transceiver circuit may control the switching unit to connect the third output terminal to the ground through the third impedance matching circuit, such that the antenna operates in a second sub-band within the second band. The second sub-band may be a frequency band higher than the first sub-band.

According to one implementation, the transceiver circuit may be configured to control the switching unit to connect the fourth output terminal to the ground through the fourth impedance matching circuit, such that the antenna operates in the third band.

According to one implementation, the antenna may be a second antenna spaced apart from one end portion of the first antenna, and disposed on the lower region. The electronic device may further include a third antenna spaced apart from another end portion of the first antenna and disposed on the one side region. The electronic device may further include a processor operably coupled to the transceiver circuit and configured to perform an EN-DC operation through the first to third antennas.

According to one implementation, the electronic device may further include a fourth antenna spaced apart from one end portion of the second conductive member adjacent to the third antenna and disposed on the one side region. The processor may control the transceiver circuit to perform Multiple-Input and Multiple-Output (MIMO) and Carrier Aggregation (CA) through the first to fourth antennas.

According to one implementation, the electronic device may further include a fifth antenna spaced apart from one end portion of the fourth antenna and disposed on the one side region and an upper region of the electronic device, and a sixth antenna spaced apart from one end portion of the fifth antenna and disposed on the upper region. The processor may control the transceiver circuit to perform diversity in a Long-Term Evolution (LTE) communication system through the fifth and sixth antennas.

According to one implementation, the electronic device may further include a seventh antenna configured to operate in the 4G communication system through a first feeding unit connected to one point of a second conductive member spaced apart from the one end portion of the fourth antenna, and an eighth antenna configured to operate in the 5G communication system through a second feeding unit connected to another point of the second conductive member. The seventh antenna and the eighth antenna may share the second conductive member as the same radiator.

According to one implementation, the third region of the flexible display located in a first direction of the first region may be widened in area and the display may be switched from a first state into a second state, in case where the second frame moves relative to the first frame in the first direction. The antenna may be disposed on a fixed portion of the electronic device corresponding to the rollable device. A driving unit that allows a display region of the rollable device to be switched between the first state and the second state may be disposed on another side region of the rollable device.

According to one implementation, the processor may control the transceiver circuit such that one of the first to fourth output terminals of the switching unit is connected to the ground in case where the display region of the rollable device is switched from the first state into the second state.

According to one implementation, the processor may determine a resource region allocated through a Physical Downlink Control Channel (PDCCH). the processor may control the transceiver circuit such that the first output terminal of the switching unit is connected to the ground through the first impedance matching circuit in case where resources of a 5G Sub-6 band have been allocated.

According to one implementation, the processor may control the transceiver circuit such that one of the second to fourth output terminals of the switching unit is connected to the ground through one of the second to fourth impedance matching circuits according to a frequency band of allocated resources in case where the resources of a 4G LTE band have been allocated.

According to one implementation, the processor may control the transceiver circuit such that the first to fourth output terminals of the switching unit are open with respect to the ground in case where the display region of the rollable device is switched from the second state into the first state.

According to one implementation, a Radio Frequency (RF) transmission line of the circuit board may be connected to the conductive member through a feeding clip. A ground pad of the circuit board configured to be connected to the output terminals of the switching unit may be connected to a cover frame through a contact clip.

According to one implementation, a metal pattern may be formed on the circuit board so that the antenna operates in the 5G Sub-6 band. The antenna may operate in the Sub-6 band when one point of the metal pattern is electrically connected to the first output terminal of the switching unit and the first output terminal of the switching unit is connected to the ground through the first impedance matching circuit.

According to the present disclosure, various communication systems can be supported by providing a plurality of antennas, which can be implemented as a metal frame of an electronic device.

According to the present disclosure, an antenna structure capable of securing characteristics of antennas disposed in a rollable device can be provided, thereby minimizing interference among the plurality of antennas while optimizing performance of the plurality of antennas.

According to the present disclosure, an antenna structure capable of maintaining antenna performance in a rollable device can be provided, thereby maintaining stable communication performance even when a display region is expanded or reduced.

According to the present disclosure, an antenna structure capable of securing antenna performance in a display structure with a minimized bezel region in a rollable device can be provided, thereby minimizing an antenna arrangement space.

According to the present disclosure, antenna performance can be improved without changing a mechanical structure and design factors of an electronic device such as a rollable device.

According to the present disclosure, antenna characteristic deviation can be reduced by dynamically changing an antenna configuration through a switching unit as a slide is opened and closed in case where a plurality of antennas is arranged in a rollable device.

According to the present disclosure, antenna characteristics can be optimized for each band by dynamically changing an antenna configuration through a switching unit as a slide is opened and closed in case where a plurality of antennas is arranged in a rollable device.

According to the present disclosure, E-UTRAN NR Dual Connectivity (EN-DC), Carrier Aggregation (CA), and Multiple-Input and Multi-Output (MIMO) can be supported in a rollable device without changing a mechanical structure and a design shape.

Further scope of applicability of the present disclosure will become apparent from the detailed description given hereinafter. It should be understood, however, that the detailed description and specific examples, such as the preferred implementation of the invention, are given by way of illustration only, since various changes and modifications within the spirit and scope of the invention will be apparent to those skilled in the art.

BRIEF DESCRIPTION OF THE DRAWINGS

FIG. 6B is a view illustrating a change in a slot length in accordance with a change in a subcarrier spacing in the NR.

FIG. 16 is a view illustrating a possible MIMO configuration during an EN-DC operation in LTE and NR communication systems, and a transmission and reception frequency bands for each band of the LTE and NR communication systems.

DETAILED DESCRIPTION OF THE IMPLEMENTATIONS

Figure 1A:
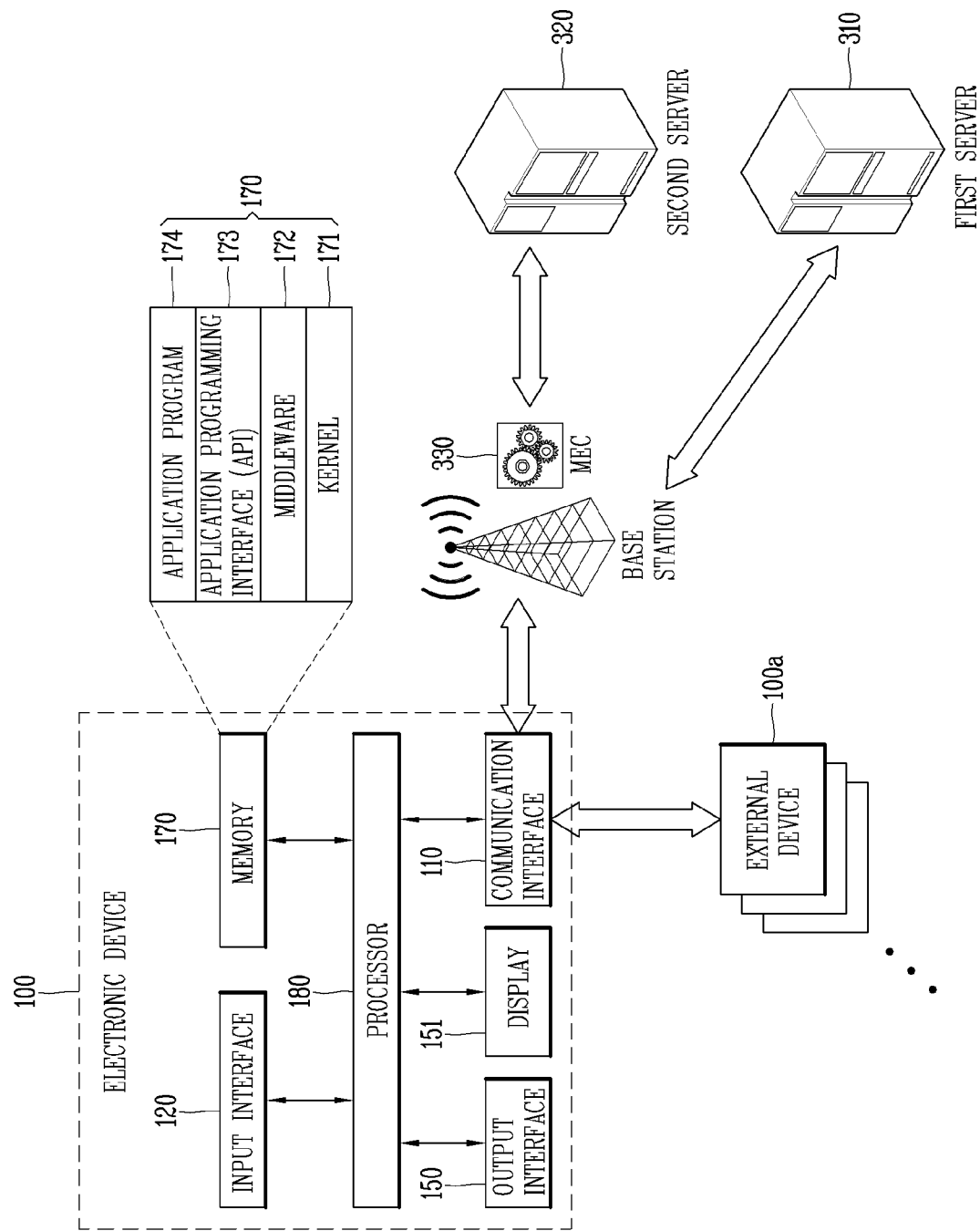
FIG. 1A is a view illustrating a configuration for describing an electronic device in accordance with one implementation, and an interface between the electronic device and an external device or server.

Description will now be given in detail according to exemplary implementations disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, laptop computers, personal digital assistants (PDAs), portable multimedia players (PMPs), navigators, slate PCs, tablet PCs, ultra books, wearable devices (for example, smart watches, smart glasses, head mounted displays (HMDs)), and the like.

However, it may be easily understood by those skilled in the art that the configuration according to the exemplary implementations of this specification can also be applied to stationary terminals such as digital TV, desktop computers, digital signages, and the like, excluding a case of being applicable only to the mobile terminals.

Referring to FIGS. 1A to 10, FIG. 1A is a view illustrating a configuration for describing an electronic device in accordance with one implementation, and an interface between the electronic device and an external device or server. FIG. 1B is a view illustrating a detailed configuration in which the electronic device according to the one implementation is interfaced with an external device or a server. FIG. 10 is a view illustrating a configuration in which the electronic device according to the one implementation is interfaced with a plurality of base stations or network entities.

Figure 2A:
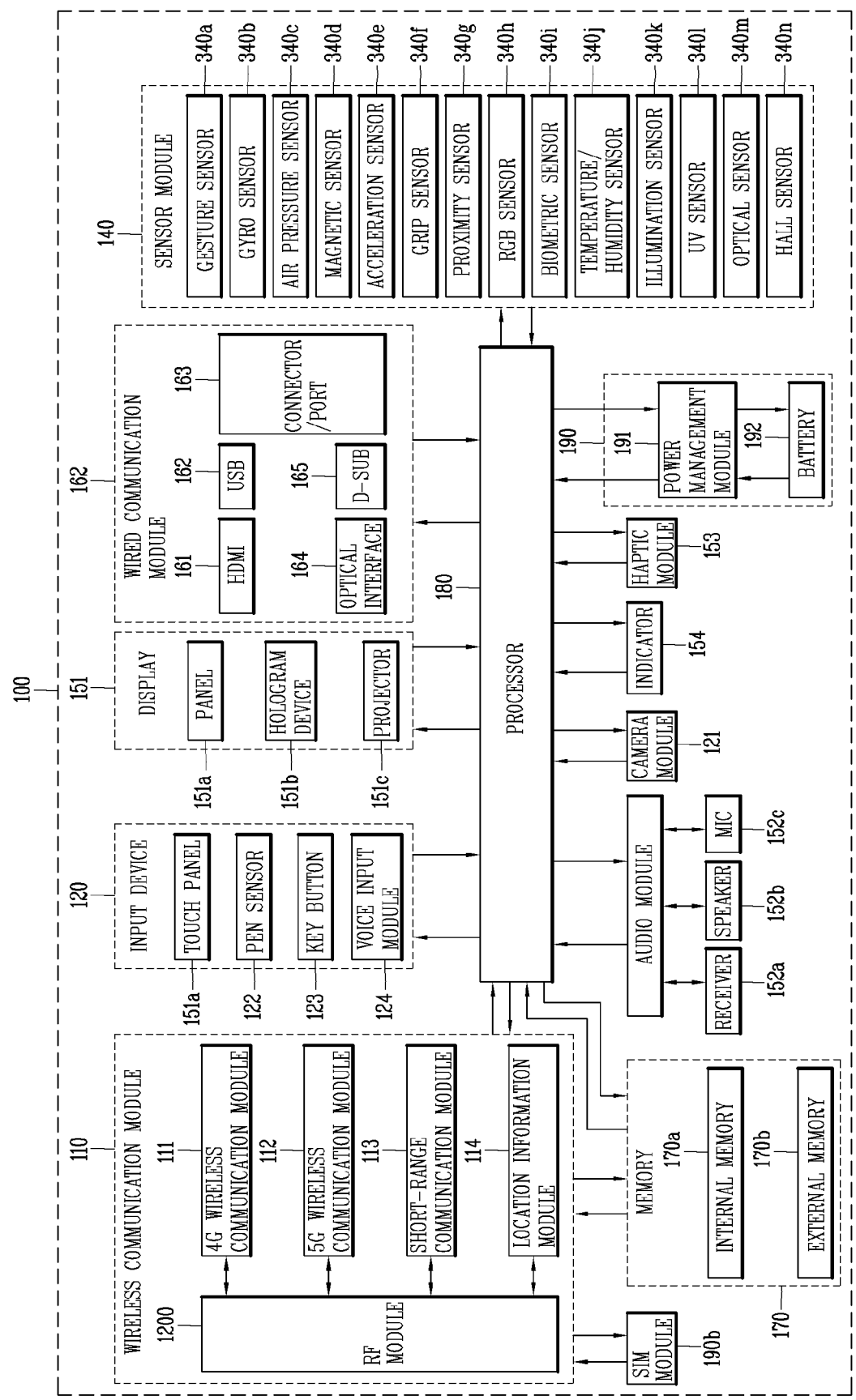
FIG. 2A is a view illustrating a detailed configuration of the electronic device of FIG. 1A.
Figure 2B:
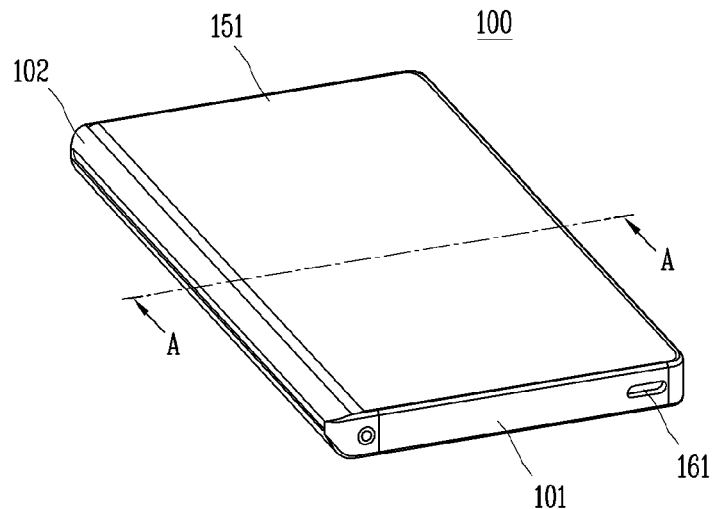
FIG. 2B is a perspective view of a roll-slide electronic device in accordance with one implementation.

Meanwhile, referring to FIGS. 2A and 2B, FIG. 2A is a view illustrating a detailed configuration of the electronic device of FIG. 1A. On the other hand, FIG. 2B is a perspective view illustrating a first state and a second state of a roll-slide electronic device according to the present disclosure, viewed from one side surface.

Referring to FIG. 1A, the electronic device 100 is configured to include a communication interface 110, an input interface (or input device) 120, an output interface (or output device) 150, and a processor 180. Here, the communication interface 110 may refer to a wireless communication module 110. Also, the electronic device 100 may be configured to further include a display 151 and a memory 170. It is understood that implementing all of the illustrated components is not a requirement. Greater or fewer components may alternatively be implemented.

In more detail, among others, the wireless communication module 110 may typically include one or more modules which permit communications such as wireless communications between the electronic device 100 and a wireless communication system, communications between the electronic device 100 and another electronic device, or communications between the electronic device 100 and an external server. Further, the wireless communication module 110 may typically include one or more modules which connect the electronic device 100 to one or more networks. Here, the one or more networks may be a 4G communication network and a 5G communication network, for example.

Referring to FIGS. 1A and 2A, the wireless communication module 110 may include at least one of a 4G wireless communication module 111, a 5G wireless communication module 112, a short-range communication module 113, and a location information module 114. With regard to this, the 4G wireless communication module 111, the 5G wireless communication module 112, the short-range communication module 113, and the location information module 114 may be implemented as a baseband processor such as a modem. As one example, the 4G wireless communication module 111, the 5G wireless communication module 112, the short-range communication module 113, and the location information module 114 may be implemented as a transceiver circuit operating in an IF frequency band and a base processor. Meanwhile, the RF module 1200 may be implemented as an RF transceiver circuit operating in an RF frequency band of each communication system. However, the present disclosure is not limited thereto, and the 4G wireless communication module 111, the 5G wireless communication module 112, the short-range communication module 113, and the location information module 114 may be interpreted to include RF modules, respectively.

The 4G wireless communication module 111 may perform transmission and reception of 4G signals with a 4G base station through a 4G mobile communication network. In this case, the 4G wireless communication module 111 may transmit at least one 4G transmission signal to the 4G base station. In addition, the 4G wireless communication module 111 may receive at least one 4G reception signal from the 4G base station. In this regard, Uplink (UL) multi-input multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 112 may perform transmission and reception of 5G signals with a 5G base station through a 5G mobile communication network. Here, the 4G base station and the 5G base station may have a Non-Stand-Alone (NSA) structure. For example, the 4G base station and the 5G base station may be a co-located structure in which the stations are disposed at the same location in a cell. Alternatively, the 5G base station may be disposed in a Stand-Alone (SA) structure at a separate location from the 4G base station.

The 5G wireless communication module 112 may perform transmission and reception of 5G signals with a 5G base station through a 5G mobile communication network. In this case, the 5G wireless communication module 112 may transmit at least one 5G transmission signal to the 5G base station. In addition, the 5G wireless communication module 112 may receive at least one 5G reception signal from the 5G base station.

In this instance, 5G and 4G networks may use the same frequency band, and this may be referred to as LTE re-farming. Meanwhile, a Sub-6 frequency band, which is a range of 6 GHz or less, may be used as the 5G frequency band.

On the other hand, a millimeter wave (mmWave) range may be used as the 5G frequency band to perform broadband high-speed communication. When the mmWave band is used, the electronic device 100 may perform beam forming for communication coverage expansion with a base station.

On the other hand, regardless of the 5G frequency band, 5G communication systems can support a larger number of multi-input multi-output (MIMO) to improve a transmission rate. In this regard, uplink by a plurality of 5G transmission signals transmitted to the 5G base station (UL: Up-Link) MIMO can be performed. In addition, downlink (DL:) by a plurality of 5G received signals received from the 5G base station Down-Link) MIMO can be performed.

On the other hand, the wireless communication module 110 may be in a Dual Connectivity (DC) state with the 4G base station and the 5G base station through the 4G wireless communication module 111 and the 5G wireless communication module 112. As such, the dual connectivity with the 4G base station and the 5G base station may be referred to as EUTRAN NR DC (EN-DC). Here, EUTRAN is an abbreviated form of "Evolved Universal Telecommunication Radio Access Network", and refers to a 4G wireless communication system. Also, NR is an abbreviated form of "New Radio" and refers to a 5G wireless communication system.

On the other hand, if the 4G base station and 5G base station are disposed in a co-located structure, throughput improvement is achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 111 and the 5G wireless communication module 112.

The short-range communication module 113 is configured to facilitate short-range communications. Suitable technologies for implementing such short-range communications include Bluetooth, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the electronic device 100 and a wireless communication system, communications between the electronic device 100 and another electronic device, or communications between the electronic device and a network where another electronic device (or an external server) is located, via wireless area networks. One example of the wireless area networks is a wireless personal area network.

Meanwhile, short-range communication between electronic devices may be performed using the 4G wireless communication module 111 and the 5G wireless communication module 112. In one implementation, short-range communication may be performed between electronic devices in a device-to-device (D2D) manner without passing through base stations.

Meanwhile, for transmission rate improvement and communication system convergence, Carrier Aggregation (CA) may be carried out using at least one of the 4G wireless communication module 111 and the 5G wireless communication module 112 and the WiFi communication module 113. In this regard, 4G+WiFi CA may be performed using the 4G wireless communication module 111 and the Wi-Fi communication module 113. Or, 5G+WiFi CA may be performed using the 5G wireless communication module 112 and the WiFi communication module 113.

The location information module 114 is generally configured to detect, calculate, derive or otherwise identify a position (or current position) of the electronic device. As an example, the location information module 115 includes a Global Position System (GPS) module, a Wi-Fi module, or both. For example, when the electronic device uses a GPS module, a position of the electronic device may be acquired using a signal sent from a GPS satellite. As another example, when the electronic device uses the Wi-Fi module, a position of the electronic device can be acquired based on information related to a wireless access point (AP) which transmits or receives a wireless signal to or from the Wi-Fi module. If desired, the location information module 114 may alternatively or additionally function with any of the other modules of the wireless communication module 110 to obtain data related to the position of the electronic device. The location information module 114 is a module used for acquiring the position (or the current position) of the electronic device and may not be limited to a module for directly calculating or acquiring the position of the electronic device.

Specifically, when the electronic device utilizes the 5G wireless communication module 112, the position of the electronic device may be acquired based on information related to the 5G base station which performs radio signal transmission or reception with the 5G wireless communication module. In particular, since the 5G base station of the mmWave band is deployed in a small cell having a narrow coverage, it is advantageous to acquire the position of the electronic device.

The input device 120 may include a pen sensor 1200, a key button 123, a voice input module 124, a touch panel 151a, and the like. On the other hand, the input device 120 may include a camera module 121 for inputting an image signal, a microphone 152c or an audio input module for inputting an audio signal, or a user input unit 123 (e.g., a touch key, a push key (or a mechanical key), etc.) for allowing a user to input information. Data (for example, audio, video, image, and the like) may be obtained by the input device 120 and may be analyzed and processed according to user commands.

The camera module 121 is a device capable of capturing still images and moving images. According to one implementation, the camera module 121 may include one or more image sensors (e.g., a front sensor or a rear sensor), a lens, an image signal processor (ISP), or a flash (e.g., LED or lamp).

The sensor module 140 may typically be implemented using one or more sensors configured to sense internal information of the electronic device, the surrounding environment of the electronic device, user information, and the like. For example, the sensor module 140 includes at least one of a gesture sensor 340a, a gyro sensor 340b, an air pressure sensor 340c, a magnetic sensor 340d, an acceleration sensor 340e, a grip sensor 340f, and a proximity sensor 340g, a color sensor 340h (e.g. RGB (red, green, blue) sensor), a bio-sensor 340i, a temperature/humidity sensor 340j, an illuminance sensor 340k, an ultra violet (UV) sensor 340l, a light sensor 340m, and a hall sensor 340n. The sensor module 140 may also include at least one of a finger scan sensor, an ultrasonic sensor, an optical sensor (for example, camera 121), a microphone (see 152c), a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The electronic device disclosed herein may be configured to utilize information obtained from one or more sensors, and combinations thereof.

The output interface 150 may typically be configured to output various types of information, such as audio, video, tactile output, and the like. The output interface 150 may be shown having at least one of a display 151, an audio output module 152, a haptic module 153, and an indicator 154.

With regard to this, the display 151 may have an interlayered structure or an integrated structure with a touch sensor in order to implement a touch screen. The touch screen may function as the user input unit 123 which provides an input interface between the electronic device 100 and the user and simultaneously provide an output interface between the electronic device 100 and a user. For example, the display 151 may be a liquid crystal display (LCD), a light emitting diode (LED) display, an organic light emitting diode (OLED) display, a microelectromechanical electromechanical systems (MEMS) display, or an electronic paper display. For example, the display 151 may display various contents (e.g., text, images, videos, icons, and/or symbols, etc.). The display 151 may include a touch screen, and may receive a touch, gesture, proximity, or hovering input using, for example, an electronic pen or a part of a user's body.

Meanwhile, the display 151 may include a touch panel 151a, a hologram device 151b, and a projector 151c and/or a control circuit for controlling them. In this regard, the panel may be implemented to be flexible, transparent, or wearable. The panel may include a touch panel 151a and one or more modules. The hologram device 151b may show a stereoscopic image in the air by using interference of light. The projector 151c may display an image by projecting light on a screen. The screen may be located, for example, inside or outside the electronic device 100.

The audio module 152 may be configured to interwork with the receiver 152a, the speaker 152b, and the microphone 152c. Meanwhile, the haptic module 153 may convert an electrical signal into a mechanical vibration, and generate a vibration or a haptic effect (e.g., pressure, texture). The electronic device may include a mobile TV supporting device (e.g., a GPU) that may process media data as per, e.g., digital multimedia broadcasting (DMB), digital video broadcasting (DVB), or mediaFlo™ standards. The indicator 154 may indicate a particular state of the electronic device 100 or a part (e.g., the processor 310) of the electronic device, including, e.g., a booting state, a message state, or a recharging state.

The wired communication module 160 which may be implemented as an interface unit serves as a passage with various types of external devices connected to the electronic device 100. The wired communication module 160 may include an HDMI 162, a USB 162, a connector/port 163, an optical interface 164, or a D-sub (D-subminiature) 165. Also, the wired communication module 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the electronic device 100 may perform assorted control functions associated with a connected external device, in response to the external device being connected to the wired communication module 160.

The memory 170 is typically implemented to store data to support various functions or features of the electronic device 100. The memory 170 may be configured to store application programs executed in the electronic device 100, data or instructions for operations of the electronic device 100, and the like. At least some of these application programs may be downloaded from an external server (e.g., a first server 310 or a second server 320) through wireless communication. Other application programs may be installed within the electronic device 100 at the time of manufacturing or shipping, which is typically the case for basic functions of the electronic device 100 (for example, receiving a call, placing a call, receiving a message, sending a message, and the like). It is common for application programs to be stored in the memory 170, installed in the electronic device 100, and executed by the controller 180 to perform an operation (or function) for the electronic device 100.

In this regard, the first server 310 may be referred to as an authentication server, and the second server 320 may be referred to as a content server. The first server 310 and/or the second server 320 may be interfaced with the electronic device through a base station. Meanwhile, a part of the second server 320 corresponding to the content server may be implemented as a mobile edge cloud (MEC) 330 in a base station unit. Accordingly, a distributed network may be implemented through the second server 320 implemented as the mobile edge cloud (MEC) 330, and content transmission delay may be shortened.

The memory 170 may include a volatile and/or nonvolatile memory. Also, the memory 170 may include an internal memory 170a and an external memory 170b. The memory 170 may store, for example, commands or data related to at least one of other components of the electronic device 100. According to one implementation, the memory 170 may store software and/or a program 240. For example, the program 240 may include a kernel 171, middleware 172, an application programming interface (API) 173, an application program (or "application") 174, or the like. At least one of the kernel 171, the middleware 172, or the API 174 may be referred to as an operating system (OS).

The kernel 171 may be used with other programs (e.g., system resources used to execute an operation or function implemented in the middleware 172, an application programming interface (API) 173, or the application program 174 (e.g., the bus, the memory 170, or the processor 180, etc.) can be controlled or managed. In addition, the kernel 171 may provide an interface to control or manage system resources by accessing individual components of the electronic device 100 in the middleware 172, the API 173, or the application program 174.

The middleware 172 may function as an intermediary so that the API 173 or the application program 174 communicates with the kernel 171 to exchange data. Also, the middleware 172 may process one or more task requests received from the application program 247 according to priorities. In one implementation, the middleware 172 may give at least one of the application programs 174 a priority to use the system resources (e.g., the bus, the memory 170, or the processor 180) of the electronic device 100, and process one or more task requests. The API 173 is an interface for the application program 174 to control functions provided by the kernel 171 or the middleware 1723, for example, at least one for file control, window control, image processing, or text control. Interface or function (for example, command).

The processor 180 typically functions to control an overall operation of the electronic device 100, in addition to the operations associated with the application programs. The processor 180 may provide or process information or functions appropriate for a user by processing signals, data, information and the like, which are input or output by the foregoing components, or executing application programs stored in the memory 170. Furthermore, the processor 180 may control at least part of the components illustrated in FIGS. 1A and 2A, in order to execute the application programs stored in the memory 170. In addition, the processor 180 may control a combination of at least two of those components included in the electronic device 100 to activate the application program.

The processor 180 may include one or more of a central processing unit (CPU), an application processor (AP), an image signal processor (ISP), a communication processor (CP), and a low power processor (e.g., sensor hub). For example, the processor 180 may execute a control of at least one of other components and/or an operation or data processing related to communication.

The power supply unit 190 may be configured to receive external power or provide internal power in order to supply appropriate power required for operating elements and components included in the electronic device 100. The power supply unit 190 may include a power management module 191 and a battery 192, and the battery 192 may be an embedded battery or a replaceable battery. The power management module 191 may include a power management integrated circuit (PMIC), a charging IC, or a battery or fuel gauge. The PMIC may have a wired and/or wireless recharging scheme. The wireless charging scheme may include, e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 396, and a voltage, a current, or a temperature while the battery 396 is being charged. The battery 396 may include, e.g., a rechargeable battery or a solar battery.

Each of the external device 100a, the first server 310, and the second server 320 may be the same or different type of device (e.g., external device or server) as or from the electronic device 100. According to an embodiment, all or some of operations executed on the electronic device 100 may be executed on another or multiple other electronic devices (e.g., the external device 100a, the first server 310 and the second server 320). According to an embodiment, when the electronic device 100 should perform a specific function or service automatically or at a request, the electronic device 100, instead of executing the function or service on its own or additionally, may request another device (e.g., the external device 100a, the first server 310, and the second server 320) to perform at least some functions associated therewith. The another electronic device (e.g., the external device 100a, the first server 310, and the second server 320) may execute the requested function or additional function and transfer a result of the execution to the electronic device 100. The electronic device 100 may provide the requested function or service by processing the received result as it is or additionally. To that end, a cloud computing, distributed computing, client-server computing, or mobile-edge cloud (MEC) technology may be used, for example.

At least part of the components may cooperatively operate to implement an operation, a control or a control method of an electronic device according to various implementations disclosed herein. Also, the operation, the control or the control method of the electronic device may be implemented on the electronic device by an activation of at least one application program stored in the memory 170.

Figure 1B:
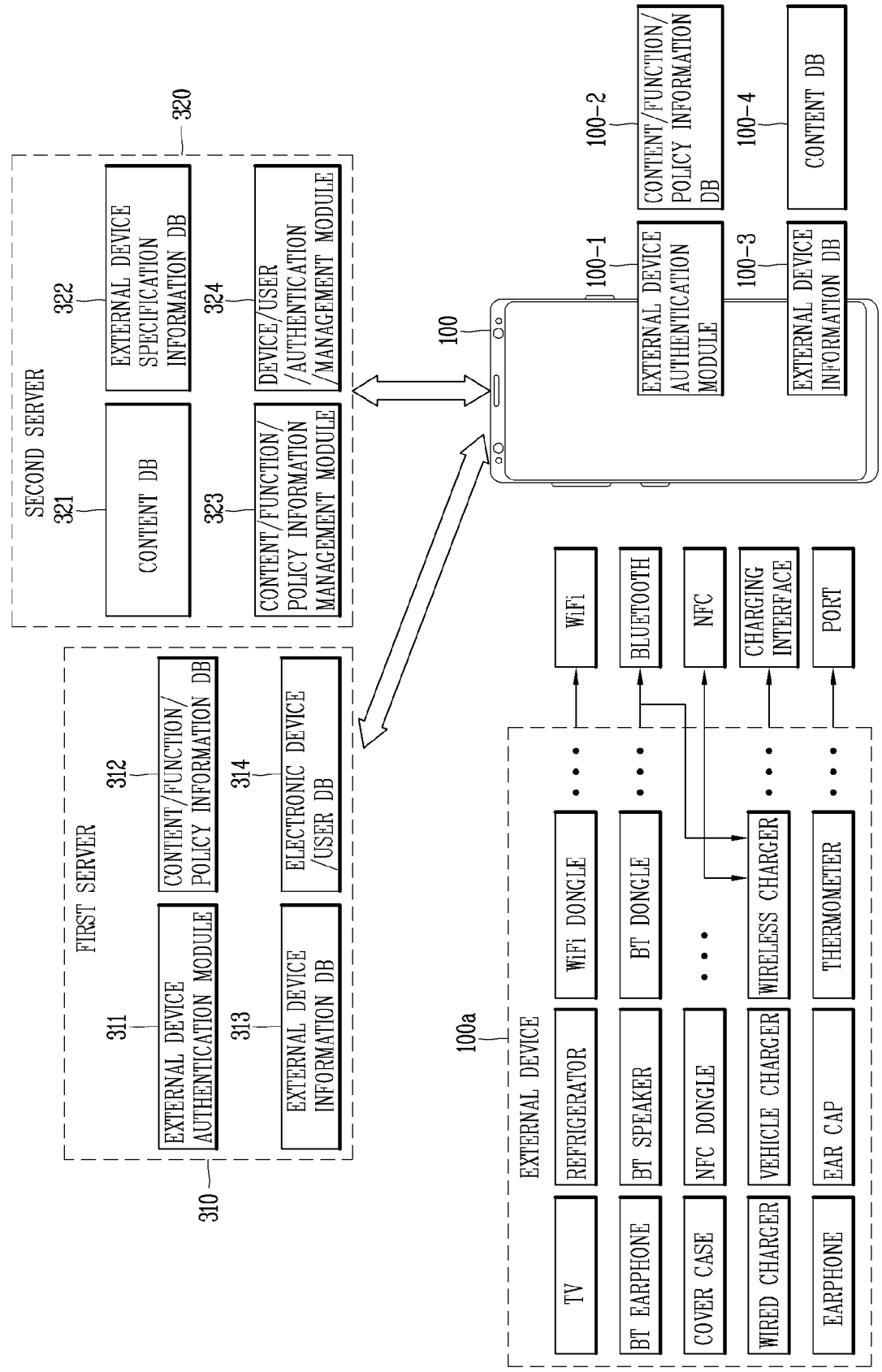
FIG. 1B is a view illustrating a detailed configuration in which the electronic device according to the one implementation is interfaced with an external device or a server.

Referring to FIGS. 1A and 1B, the wireless communication system may include an electronic device 100, at least one external device 100a, a first server 310 and a second server 320. The electronic device 100 may be functionally connected to at least one external device 100a, and may control contents or functions of the electronic device 100 based on information received from the at least one external device 100a. According to one implementation of the present disclosure, the electronic device 100 may perform authentication to determine whether the at least one external device 100 includes or generates information following a predetermined rule using the servers 310, 320. Also, the electronic device 100 may display contents or control functions by controlling the electronic device 100 based on an authentication result. According to an implementation of the present disclosure, the electronic device 100 may be connected to at least one external device 100a through a wired or wireless communication interface to receive or transmit information. For example, the electronic device 100 and the at least one external device 100a may transmit or receive information through near field communication (NFC), a charger (e.g., a universal serial bus (USB)-C), ear jack, Bluetooth (BT), wireless fidelity (WiFi), or the like.

The electronic device 100 may include at least one of an external device authentication module 100-1, a content/function/policy information DB 100-2, an external device information DB 100-3, or a content DB 104. The at least one external device 100a, as an assistant apparatus associated with the electronic device 100, may be a device designed for various purposes, such as ease of use, increased appearance aesthetics, and enhanced usability of the electronic device 100. The at least one external device 100a may or may not be in physical contact with the electronic device 100. According to one implementation, the at least one external device 100a may be functionally connected to the electronic device 100 using a wired/wireless communication module to control information for controlling content or a function in the electronic device 100.

According to one implementation, the at least one external device 100a may include an authentication module for encrypting/decrypting at least one of various pieces of information included in the external device information, or storing or managing it in a physical/virtual memory area that is not directly accessible from the outside. According to one implementation, the at least one external device 100a may perform communication with the electronic device 100 or may provide information through communication between the external devices. According to one implementation, the at least one external device 100a may be functionally connected to the server 410 or 320. In various implementations, the at least one external device 100a may be various types of products such as a cover case, an NFC dongle, a car charger, an earphone, an ear cap (e.g., an accessory device mounted on a mobile phone audio connector), a thermometer, an electronic pen, a BT earphone, a BT speaker, a BT dongle, a TV, a refrigerator, and a WiFi dongle.

In this regard, for example, the external device 100a such as a wireless charger may supply power to the electronic device 100 through a charging interface such as a coil. In this case, control information may be exchanged between the external device 100a and the electronic device 100 through in-band communication using a charging interface such as a coil. Meanwhile, control information may be exchanged between the external device 100a and the electronic device 100 through out-of-band communication such as Bluetooth or NFC.

On the other hand, the first server 310 may include a server or a cloud device for a service associated with the at least one external device 100a, or a hub device for controlling a service in a smart home environment. The first server 310 may include at least one of an external device authentication module 311, a content/function/policy information DB 312, an external device information DB 313, and an electronic device/user DB 314. The first server 310 may be referred to as an authentication management server, an authentication server, or an authentication related server. The second server 320 may include a server or cloud device for providing a service or content, or a hub device for providing a service in a smart home environment. The second server 320 may include at least one of a content DB 321, an external device specification information DB 322, a content/function/policy information management module 323, and a device/user authentication/management module 324. The second server 130 may be referred to as a content management server, a content server, or a content related server.

On the other hand, the electronic device 100 described herein may maintain a connection state between a 4G base station (eNB) and a 5G base station (eNB) through the 4G wireless communication module 111 and/or the 5G wireless communication module 112. In this regard, as described above, FIG. 10 illustrates a configuration in which the electronic device 100 is interfaced with a plurality of base stations or network entities.

Referring to FIG. 10, 4G/5G deployment options are shown. With regard to 4G/5G deployment, when multi-RAT of 4G LTE and 5G NR is supported in a non-standalone (NSA) mode, it may be implemented as EN-DC in option 3 or NGEN-DC in option 5. On the other hand, when multi-RAT is supported in a standalone (SA) mode, it may be implemented as NE-DC in option 4. In addition, when single RAT is supported in a standalone (SA) mode, it may be implemented as NR-DC in option 2.

The NR frequency band is defined as a frequency range of two types (FR1, FR2). The FR1 is a Sub-6 GHz range, and the FR2 is a range of above 6 GHz, which may denote millimeter waves (mmWs).

Operating bands for dual connectivity may be specified to operate in EN-DC, NGEN-DC, or NR-DC configuration. EN-DC or NGEN-DC band combinations may include at least one E-UTRA operating band. Specifically, operating bands for intra-band contiguous EN-DC, intra-band non-contiguous EN-DC, inter-band EN-DC in FR1, inter-band EN-DC including FR2, inter-band EN-DC including FR1 and FR2, and inter-band EN-DC between FR1 and FR2 may be defined.

A UE channel bandwidth for EN-DC may be defined. In this regard, a UE channel bandwidth for intra-band EN-DC in FR1 may be defined. Channel arrangements for DC may be defined. In this regard, channel spacing for intra-band EN-DC carriers may be defined.

The configuration for EN-DC may be defined. Specifically, configurations for intra-band contiguous EN-DC, intra-band non-contiguous EN-DC, inter-band EN-DC in FR1, inter-band EN-DC including FR2, inter-band EN-DC including FR1 and FR2, and inter-band EN-DC between FR1 and FR2 may be defined.

As an example, UL EN-DC configuration may be defined for 2, 3, 4, 5, or 6 bands in FR1. In this regard, the UL EN-DC configuration for 2, 3, 4, 5, or 6 bands in FR1 may be made of a combination of EUTRA and NR configurations. This EN-DC, NGEN-DC, or NR-DC configuration may also be defined for downlink (DL) as well as uplink (UL).

Transmitter power may be defined in relation to EN-DC. UE maximum output power and UE maximum output power reduction may be defined for each configuration of the above-described EN-DCs. UE additional maximum output power reduction may be defined in relation to EN-DC. Configured output power for EN-DC and configured output power for NR-DC may be defined.

With regard to the base station type, the eNB is a 4G base station, which is also called an LTE eNB, and is based on the Rel-8-Rel-14 standard. On the other hand, ng-eNB is an eNB capable of interworking with a 5GC and gNB, which is also called an eLTE eNB, and is based on the Rel-15 standard. Furthermore, the gNB is a 5G base station interworking with a 5G NR and 5GC, which is also called an NR gNB, and is based on the Rel-15 standard. In addition, the en-gNB is a gNB capable of interworking with an EPC and an eNB, also called an NR gNB, and is based on the Rel-15 standard. With regard to the Dual Connectivity (DC) type, option 3 represents E-UTRA-NR Dual Connectivity (EN-DC). Option 7 represents NG-RAN E-UTRA-NR Dual Connectivity (NGEN-DC). Furthermore, option 4 represents NR-E-UTRA Dual Connectivity (NE-DC). Furthermore, option 2 represents NR-NR Dual Connectivity (NR-DC). In this regard, the technical features of double connection according to option 2 through option 7 are as follows.

Option 2: Independent 5G services may be provided with only a 5G system (5GC, gNB). In addition to enhanced Mobile Broadband (eMBB), Ultra-Reliable Low-Latency Communication (URLLC) and Massive Machine Type Communication (mMTC) may be possible, and 5GC features such as network slicing, MEC support, mobility on demand, and access-agnostic may be available to provide a full 5G service. Initially, due to coverage limitations, it may be used as a hot spot, an enterprise or overlay network, and when it is out of a 5G NR coverage, EPC-5GC interworking is required. A 5G NR full coverage may be provided, and dual connectivity (NR-DC) may be supported between gNBs using a plurality of 5G frequencies.

Option 3: This is a case where only a gNB is introduced into the existing LTE infrastructure. The core is an EPC and the gNB is an en-gNB that can interwork with the EPC and the eNB. The dual connectivity (EN-DC) is supported between the eNB and the en-gNB, and the master node is an eNB. An eNB, which is a control anchor of an en-gNB, processes control signaling for network access, connection configuration, handover, etc. of a UE, and user traffic may be transmitted through the eNB and/or the en-gNB. It is an option that is mainly applied to a first stage of 5G migration, as an operator operating an LTE nationwide network is able to quickly build a 5G network with the introduction of the en-gNB and minimal LTE upgrade without 5GC.

There are three types of option 3, which are options 3/3a/3x, depending on the user traffic split schemes. Bearer split is applied to options 3/3x, but is not applied to option 3a. The main scheme is option 7x.

Option 3: Only an eNB is connected to an EPC and an en-gNB is connected only to the eNB. User traffic may be split at a master node (eNB) and transmitted simultaneously to LTE and NR.

Option 3a: Both the eNB and the gNB are connected to the EPC, and thus user traffic is directly transferred from the EPC to the gNB. User traffic is transmitted to LTE or NR.

Option 3x: It is a combination of option 3 and option 3a, which differs from Option 3 in that user traffic is split at the secondary node (gNB).

The advantages of option 3 are i) that LTE can be used as a capacity booster for eMBB services, and ii) the terminal is always connected to LTE to provide service continuity through LTE even if it is out of 5G coverage or NR quality deteriorates so as to provide stable communication.

Option 4: 5GC is introduced, and still interworking with LTE, but independent 5G communication is possible. Core is 5GC, and the eNB is an ng-eNB capable of interworking with 5GC and a gNB. Dual connectivity (NE-DC) is supported between an ng-eNB and a gNB, and the master node is the gNB. LTE may be used as a capacity booster when 5G NR coverage is fully extended. There are two types of option 4, which are option 4/4a. The main scheme is option 7x.

Option 7: 5GC is introduced, and still interworking with LTE, and 5G communication relies on LTE. Core is 5GC, and the eNB is an ng-eNB capable of interworking with 5GC and a gNB. Dual connectivity (NGEN-DC) is supported between an ng-eNB and a gNB, and the master node is a gNB. 5GC features may be used, and when 5G coverage is insufficient yet, service continuity may be provided using an eNB as the master node similar to option 3. There are three types of option 7, which are options 7/7a/7x, depending on the user traffic split schemes. Bearer split is applied to options 7/7x, but is not applied to option 7a. The main scheme is option 7x.

Figure 3:
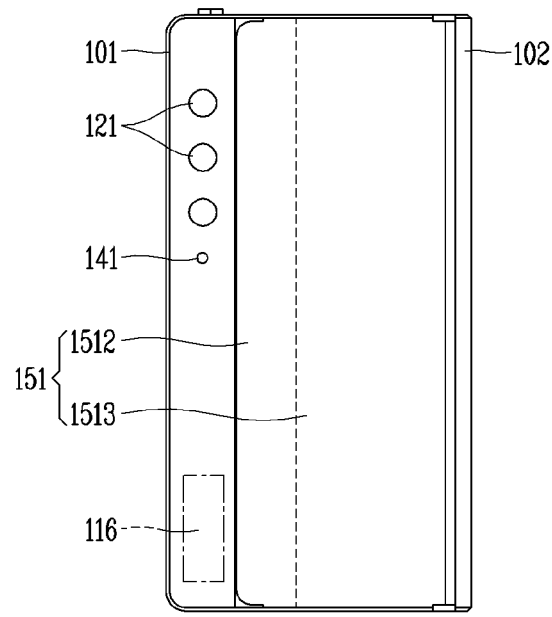
FIG. 3 is a rear view illustrating a first state and a second state of a roll-slide electronic device in accordance with the present disclosure.
Figure 3:
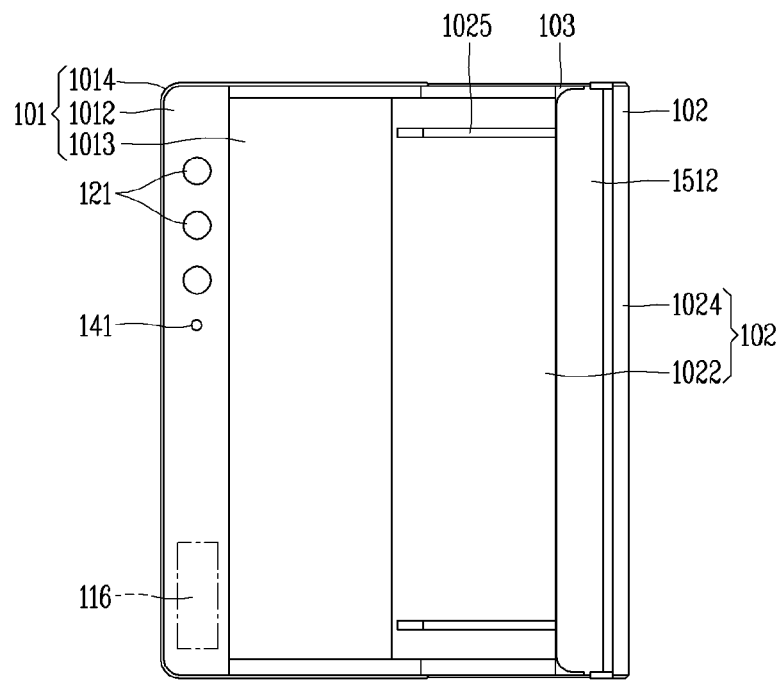

FIG. 2B is a perspective view of the roll-slide mobile terminal 100 in accordance with one implementation, and FIG. 3 is a rear view illustrating a first state and a second state of the roll-slide mobile terminal 100. (a) of FIG. 2B and (a) of FIG. 3 illustrate the first state of the roll-slide mobile terminal 100 according to the one implementation, and (b) of FIG. 2B and (b) of FIG. 3 illustrates the second state of the roll-slide mobile terminal 100 according to the one implementation.

Compared to the second state, the roll-slide mobile terminal 100 in the first state has a smaller size in a first direction. The roll-slide mobile terminal 100 in the second state expands in size in the first direction, and the display 151 disposed on the front surface of the mobile terminal 100 increases in size more than that in the first state. A direction in which the roll-slide mobile terminal 100 expands is referred to as the first direction and a direction in which the roll-slide electronic device 100 is contracted to switch its state from the second state to the first state is referred to as a second direction. Also, a direction perpendicular to those directions is referred to as a third direction.

The roll-slide electronic device 100 of the present disclosure may be switched from a first state in which the display is located on the front surface, like a bar-type mobile terminal, into a second state in which its screen is expanded as illustrated in (b) of FIG. 2B. In the second state, an area of the display 151 located on the front surface is increased in the first direction, and an area of a display located on the rear surface as illustrated in (b) of FIG. 3 is decreased. That is, the display located on the rear surface in the first state moves forward in the second state.

As such, a flexible display to be bent or curved may be used as the display 151 so that the position of the display can vary. The flexible display refers to a durable display that is lightweight and does not break easily by being fabricated on a thin, flexible substrate, such as paper, which is bent, curved, folded, twisted or rolled while maintaining characteristics of an existing flat panel display.

In addition, the electronic paper is a display to which general ink characteristics are applied, and is different from the existing flat panel display in view of using reflected light. The e-paper may change information by using a twist ball or electrophoresis using a capsule.

In a state where the flexible display 151 is not deformed (e.g., a state having an infinite radius of curvature, hereinafter, referred to as a default state), a display region of the flexible display unit is flat. When the default state is switched to a state where the flexible display unit is deformed by an external force (e.g., a state having a finite radius of curvature, hereinafter, referred to as a deformed state), the display area may be curved. As illustrated in the drawing, information displayed in the deformed state may be visual information output on a curved surface. Such visual information is realized by independently controlling an emission of unit pixels (sub-pixels) arranged in a matrix form. The unit pixel denotes an elementary unit for representing one color.

The flexible display 151 may be placed in a curved state (e.g., curved up or down or to left or right), other than a flat state, in the default state. In this case, if an external force is applied to the flexible display unit 151, the flexible display 151 may be deformed into a flat state (or a less curved state) or a more curved state.

Meanwhile, the flexible display 151 may be combined with a touch sensor to implement a flexible touch screen. When a touch is applied to the flexible touch screen, the controller 180 (see FIG. 1A) may perform a control corresponding to the touch input. The flexible touch screen may be configured to sense a touch input even in in the deformed state as well as the default state.

A touch sensor senses a touch (or a touch input) applied to the touch screen using at least one of a variety of touch methods. Examples of such touch methods include a resistive type, a capacitive type, an infrared type, an ultrasonic type, and a magnetic field type, among others.

As one example, the touch sensor may be configured to convert changes of pressure applied to a specific part of the display 151, or convert capacitance occurring at a specific part of the display 151, into electric input signals. The touch sensor may also be configured to sense not only a touched position and a touched area, but also touch pressure and/or touch capacitance.

Meanwhile, the mobile terminal 100 according to this varied example may be provided with a deformation detecting unit to detect the deformation of the flexible display 151. The deformation detecting unit may be included in the sensing unit 140 (see FIG. 1).

The deformation detecting unit may be provided in the flexible display 151 or the case 201 to detect information related to deformation of the flexible display 151. Here, the information related to the deformation may be a deformed direction of the flexible display 151, a deformed degree, a deformed position, a deformed time, and an acceleration at which the deformed flexible display 151 is restored. In addition, the deformation-related information may be various information which can be detectable due to the flexible display 151 being curved.

In addition, the controller 180 may change information displayed on the flexible display 151 or generate a control signal for controlling the function of the electronic device 100 based on the information related to the deformation of the flexible display 151 detected by the deformation detecting unit.

The state of the flexible display 151 is not always changed by the external force. For example, when the flexible display 151 is in the first state, the first state may be changed to the second state by a command of a user or an application. In this way, in order to deform the flexible display without an external force, a driving unit 210 may be provided.

The flexible display 151 disclosed herein may be bent by 180 degrees so as to be partially located on the front surface of the roll-slide electronic device 100 and partially located on the rear surface of the roll-slide electronic device 100. The flexible display 151 has a fixed area. Accordingly, if an area of the flexible display 151 located on the front surface is increased, an area of the flexible display 151 located on the rear surface is decreased.

As the flexible display 151 covers even the rear surface as well as the front surface, a space in which an antenna implemented on the rear case may be mounted is limited. Instead, the antenna may be implemented on the flexible display 151. An antenna on display (AOD) is an antenna in which a patterned electrode layer and a dielectric layer are layered to form a transparent film. The AOD can be implemented thinner than a laser direct structuring (LDS) antenna which is implemented by the existing copper nickel plating method, so it has the advantage of not appearing outside without affecting a thickness. In addition, the AOD antenna can transmit and receive signals even in a direction in which the display is located, and can be used in a terminal having a display located on both surfaces as illustrated in the present disclosure.

Figure 4:
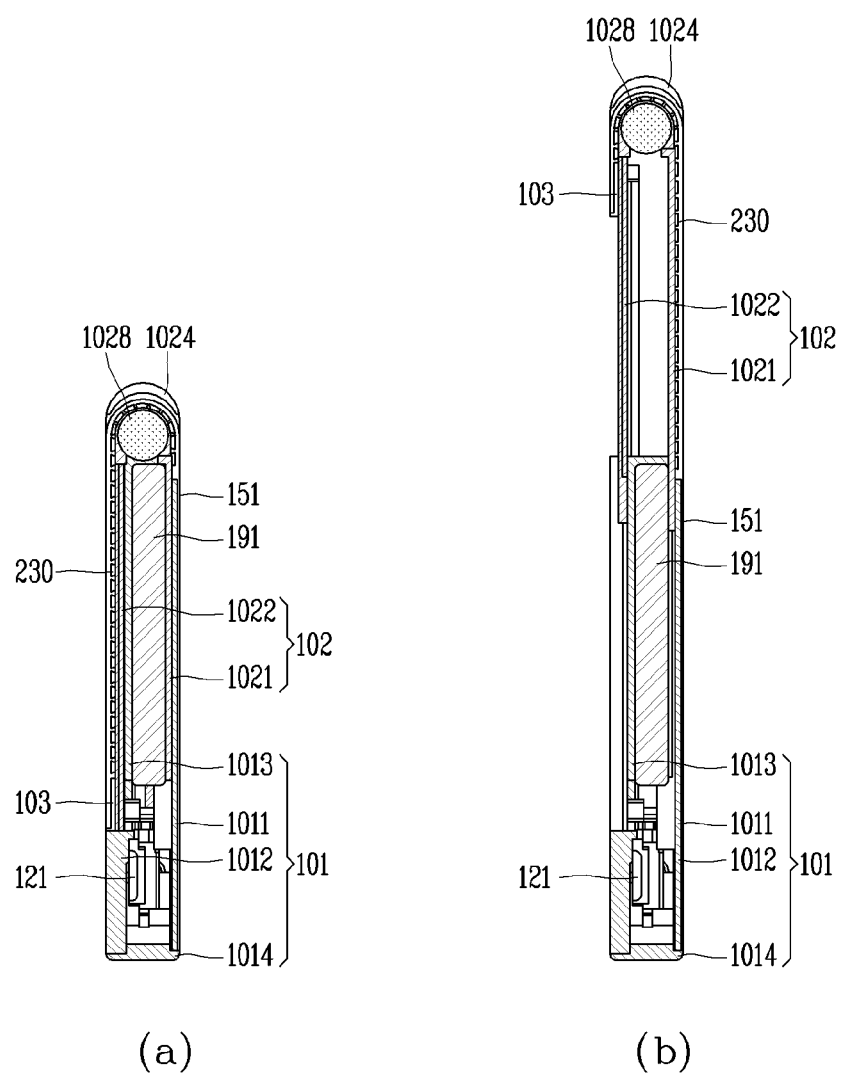
FIG. 4 is a cross-sectional view taken along lines A-A and B-B of FIG. 2.

FIG. 4 is a cross-sectional view taken along lines A-A and B-B of FIG. 2B, in which the roll-slide electronic device 100 of the present disclosure includes a first frame 101, a second frame 102 slidably moving in the first direction relative to the first frame 101, and a third frame 103 slidably moving in the first direction relative to the second frame 102.

The first frame 101 and the second frame 102 may include a front surface portion, a rear surface portion, and side surface portions, and may define appearance of the hexahedral roll-slide electronic device 100. In the flexible display 151, a first region 1511 located on one side is fixed to a front surface of the first frame 101. A third region 1513 neighboring the first region 1511 in the first direction partially covers a front surface of the second frame 102 and partially covers a rear surface of the second frame 102.

A second region located on another side of the flexible display 151 is located on the rear surface of the electronic device. The second region is not directly coupled to the second frame 102 but coupled to the third frame 103. The third frame 103 is a plate-shaped member that is slidably coupled to the rear surface of the second frame 102 in the first direction. As illustrated in (b) of FIG. 3, a slide slot 1025 may extend from the second frame 102 in the first direction and the third frame 103 may move along the slide slot 1025. The slide slot 1025 in (b) of FIG. 3 is formed on the rear surface of the second frame 102, but may alternatively be formed on a side surface of the second frame 102.

In summary, the flexible display 151 includes a first region 1511 fixed to the first frame 101, a second region 1512 fixed to the third frame 103, and a third region 1513 located between the first region 1511 and the second region 1512 and disposed on the front or rear surface depending on the state of the roll-slide electronic device 100.

The first region 1511 and the second region 1512 are maintained in a flat default state without any change in curvature, but the third region 1513 is bent from another side of the second frame 102 and curved to the rear surface. When switching from the first state to the second state, the third region 1513 located in the first direction of the first region 1511 is widened. A bent position of the third area 1513 may vary depending on a sliding position of the second frame 102. In case of a foldable electronic device 100 which is opened like a book, a force is repeatedly applied to a specific position, causing a great risk of damage. On the other hand, a bent portion of the flexible display 151 disclosed herein varies depending on the state of the electronic device 100, thereby reducing fatigue due to deformation applied intensively to one position. This may result in preventing damage to the flexible display 151.

The first frame 101 may include a first front surface portion 1011 to which the first region 1511 of the flexible display 151 is coupled, a first rear surface portion 1012 exposed to outside on the rear surface even in the first state as illustrated in (a) of FIG. 3, and a second rear surface portion 1013 covered by the second region and the third region of the flexible display 151 in the first state and exposed only in the second state as illustrated (b) of FIG. 3.

Since the first rear surface portion 1012 is always exposed to the outside, a camera 121, a flash, a proximity sensor 141, and the like may be disposed on the first rear surface portion 1012. In a typical bar-type terminal, since a display is provided only on one side, cameras are required on both rear and front surfaces to photograph a user as well as an object located on an opposite side of the user.

However, the roll-slide electronic device 100 disclosed herein has the flexible display 151 located even on the rear surface, which may allow the user not only to photograph an object located at an opposite side of the user but also to photograph himself/herself using the single camera. The camera may include a plurality of cameras having different angles of view, such as a wide angle, a super-wide angle, and telephoto. In addition to the camera, a proximity sensor, a sound output module, or the like may be located on the first rear surface portion 1012, and an antenna 116 may also be provided on the first rear surface portion 1012.

The first frame 101 may include a side surface portion 1014 surrounding a periphery thereof. The side surface portion 1014 covers both sides of the first frame 101 in the third direction and a side surface of one side of the first frame 101 in the first direction, except for an end portion of the first frame in the first direction in which the second frame 102 is slid in and out, thereby defining appearance of the roll-slide electronic device 100. The side surface portion 1014 may be provided with an interface for connecting a power port or an ear jack or a user input unit such as a volume button. When a metal material is included, the side surface portion 1014 may serve as an antenna.

The second frame 102 may include a second front surface portion 1021 located on a rear surface of the first front surface portion 1011 and a third rear surface portion 1022 covering a rear surface of the second rear surface portion 1013. The second front surface portion 1021 supports the rear surface of the expanded flexible display 151 of the front surface portion when switched to the second state. That is, the second front surface portion 1021 supports the third region 1513 of the flexible display 151 in the second state.

The third region 1513 of the flexible display 151 may be rolled on an end portion of the second frame 102 in the first direction, and a cylindrical roller 1028 may be provided so that the rolled portion is gently bent with a predetermined curvature.

The roller 1028 may be located on the end portion of the second frame 102 in the first direction and brought into contact with an inner surface of the flexible display 151. Accordingly, the roller 1028 can rotate, in response to the movement of the flexible display 151, so that the flexible display 151 can be slid from the rear surface to the front surface or from the front surface to the rear surface during the sliding of the second frame 102.

Figure 2B:
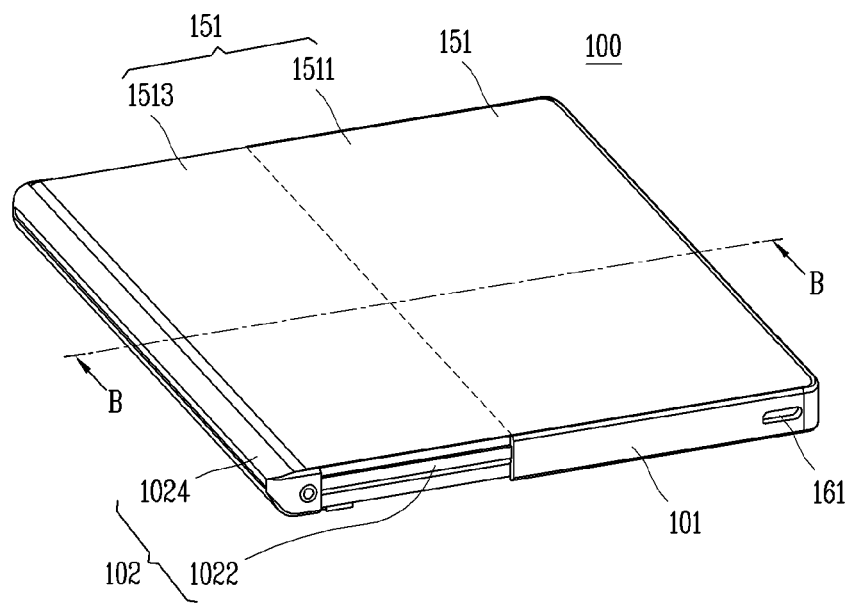

Since the flexible display 151 rolled on the roller 1028 is located on an end portion of the roll-slide electronic device 100 in the first direction, there is a risk of damage when an impact is applied, for example, when the roll-slide electronic device 100 is dropped. In order to prevent such damage, as illustrated in FIG. 2, the second frame 102 may further include a side frame 1024 for protecting the flexible display 151 wound on the roller 1028.

Figure 5A:
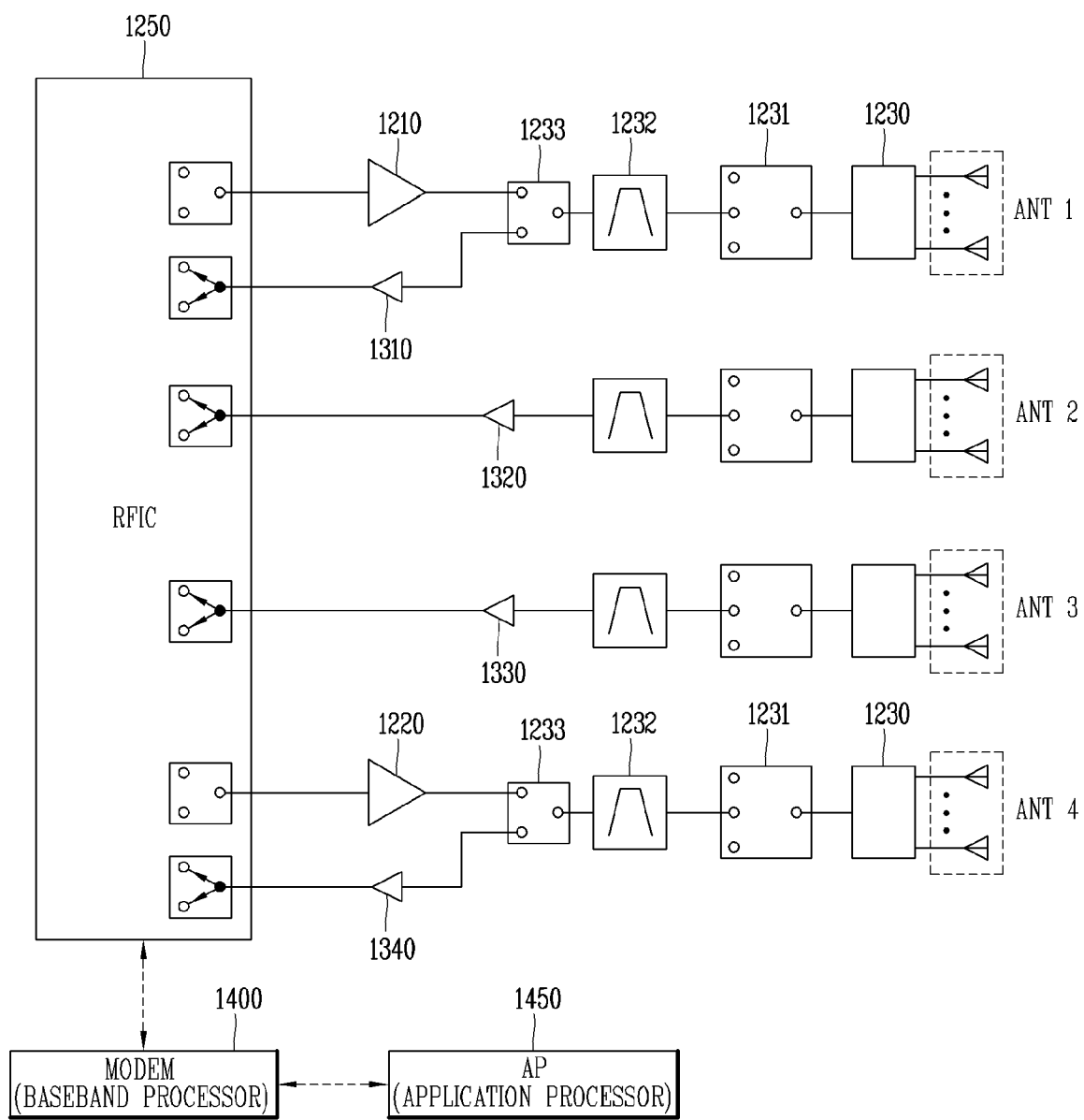
FIG. 5A is a block diagram illustrating a configuration of a wireless communication module of an electronic device operable in a plurality of wireless communication systems according to an implementation.

FIG. 5A is a block diagram illustrating a configuration of a wireless communication module of an electronic device operable in a plurality of wireless communication systems according to an implementation. Referring to FIG. 5A, the electronic device includes a first power amplifier 1210, a second power amplifier 1220, and an RFIC 1250. In addition, the electronic device may further include a modem 400 and an application processor (AP) 500. Here, the modem 400 and the application processor (AP) 500 may be physically implemented on a single chip, and may be implemented in a logically and functionally separated form. However, the present disclosure is not limited thereto and may be implemented in the form of a physically isolated chip.

Meanwhile, the electronic device includes a plurality of low noise amplifiers (LNAs) 410 to 440 in the receiver. Here, the first power amplifier 1210, the second power amplifier 1220, the RFIC 1250, and the plurality of low noise amplifiers 1310 to 1340 are all operable in a first communication system and a second communication system. In this case, the first communication system and the second communication system may be a 4G communication system and a 5G communication system, respectively.

As illustrated in FIG. 5A, the RFIC 1250 may be configured as a 4G/5G integration type, but is not limited thereto, and may also be configured as a 4G/5G separation type according to an application. When the RFIC 1250 is configured as a 4G/5G integration type, it is advantageous in terms of synchronization between 4G/5G circuits, and also there is an advantage that control signaling by the modem 1400 can be simplified.

On the other hand, when the RFIC 1250 is configured as a 4G/5G separation type, it may be referred to as a 4G RFIC and a 5G RFIC, respectively. In particular, when a band difference between the 5G band and the 4G band is large, such as when the 5G band is configured as a millimeter wave band, the RFIC 1250 may be configured as a 4G/5G separation type. As such, when the RFIC 1250 is configured as a 4G/5G separation type, there is an advantage that the RF characteristics can be optimized for each of the 4G band and the 5G band.

Meanwhile, even when the RFIC 1250 is configured as the 4G/5G separated type, the 4G RFIC and the 5G RFIC may be logically and functionally separated from each other and may be implemented physically on one chip.

On the other hand, the application processor (AP) 1450 is configured to control the operation of each component of the electronic device. Specifically, the application processor (AP) 1450 may control the operation of each component of the electronic device through the modem 1400.

For example, the modem 1400 may be controlled through a power management IC (PMIC) for low power operation of the electronic device. Accordingly, the modem 1400 may operate the power circuits of the transmitter and the receiver in a low power mode through the RFIC 1250.

In this regard, when it is determined that the electronic device is in an idle mode, the application processor (AP) 500 may control the RFIC 1250 through the modem 300 as follows. For example, when the electronic device is in an idle mode, the application processor 280 may control the RFIC 1250 through the modem 300, such that at least one of the first and second power amplifiers 110 and 120 operates in the low power mode or is turned off.

According to another implementation, the application processor (AP) 500 may control the modem 300 to provide wireless communication capable of performing low power communication when the electronic device is in a low battery mode. For example, when the electronic device is connected to a plurality of entities among a 4G base station, a 5G base station, and an access point, the application processor (AP) 1450 may control the modem 1400 to enable wireless communication at the lowest power. Accordingly, the application processor (AP) 500 may control the modem 1400 and the RFIC 1250 to perform short-range communication using only the short-range communication module 113, even at the expense of throughput.

According to another implementation, when the remaining battery level of the electronic device is above the threshold, the modem 300 may be controlled to select an optimal wireless interface. For example, the application processor (AP) 1450 may control the modem 1400 to receive data through both the 4G base station and the 5G base station according to the remaining battery level and the available radio resource information. In this case, the application processor (AP) 1450 may receive the remaining battery level information from the PMIC, and the available radio resource information from the modem 1400. Accordingly, when the remaining battery level and the available radio resources are sufficient, the application processor (AP) 500 may control the modem 1400 and the RFIC 1250 to receive data through both the 4G base station and 5G base station.

Meanwhile, the multi-transceiving system of FIG. 5A may integrate a transmitter and a receiver of each radio system into a single transceiver. Accordingly, there is an advantage in that a circuit portion for integrating two types of system signals may be eliminated at a RF front-end.

Furthermore, since the front end parts can be controlled by an integrated transceiver, the front end parts may be more efficiently integrated than when the transceiving system is separated by communication systems.

In addition, when separated by communication systems, it may be impossible to control other communication systems as required, or impossible to perform efficient resource allocation since system delay increases due to this. On the other hand, the multi-transceiving system as illustrated in FIG. 5A has advantages of controlling different communication systems according to necessity and minimizing system delay, which may result in enabling efficient resource allocation.

Meanwhile, the first power amplifier 1210 and the second power amplifier 1220 may operate in at least one of the first and second communication systems. In this regard, when the 5G communication system operates in a 4G band or a Sub-6 band, the first and second power amplifiers 1210 and 1220 may operate in both the first and second communication systems.

On the contrary, when the 5G communication system operates in a millimeter wave (mmWave) band, the first and second power amplifiers 1210, 1220 may operate in either the 4G band and the other in the millimeter wave band.

On the other hand, a transmitter and a receiver may be integrated to implement two different wireless communication systems using a single antenna using a dual transmit/receive antenna. Here, 4×4 MIMO may be implemented using four antennas as shown in FIG. 5A. In this case, 4×4 DL MIMO may be performed through downlink (DL).

Figure 5B:
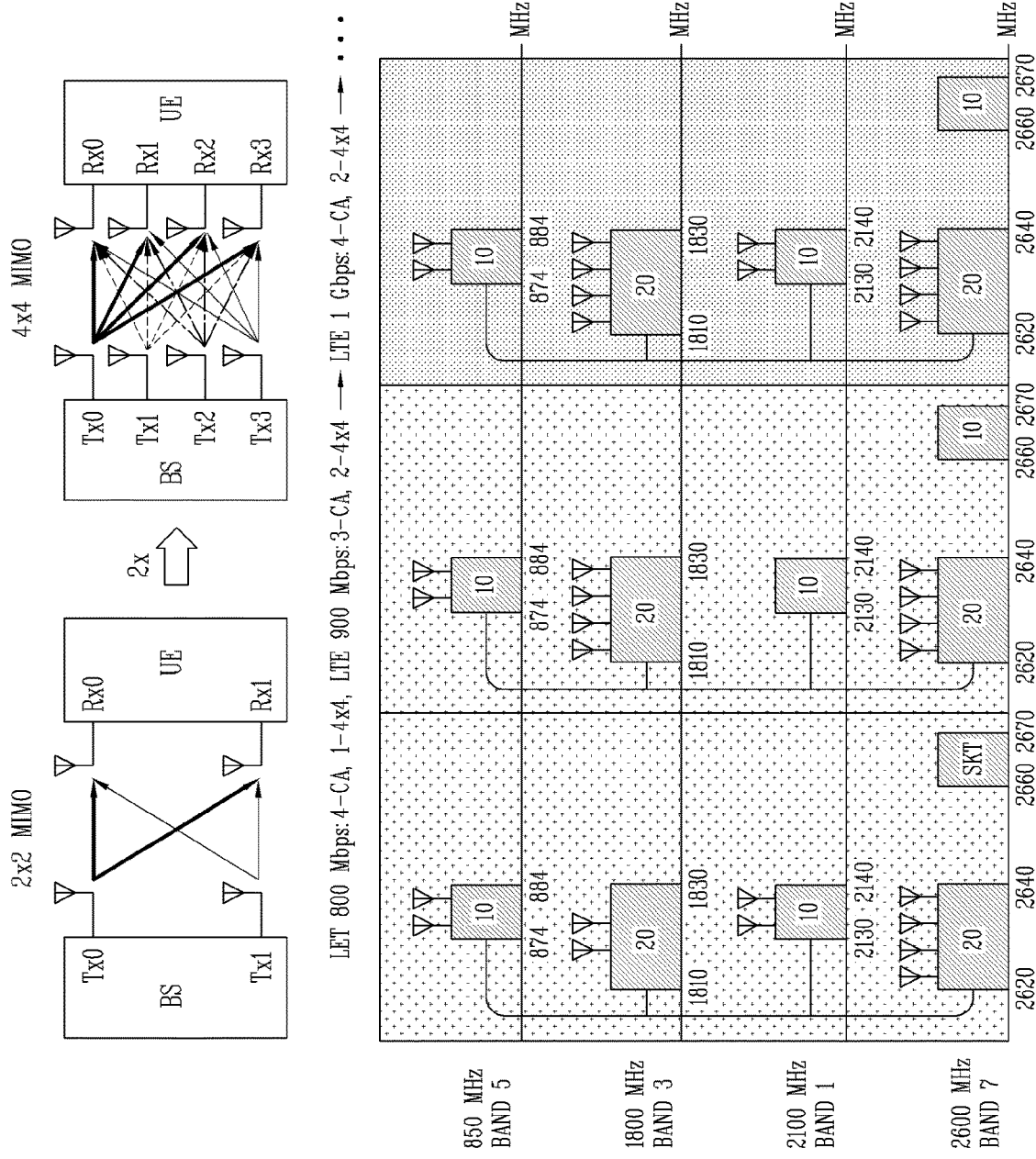
FIG. 5B is a diagram illustrating a MIMO configuration and a MIMO+carrier aggregation (CA) configuration between a UE and a base station (BS) in accordance with one implementation.

In this regard, Multi-input and Multiple-output (MIMO) is a key technology to improve the throughput. FIG. 5B is a diagram illustrating a MIMO configuration and a MIMO+carrier aggregation (CA) configuration between a UE and a base station (BS) in accordance with one implementation. Referring to FIG. 5B, 4×4 MIMO requires four Tx antennas at the base station and four Rx antennas at the UE. In addition, if the four antennas of the base station operate as Rx antennas, the four antennas of the UE operate as Tx antennas. Thus, 4×4 MIMO can double a data rate (or capacity) compared to 2×2 MIMO.

It uses multiple antennas both on the transmitter and receiver sides, so as to enable multi-layer data transmission. NR supports multi-layer data transmission for a single UE (single-user MIMO) with a maximum of eight transmission layers for DL and four for UL. NR also supports multi-layer data transmission to multiple UEs on different layers (multi-user MIMO) using a maximum of twelve transmission layers for DL and UL transmissions.

Reference Signals (RSs) are specified by assuming multi-layer transmissions. For demodulation of date/control information for both uplink and downlink, demodulation RS (DM-RS) is supported. For measurement of channel state information of downlink, channel state information RS (CSI-RS) is supported. CSI-RS is also used for mobility measurement, measurement of gNB transmission beamforming, and frequency/time tracking. The CSI-RS used for the frequency/time tracking is named as tracking RS (TRS). In a high frequency range, phase noise is a problem that degrades the transmission performance. A phase tracking reference signal (PT-RS) is applied with respect to PDSCH and PUSCH to enable a receiver to track the phase and mitigate performance loss due to the phase noise. For uplink channel sounding, sounding RS (SRS) is supported.

For UL multi-layer data transmission, both codebook-based precoding and non-codebook-based precoding are supported. In codebook-based UL transmission, precoding matrix applied for PUSCH transmission is selected by gNB. In non-codebook-based UL transmission, precoded multiple SRS are transmitted and then the gNB selects a desired transmission layer for PUSCH based on the reception of the SRS.

Since NR supports a multi-beam operation where every signal/channel is transmitted on directional beam, beamforming is an important technique for achieving higher throughput and sufficient coverage especially in a high frequency range. For DL transmission beamforming, a gNB applies transmission beamforming to SS/PBCH block and/or CSI-RS transmissions, and a UE measures reference signal received power on a physical layer (L1-RSRP) on the configured SS/PBCH block and/or CSI-RS resource. The UE reports an SS/PBCH block or CSI-RS resource with a maximum L1-RSRP value as L1-RSRP beam reporting. The gNB can decide gNB transmission beamforming for the UE based on the reported L1-RSRP. For PDCCH/PDSCH transmission, the gNB informs the UE that the gNB transmission beamforming applied to a certain SS/PBCH block or CSI-RS resource is applied to the PDCCH/PDSCH transmission so that the UE can apply reception beamforming which fits into the gNB transmission beamforming. For UL transmission beamforming, two mechanisms are supported. In one of the mechanisms, the UE transmits multiple SRS symbols with different UE transmission beamforming so that the gNB can measure them and identify the best UE transmission beamforming. In another mechanism, the UE generates UL transmission beamforming which is the same as DL reception beamforming used for SS/PBCH block or CSI-RS resource reception. In addition, beam failure recovery (BFR) is supported to achieve quick recovery from the beam failure. The UE can identify the beam failure and informs the gNB of the index of SS/PBCH block or CSI-RS resource as new candidate beam.

For DL channel state information (CSI) acquisition, NR supports two precoding matrix indicator (PMI) definitions, type I and II codebooks that provide different levels of CSI granularity.

With respect to carrier aggregation (CA), 5-CA that aggregates up to 5 bands may be applied. The CA may be applied in combination with MIMO. Referring to FIG. 5B, 4-CA and 1-4×4 MIMO (2.6 GHz) may support up to 800 Mbps. In this regard, 4-CA may be supported for Bands 1, 3, 5, and 7. Bands 1, 3, 5, and 7 may have bandwidths of 10, 20, 10, and 20 MHz, respectively. 4×4 MIMO may be applied to Band 7.

Meanwhile, 3-CA and 2-4×4 MIMO (2.6 GHz and 1.8 GHz) may support up to 900 Mbps. 3-CA may be supported for Bands 3, 5, and 7. 4×4 MIMO may be applied to Band 7.

Meanwhile, 4-CA and 2-4×4 MIMO supporting 1 Gbps may be supported. 4-CA may be supported for Bands 1, 3, 5, and 7. Bands 1, 3, 5, and 7 may have bandwidths of 10, 20, 10, and 20 MHz, respectively. 4×4 MIMO may be applied to Bands 3 and 7. In addition, 5-CA and 3-4×4 MIMO supporting 1.2 Gbps may be supported.

By aggregating 5 carriers and applying 256 QAM and 4×4 MIMO in all bands, a data rate can be improved up to 1.4 Gbps. However, a 4.5G or 5G data rate may be gradually improved depending on processing performance of a UE in use (e.g., the number of data streams that can be simultaneously processed).

The combination of CA and MIMO may be applied to 5G NR in addition to 4G LTE. CA and MIMO for 4G LTE or 5G NR may be referred to as intra-CA+MIMO. On the other hand, CA and MIMO for both 4G LTE and 5G NR may be referred to as inter-CA+MIMO.

Meanwhile, when the 5G band is a Sub-6 band, first to fourth antennas ANT1 to ANT4 may be configured to operate in both the 4G band and the 5G band. In this regard, UL-MIMO and/or DL-MIMO may be performed through the first to fourth antennas ANT1 to ANT4.

In the case of PC2 UE having two transmitting antennas in a closed-loop spatial multiplexing scheme, maximum output power for all transmission bandwidths in a channel bandwidth may be specified. These maximum output power requirements may comply with the specified UL-MIMO configuration. For UE supporting UL-MIMO, the maximum output power may be measured as the sum of maximum output power at each UE antenna connector. A measurement period may be defined as at least one subframe (1 ms), but is not limited thereto. In the case of UE having two transmitting antennas in a closed-loop spatial multiplexing scheme, the maximum power reduction (MPR) allowable for maximum output power may be specified. In the case of UE having two transmitting antennas in a closed loop spatial multiplexing scheme, a specific additional maximum output power reduction (A-MPR) value may be applied to specific maximum output power. In the case of UE supporting UL-MIMO, transmission power may be configured for each UE. Definitions of the configured maximum output power $P_{CMAX,\ c}$, a lower limit $P_{CMAX\_L,\ c}$ and an upper limit $P_{CMAX\_H},\ c$ may be applied to the UE supporting UL-MIMO.

Regarding the output power adjustment (dynamics) for UL-MIMO, the minimum output power for the UL-MIMO, transmission OFF power, transmission ON/OFF time mask, and power control may be applied. For UE having two transmitting antennas in a closed-loop spatial multiplexing scheme, the minimum output power is defined as the sum of an average power of each transmitting antenna in one subframe (1 ms). It may be controlled so that the minimum output power does not exceed a specific value.

If a 5G band is a mmWave band, UL-MIMO and/or DL-MIMO may be performed in the mmWave band through the first to fourth antennas ANT1 to ANT4. The operating band for UL-MIMO may be at least one of n257, n258, n260, and n261 bands. Transmission power for UL-MIMO may be defined. UE maximum power for UL-MIMO may be defined for each power class (PC). For PC1 UE, the UE maximum power may be defined as the maximum output power radiated by the UE using UL-MIMO for all transmission bandwidths within a channel bandwidth for non-CA configuration.

For each of PC1 UE to PC4 UE, the UE minimum peak EIRP (dBm) for UL-MIMO, UE maximum power limit, and UE spherical coverage may be defined for each band. In relation to these requirements, a measurement period may be at least one subframe (1 ms).

Meanwhile, a channel bandwidth for UL-MIMO and UE maximum power for modulation may be defined for each power class (PC). Regarding the output power adjustment (dynamics) for UL-MIMO, the minimum output power for the UL-MIMO, transmission OFF power, transmission ON/OFF time mask, and power control may be applied.

Each of the first to fourth antennas ANT1 to ANT4 may be configured as an array antenna. Meanwhile, 2×2 MIMO may be implemented using two antennas connected to the first power amplifier 1210 and the second power amplifier 1220 among the four antennas. At this time, 2×2 UL MIMO (2 Tx) may be performed through uplink (UL). Alternatively, the present disclosure is not limited to 2×2 UL MIMO, and may also be implemented as 1 Tx or 4 Tx. In this case, when the 5G communication system is implemented with 1 Tx, only one of the first and second power amplifiers 1210, 1220 may operate in the 5G band. Meanwhile, when the 5G communication system is implemented using 4Tx, an additional power amplifier operating in the 5G band may be further provided. Alternatively, a transmission signal may be branched in each of one or two transmission paths, and the branched transmission signals may be connected to the plurality of antennas.

On the other hand, a switch-type splitter or power divider is embedded in an RFIC corresponding to the RFIC 1250. Accordingly, a separate external component is not needed, thereby improving a component mounting configuration. In more detail, a single pole double throw (SPDT) type switch may be provided in the RFIC corresponding to the controller 1250 to select transmitters (TXs) of two different communication systems.

In addition, the electronic device that is operable in the plurality of wireless communication systems according to an implementation may further include a duplexer 1231, a filter 1232, and a switch 1233.

The duplexer 1231 is configured to separate signals in a transmission band and a reception band from each other. In this case, signals in a transmission band transmitted through the first and second power amplifiers 1210 and 1220 are applied to the antennas ANT1 and ANT4 through a first output port of the duplexer 1231. On the contrary, signals in a reception band received through the antennas ANT1 and ANT4 are received by the low noise amplifiers 310 and 340 through a second output port of the duplexer 1231.

The filter 1232 may be configured to pass signals in a transmission band or a reception band and block signals in the remaining bands. In this case, the filter 1232 may include a transmission filter connected to the first output port of the duplexer 1231 and a reception filter connected to the second output port of the duplexer 1231. Alternatively, the filter 1232 may be configured to pass only signals in the transmission band or only signals in the reception band according to a control signal.

The switch 1233 is configured to transmit only one of the transmission signal and the reception signal. In an implementation of the present disclosure, the switch 1233 may be configured in a single-pole double-throw (SPDT) type to separate a transmission signal and a reception signal in a time division duplex (TDD) scheme. Here, the transmission signal and the reception signal are signals of the same frequency band, and thus the duplexer 1231 may be implemented in the form of a circulator.

In another implementation, the switch 1233 may also be applied to a frequency division multiplex (FDD) scheme. In this case, the switch 1233 may be configured in the form of a double-pole double-throw (DPDT) to connect or block a transmission signal and a reception signal, respectively. On the other hand, the transmission signal and the reception signal may be separated by the duplexer 1231, and thus the switch 1233 is not necessarily required.

Meanwhile, the electronic device according to an implementation may further include a modem 1400 corresponding to the controller. In this case, the RFIC 1250 and the modem 1400 may be referred to as a first controller (or a first processor) and a second controller (a second processor), respectively. On the other hand, the RFIC 1250 and the modem 1400 may be implemented as physically separated circuits. Alternatively, the RFIC 1250 and the modem 1400 may be logically or functionally distinguished from each other on one physical circuit.

The modem 1400 may perform control and signal processing for the transmission and reception of signals through different communication systems through the RFIC 1250. The modem 1400 may be acquired through control information received from the 4G base station and/or the 5G base station. Here, the control information may be received through a physical downlink control channel (PDCCH), but the present disclosure is not limited thereto.

The modem 1400 may control the RFIC 1250 to transmit and/or receive signals through the first communication system and/or the second communication system at specific time and frequency resources. Accordingly, the RFIC 1250 may control transmission circuits including the first and second power amplifiers 1210 and 1220 to transmit a 4G signal or a 5G signal at a specific time interval. In addition, the RFIC 1250 may control reception circuits including the first to fourth low noise amplifiers 310 to 340 to receive a 4G signal or a 5G signal at a specific time interval.

Figure 5C:
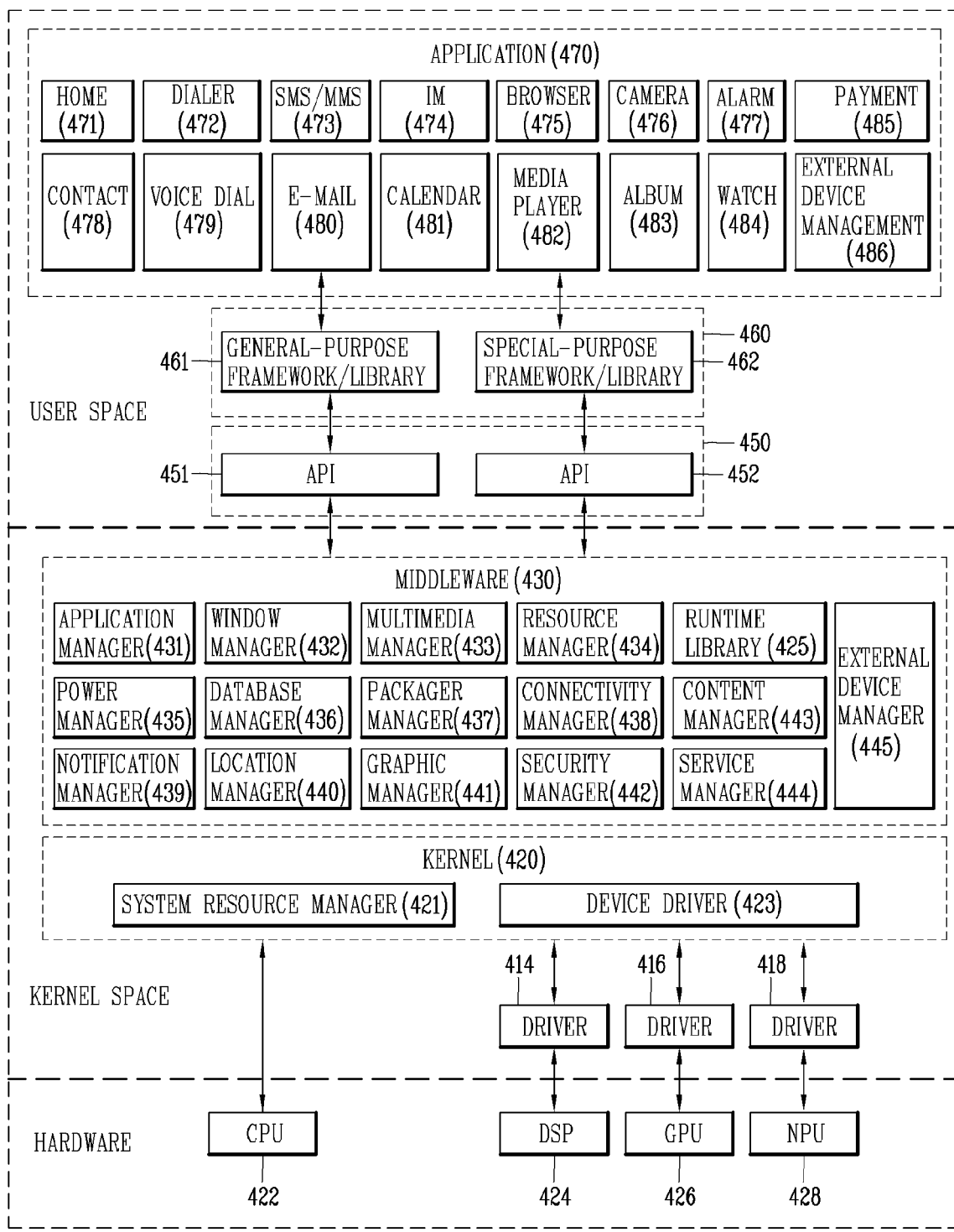
FIG. 5C is a view illustrating a framework structure related to an application program operating in an electronic device according to one implementation.

Meanwhile, as shown in FIG. 5, an application program operating in the electronic device described herein may be executed by interworking with a user space, a kernel space, and hardware. FIG. 5C is a view illustrating a framework structure related to an application program operating in an electronic device according to one implementation.

The program module 410 may include a kernel 420, middleware 430, an API 450, a framework/library 460, and/or an application 470. At least part of the program module 410 may be pre-loaded on an electronic device or downloaded from an external device or a server.

The kernel 420 may include a system resource manager 421 and/or a device driver 423. The system resource manager 421 may perform control, allocation, or retrieval of system resources. According to one implementation, the system resource manager 421 may include a process manager, a memory manager, or a file system manager. The device driver 423 may include a display driver, a camera driver, a Bluetooth driver, a shared memory driver, a USB driver, a keypad driver, a WiFi driver, an audio driver, or an inter-process communication (IPC) driver. The middleware 430 may provide functions commonly required by the application 470 or provide various functions to the application 470 through the API 460, for example, to allow the application 470 to use limited system resources inside the electronic device.

The middleware 430 may include at least one of a runtime library 425, an application manager 431, a window manager 432, a multimedia manager 433, a resource manager 434, a power manager 435, a database manager 436, a package manager 437, a connectivity manager 438, a notification manager 439, a location manager 440, a graphic manager 441, a security manager 442, a content manager 443, a service manager 444 and an external device manager 445.

The framework/library 460 may include a general-purpose framework/library 461 and a special-purpose framework/library 462. Here, the general-purpose framework/library 461 and the special-purpose framework/library 462 may be referred to as a first framework/library 451 and a second framework/library 452, respectively. The first framework/library 461 and the second framework/library 462 may be interfaced with a kernel space and hardware through the first API 451 and the second API 452, respectively. Here, the second framework/library 452 may be an exemplary software architecture capable of modularizing artificial intelligence (AI) functions. Using the architecture, the various processing blocks of hardware implemented with a System on Chip (SoC) (e.g., CPU 422, DSP 424, GPU 426, and/or NPU 428) may perform functions for supporting operations during the runtime operation of the application 470.

The application 470 may include a home 471, a dialer 472, an SMS/MMS 473, an instant message 474, a browser 475, a camera 476, an alarm 477, a contact 478, a voice dial 479, an email 480, a calendar 481, a media player 482, an album 483, a watch 484, a payment 485, an accessory management 486, a health care, or an environmental information providing application.

An AI application may be configured to call functions defined in a user space capable of allowing the electronic device to provide for detection and recognition of a scene indicating a location at which the electronic device is currently operating. The AI application may configure a microphone and a camera differently depending on whether the recognized scene is an indoor space or an outdoor space. The AI application may make a request for compiled program codes associated with a library defined in a scene detect application programming interface (API) to provide an estimate of the current scene. This request may rely on the output of a deep neural network configured to provide scene estimates based on video and location data.

The framework/library 462, which may be compiled codes of the Runtime Framework, may be further accessible by the AI application. The AI application may cause a runtime framework engine to request scene estimation triggered at specific time intervals or by events detected by the application's user interface. When estimating a scene, the runtime engine may then send a signal to an operating system such as a Linux kernel running on the SoC. The operating system may cause the operation to be performed on the CPU 422, the DSP 424, the GPU 426, the NPU 428, or some combination thereof. The CPU 422 may be accessed directly by the operating system and other processing blocks may be accessed via a driver such as a driver 414 to 418 for the DSP 424, the GPU 426, or the NPU 428. In an illustrative example, a deep neural network and an AI algorithm may be configured to run on a combination of processing blocks, such as the CPU 422 and the GPU 426, or an AI algorithm such as a deep neural network may run on the NPU 428.

The AI algorithm performed through the special-purpose framework/library as described above may be performed only by the electronic device or by a server supported scheme. When the AI algorithm is performed by the server supported scheme, the electronic device may receive and transmit information associated AI processing with the AI server through the 4G/5G communication system.

Meanwhile, referring to FIGS. 1A and 2A, a 5G wireless communication system, that is, 5G new radio access technology (NR) may be provided. In this regard, as more communication devices demand larger communication capacities, there is a need for improved mobile broadband communication as compared to radio access technology in the related art. In addition, massive MTC (Machine Type Communications), which connects multiple devices and objects to provide various services anytime and anywhere, is also one of major issues to be considered in next-generation communication. In addition, communication system design in consideration of services/terminals that are sensitive to reliability and latency is being discussed. As described above, introduction of next-generation radio access technology in consideration of enhanced mobile broadband communication (eMBB), massive MTC (mMTC), ultra-reliable and low latency communication (URLLC), and the like, is being discussed, and the relevant technology is referred to herein as NR for the sake of convenience. The NR is an expression showing an example of 5G radio access technology (RAT).

A new RAT system including the NR uses an OFDM transmission scheme or a similar transmission scheme. The new RAT system may follow OFDM parameters different from the OFDM parameters of LTE. Alternatively, the new RAT system may follow the existing numerology of LTE/LTE-A as it is but have a larger system bandwidth (e.g., 100 MHz). Alternatively, a single cell may support a plurality of numerologies. In other words, electronic devices operating with different numerologies may coexist in a single cell.

In this regard, in the case of 4G LTE, since the maximum bandwidth of the system is limited to 20 MHz, a single sub-carrier spacing (SCS) of 15 KHz is used. However, since 5G NR supports a channel bandwidth between 5 MHz and 400 MHz, FFT processing complexity may increase to process the entire bandwidth through a single subcarrier spacing. Accordingly, the subcarrier spacing used for each frequency band may be extended and applied.

Figure 6A:
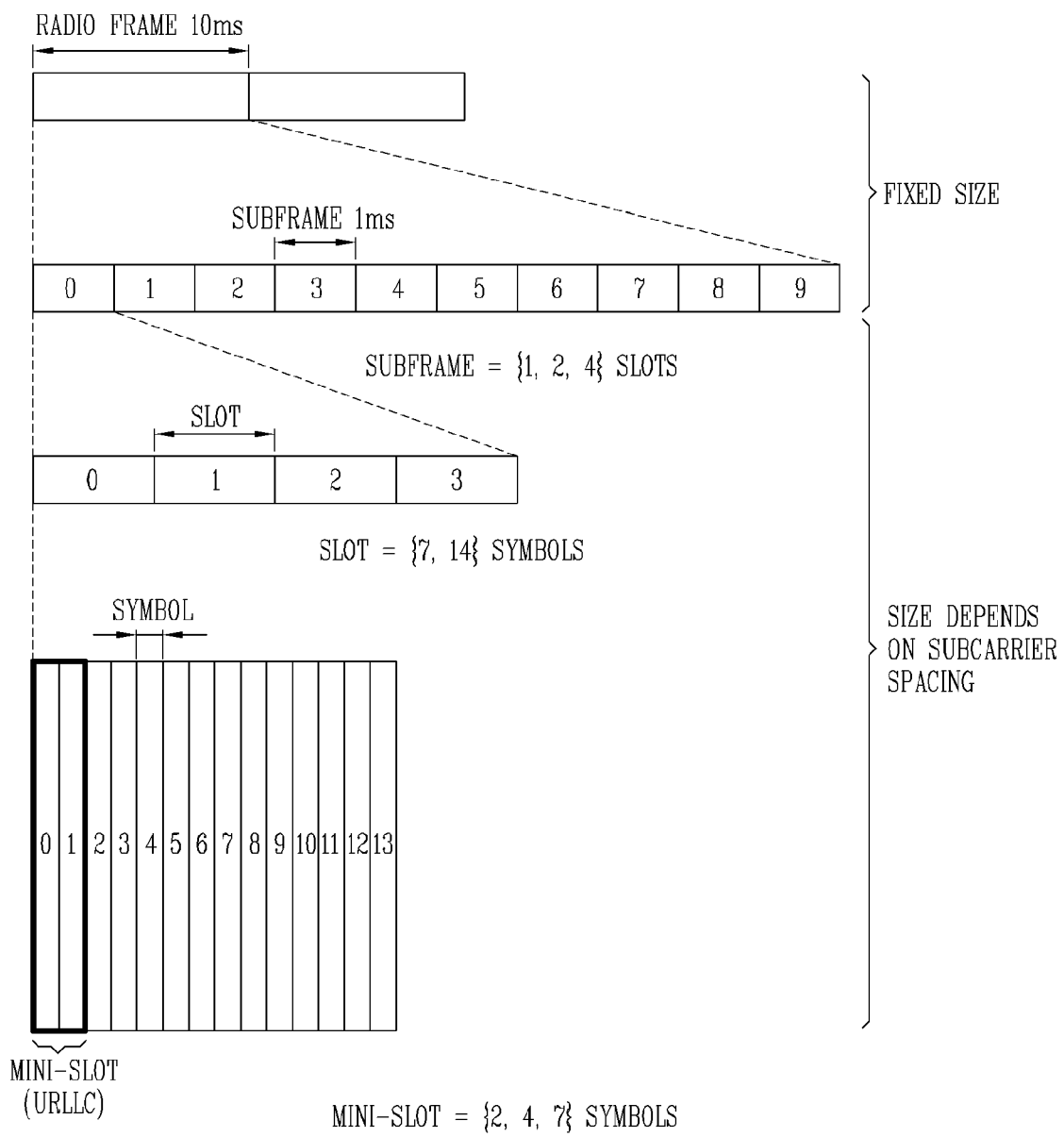
FIG. 6A is a view illustrating an example of a frame structure in NR.

A numerology corresponds to one subcarrier spacing in the frequency domain. By scaling a reference subcarrier spacing to an integer N, different numerologies may be defined. In this regard, FIG. 6A shows an example of a frame structure in NR. FIG. 6B is a view illustrating a change in a slot length in accordance with a change in a subcarrier spacing in the NR.

An NR system may support a number of numerologies. Here, a numerology may be defined by a subcarrier spacing and a cyclic prefix overhead. Here, a plurality of subcarrier spacings may be derived by scaling a basic subcarrier spacing to an integer N. Furthermore, even when it is assumed that a very low subcarrier spacing is not used at a very high carrier frequency, the used numerology may be selected independently of the frequency band. In addition, in an NR system, various frame structures according to a number of numerologies may be supported.

Hereinafter, an Orthogonal Frequency Division Multiplexing (OFDM) numerology and frame structure that can be considered in the NR system will be described. A number of OFDM numerologies supported in the NR system may be defined as shown in Table 1 below.

TABLE 1

| μ | Δ f = $2^\mu$ * 15 [kHz] | Cyclic prefix (CP) |
|---|---|---|
| 0 | 15 | Normal |
| 1 | 30 | Normal |

TABLE 1-continued

| μ | Δ f = $2^\mu$ * 15 [kHz] | Cyclic prefix (CP) |
|---|---|---|
| 2 | 60 | Normal, Extended |
| 3 | 120 | Normal |
| 4 | 240 | Normal |

NR supports a number of numerologies (or subcarrier spacings (SCSs)) for supporting various 5G services. For example, NR supports a wide area in traditional cellular bands when the SCS is 15 kHz, and supports a dense-urban, a lower latency and a wider carrier bandwidth when the SCS is 30 kHz/60 kHz, and supports a bandwidth greater than 24.25 GHz to overcome phase noise when the SCS is 60 kHz or higher. The NR frequency band is defined as a frequency range of two types (FR1, FR2). The FR1 is a Sub-6 GHz range, and the FR2 is a range of above 6 GHz, which may denote millimeter waves (mmWs). Table 2 below shows the definition of the NR frequency band.

TABLE 2

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

With regard to a frame structure in a NR system, the sizes of various fields in the time domain are expressed in multiples of a specific time unit. FIG. 6A illustrates an example of an SCS of 60 kHz, in which one subframe may include four slots. One example of one subframe={1,2,4} slots is shown in FIG. 3, in which the number of slot(s) that can be included in one subframe may be one, two or four. Furthermore, a mini-slot may include two, four or seven symbols or may include more or fewer symbols. Referring to FIG. 5B, a subcarrier spacing of 5G NR phase I and an OFDM symbol length according thereto are shown. Each subcarrier spacing is extended by a multiplier of two, and the symbol length is inversely reduced. In FR1, subcarrier spacings of 15 kHz, 30 kHz, and 60 kHz may be available, depending on a frequency band/bandwidth. In FR2, 60 kHz and 120 kHz may be used for data channels, and 240 kHz may be used for synchronization signals.

In 5G NR, a basic unit of scheduling may be defined as a slot, and the number of OFDM symbols included in a single slot may be limited to 14 as shown in FIG. 6A or 6B regardless of the subcarrier spacing. Referring to FIG. 6B, when a wide subcarrier spacing is used, the length of one slot may decrease in inverse proportion to the subcarrier spacing, thereby reducing transmission delay in a wireless section. In addition, in order to efficiently support ultra-reliable low latency communication (uRLLC), mini-slot (e.g., 2, 4, 7 symbols) unit scheduling may be supported, as described above, in addition to slot-based scheduling.

In consideration of the foregoing technical features, slots in 5G NR described herein may be provided at the same interval as those in 4G LTE or may be provided with slots of various sizes. For an example, in 5G NR, the slot interval may be configured to be 0.5 ms equal to that of 4G LTE. For another example, the slot interval in 5G NR may be configured to be 0.25 ms, which is a narrower interval than that in 4G LTE.

In this regard, the 4G communication system and the 5G communication system may be referred to as a first communication system and a second communication system, respectively. Accordingly, a first signal (first information) of the first communication system may be a signal (information) in a 5G NR frame having a slot interval that is scalable to 0.25 ms, 0.5 ms, and the like. On the contrary, a second signal (second information) of the second communication system may be a signal (information) in a 4G LTE frame having a fixed slot interval of 0.5 ms.

Meanwhile, the first signal of the first communication system may be transmitted and/or received through a maximum bandwidth of 20 MHz. On the contrary, the second signal of the second communication system may be transmitted and/or received through a variable channel bandwidth of 5 MHz to 400 MHz. In this regard, the first signal of the first communication system may be FFT-processed at a single sub-carrier spacing (SCS) of 15 KHz.

On the other hand, the second signal of the second communication system may be FFT-processed at subcarrier spacings of 15 kHz, 30 kHz, and 60 kHz according to the frequency band/bandwidth. In this case, the second signal of the second communication system may be modulated and frequency-converted into a FR1 band and transmitted through a 5G Sub-6 antenna. Meanwhile, the FR1 band signal received through the 5G Sub-6 antenna may be frequency-converted and demodulated. Then, the second signal of the second communication system may be IFFT-processed at subcarrier spacings of 15 kHz, 30 kHz, and 60 kHz according to the frequency band/bandwidth.

On the other hand, the second signal of the second communication system may be FFT-processed at subcarrier spacings of 60 kHz, 120 kHz, and 240 kHz according to the frequency band/bandwidth and data/synchronous channel. In this case, the second signal of the second communication system may be modulated in a FR2 band and transmitted through a 5G mmWave antenna. Meanwhile, the FR2 band signal received through the 5G mmWave antenna may be frequency converted and demodulated. Then, the second signal of the second communication system may be IFFT-processed through subcarrier spacings of 60 kHz, 120 kHz, and 240 kHz according to the frequency band/bandwidth and data/synchronous channel.

In 5G NR, symbol-level time alignment may be used for transmission schemes using various slot lengths, mini-slots, and different subcarrier spacings. Accordingly, the present disclosure provides flexibility to efficiently multiplex various communication services such as enhancement mobile broadband (eMBB) and ultra-reliable low latency communication (uRLLC) in the time domain and the frequency domain. In addition, unlike 4G LTE, 5G NR may define uplink/downlink resource allocation at a symbol level within a single slot as shown in FIG. 6. In order to reduce a hybrid automatic repeat request (HARQ) delay, a slot structure capable of directly transmitting HARQ ACK/NACK in a transmission slot may be defined. This slot structure may be referred to as a self-contained structure.

Unlike 4G LTE, 5G NR may support a common frame structure constituting an FDD or TDD frame through a combination of various slots. Accordingly, a dynamic TDD scheme may be adopted to freely dynamically adjust the transmission direction of individual cells according to traffic characteristics.

On the other hand, a detailed operation and function of the electronic device having a plurality of antennas according to an implementation provided with a multi-transceiving system as shown in FIG. 5A will be discussed below.

In a 5G communication system according to an implementation, the 5G frequency band may be a Sub-6 band. In this regard, FIG. 4A is a configuration diagram in which a plurality of antennas and transceiver circuits according to an implementation are coupled to a processor in an operable manner. FIG. 7B is a configuration diagram in which antennas and transceiver circuits are additionally coupled to a processor in an operable manner in the configuration diagram in FIG. 6A.

Figure 7A:
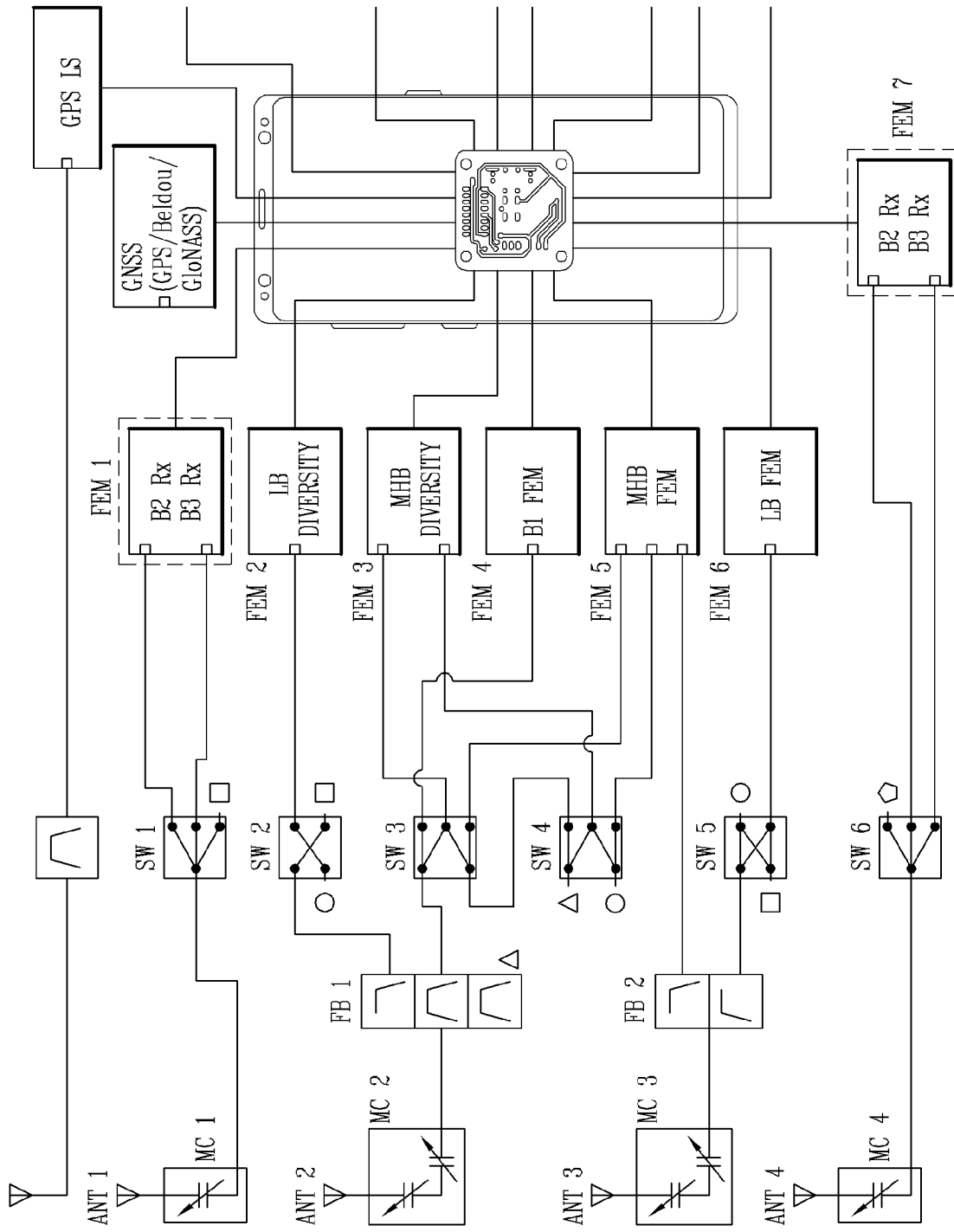
FIG. 7A is a configuration diagram in which a plurality of antennas and transceiver circuits according to an implementation are coupled to a processor in an operable manner.
Figure 7B:
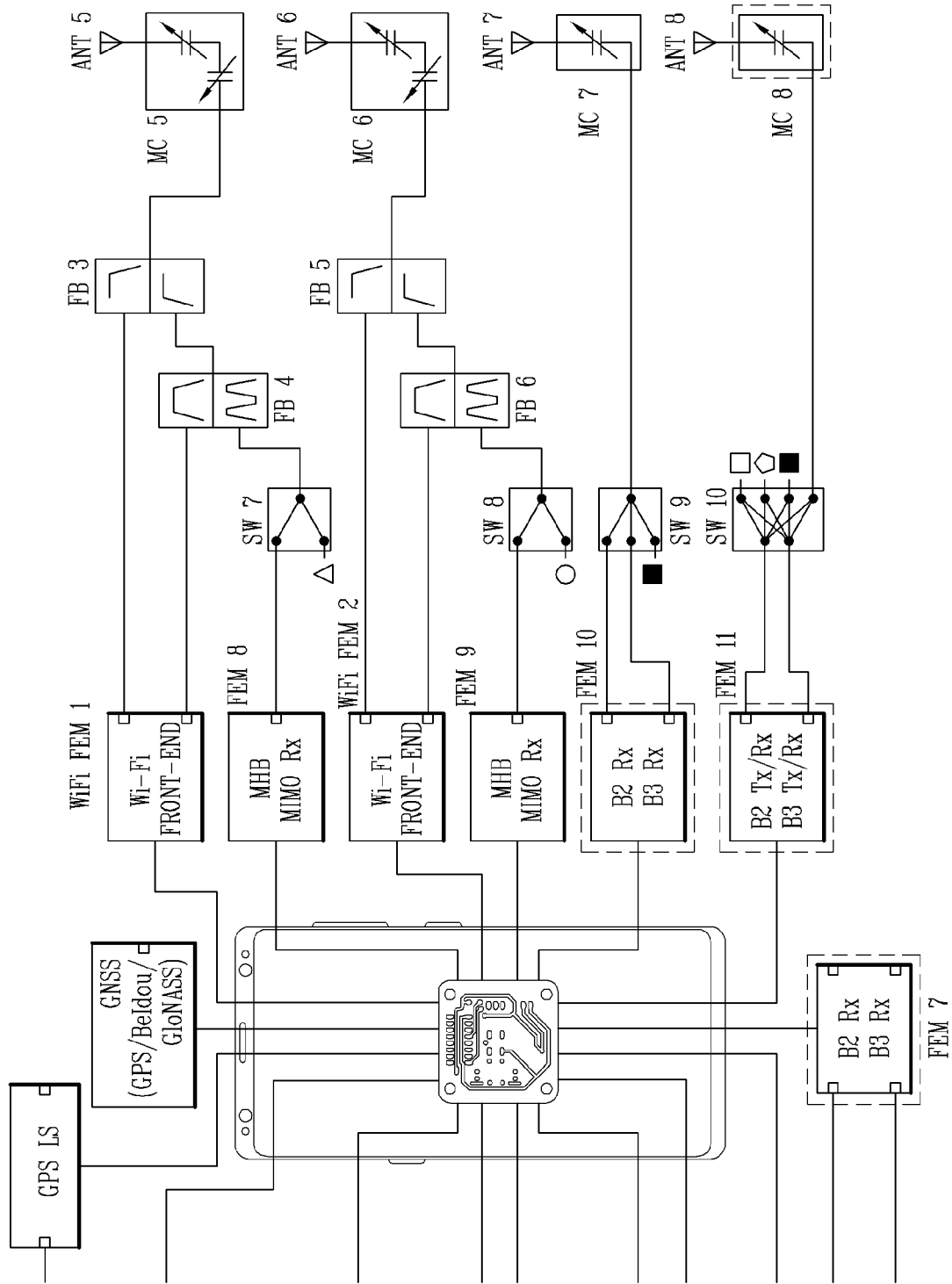
FIG. 7B is a configuration diagram in which antennas and transceiver circuits are additionally coupled to a processor in an operable manner in the configuration diagram in FIG. 6A.

Referring to FIGS. 7A and 7B, the electronic device may include a plurality of antennas ANT1 to ANT4 and front-end modules FEM1 to FEM7 operating in a 4G band and/or a 5G band. In this regard, a plurality of switches SW1 to SW6 may be arranged between the plurality of antennas ANT1 to ANT4 and the front-end modules FEM1 to FEM7.

Referring to FIGS. 6A and 6B, the electronic device may include a plurality of antennas ANT5 to ANT8 and front-end modules FEM8 to FEM11 operating in a 4G band and/or a 5G band. In this regard, a plurality of switches SW7 to SW10 may be arranged between the plurality of antennas ANT1 to ANT4 and the front-end modules FEM8 to FEM11.

Meanwhile, a plurality of signals that can be branched through the plurality of antennas ANT1 to ANT8 may be transmitted to the input of the front-end modules FEM1 to FEM11 or to the plurality of switches SW1 to SW10 through one or more filters.

For an example, the first antenna (ANT1) may be configured to receive signals in a 5G band. In this case, the first antenna ANT1 may be configured to receive a second signal of a second band B2 and a third signal of a third band B3. Here, the second band B2 may be an n77 band and the third band B3 may be an n79 band, but the present disclosure is not limited thereto. The second band B2 and the third band B3 may be changed according to an application. Meanwhile, the first antenna ANT1 may also operate as a transmitting antenna in addition to a receiving antenna.

In this regard, the first switch SW1 may be configured as an SP2T switch or an SP3T switch. When implemented as an SP3T switch, one output port may be used as a test port. The first and second output ports of the first switch SW1 may be connected to the inputs of the first front-end module FEM1.

For an example, the eighth antenna ANT2 may be configured to transmit and/or receive signals in the 4G band and/or the 5G band. In this case, the second antenna ANT2 may be configured to transmit/receive a first signal of a first band B1. Here, the first band B1 may be an n41 band, but the present disclosure is not limited thereto, and the first band B1 may be changed according to an application.

Meanwhile, the second antenna ANT2 may operate in a low band LB. In addition, the second antenna ANT2 may be configured to operate in a mid-band MB and/or a high band HB. Here, the middle band MB and high band HB may be referred to as MHB.

A first output of the first filter bank FB1 connected to the second antenna ANT2 may be connected to the second switch SW2. Meanwhile, a second output of the first filter bank FB1 connected to the second antenna ANT2 may be connected to the third switch SW3. Furthermore, a third output of the first filter bank FB1 connected to the second antenna ANT2 may be connected to the fourth switch SW4.

Accordingly, an output of the second switch SW2 may be connected to an input of the second front-end module FEM2 operating in the low band LB. Meanwhile, a second output of the third switch SW3 may be connected to an input of the third front-end module FEM3 operating in the MHB band. In addition, a first output of the third switch SW3 may be connected to an input of a fourth front-end module FEM4 operating in a first 5G band B1. Furthermore, a third output of the third switch SW3 may be connected to an input of the fifth front-end module FEM5 operating in the MHB band operating in the first 5G band B1.

In this regard, a first output of the fourth switch SW4 may be connected to an input of the third switch SW3. Meanwhile, a second output of the fourth switch SW4 may be connected to an input of the third front-end module FEM3. In addition, a third output of the fourth switch SW4 may be connected to an input of the fifth front-end module FEM5.

For an example, the third antenna ANT3 may be configured to transmit and/or receive signals in the LB band and/or the MHB band. In this regard, a first output of the second filter bank FB2 connected to the second antenna ANT2 may be connected to an input of the fifth front-end module FEM5 operating in the MHB band. Meanwhile, a second output of the second filter bank FB2 connected to the second antenna ANT2 may be connected to the fifth switch SW5.

In this regard, an output of the fifth switch SW5 may be connected to an input of the sixth front end module FEM6 operating in the LB band.

For an example, the fourth antenna ANT4 may be configured to transmit and/or receive a signal in a 5G band. In this regard, the fourth antenna ANT4 may be configured such that the second band B2 that is a transmission band and the third band B3 that is a reception band are frequency-division multiplexed FDM. Here, the second band B2 may be an n77 band and the third band B3 may be an n79 band, but the present disclosure is not limited thereto. The second band B2 and the third band B3 may be changed according to an application.

In this regard, the fourth antenna ANT4 may be connected to the sixth switch SW6, and one of the outputs of the sixth switch SW6 may be connected to a reception port of the seventh front-end module FEM7. Meanwhile, another one of the outputs of the sixth switch SW6 may be connected to the transmission port of the seventh front-end module FEM7.

For an example, the fifth antenna ANT5 may be configured to transmit and/or receive signals in a WiFi band. Furthermore, the sixth antenna ANT5 may be configured to transmit and/or receive signals in the MHB band.

In this regard, the fifth antenna (ANT5) may be connected to the third filter bank (FB3), and a first output of the third filter bank (FB3) may be connected to a first WiFi module (WiFi FEM1). On the other hand, a second output of the third filter bank (FB3) may be connected to a fourth filter bank FB4. In addition, a first output of the fourth filter bank FB4 may be connected to the first WiFi module (WiFi FEM1). Meanwhile, a second output of the fourth filter bank FB4 may be connected to the eighth front-end module FEM8 operating in the MHB band through the seventh switch SW7. Therefore, the fifth antenna ANT5 may be configured to receive WiFi band and 4G/5G band signals.

Similarly, the sixth antenna ANT6 may be configured to transmit and/or receive signals in a WiFi band. Furthermore, the sixth antenna ANT6 may be configured to transmit and/or receive signals in the MHB band.

In this regard, the sixth antenna ANT6 may be connected to a fifth filter bank FB5, and a first output of the fifth filter bank FB5 may be connected to a second WiFi module (WiFi FEM2). On the other hand, a second output of the fifth filter bank FB5 may be connected to a sixth filter bank FB6. In addition, a first output of the sixth filter bank FB6 may be connected to a second WiFi module (WiFi FEM2). A second output of the sixth filter bank FB6 may be connected to the ninth front-end module FEM9 operating in the MHB band through the eighth switch SW8. Therefore, the sixth antenna ANT6 may be configured to receive the WiFi band and 4G/5G band signals.

Referring to FIGS. 5A, 7A, and 7B, the baseband processor 1400 may control antennas and the transceiver circuit (RFIC) 1250 to perform MIMO or diversity in the MHB band. In this regard, the second antenna ANT2 and the third antenna ANT3 adjacent thereto may be used in a diversity mode for transmitting and/or receiving the same information as a first signal and a second signal. On the contrary, antennas disposed on different side surfaces may be used in the MIMO mode in which first information is included in the first signal and second information is included in the second signal. For an example, the baseband processor 1400 may perform MIMO through the second antenna ANT2 and the fifth antenna ANT5. For an example, the baseband processor 1400 may perform MIMO through the second antenna ANT2 and the fifth antenna ANTE.

For an example, the seventh antenna ANT7 may be configured to receive signals in a 5G band. In this case, the seventh antenna ANT7 may be configured to receive a third signal of a second band B2 and a third signal of a third band B3. Here, the second band B2 may be an n77 band and the third band B3 may be an n79 band, but the present disclosure is not limited thereto. The second band B2 and the third band B3 may be changed according to an application. Meanwhile, the seventh antenna ANT7 may also operate as a transmitting antenna in addition to a receiving antenna.

In this regard, the ninth switch SW9 may be configured as an SP2T switch or an SP3T switch. When implemented as an SP3T switch, one output port may be used as a test port. On the other hand, the first and second output ports of the ninth switch SW9 may be connected to the inputs of the tenth front-end module FEM10.

For an example, the eighth antenna ANT8 may be configured to transmit and/or receive signals in the 4G band and/or the 5G band. In this case, the eighth antenna ANT8 may be configured to transmit/receive a signal of the second band B2. In addition, the eighth antenna ANT8 may be configured to transmit/receive a signal of the third band B3. Here, the second band B2 may be an n77 band and the third band B3 may be an n79 band, but the present disclosure is not limited thereto. The second band B2 and the third band B3 may be changed according to an application. In this regard, the eighth antenna ANT8 may be connected to the eleventh front-end module FEM11 through the tenth switch SW10.

Meanwhile, the antennas ANT1 to ANT8 may be connected to impedance matching circuits MC1 to MC8 to operate in a plurality of bands. In this regard, when operating in adjacent bands such as the first antenna ANT1, the fourth antenna ANT4, the seventh antenna ANT7 and the eighth antenna ANT8, only one variable element may be used. In this case, the variable element may be a variable capacitor configured to vary the capacitance by varying the voltage.

On the contrary, when operating in spaced bands such as the second antenna ANT2, the third antenna ANT3, the fifth antenna ANT5, and the sixth antenna ANTE, only two or more variable elements may be used. In this case, the two or more variable elements may be two or more variable capacitors or a combination of variable inductors and variable capacitors.

Referring to FIGS. 5A, 7A, and 7B, the baseband processor 1400 may perform MIMO through at least one of the second band B2 and the third band B3 in a 5G band. In this regard, the baseband processor 1400 may perform MIMO through at least two of the first antenna ANT1, the fourth antenna ANT4, the seventh antenna ANT7, and the eighth antenna ANT8 in the second band B2. On the other hand, the baseband processor 1400 may perform MIMO through at least two of the first antenna ANT1, the fourth antenna ANT4, the seventh antenna ANT7, and the eighth antenna ANT8 in the third band B3. Accordingly, the baseband processor 1400 may control the plurality of antennas and the transceiver circuit 1250 to support MIMO up to 4 RXs as well as 2 RXs in the 5G band.

Hereinafter, a description will be given of detailed operations and functions of the electronic device including the flexible display 151 of FIG. 3 and the plurality of antennas and a multi-transceiving system as illustrated in FIGS. 5A, 7A, and 7B.

The aforementioned flexible display 151 may be implemented in the form of the rollable display 151 by use of the frame of the electronic device. Therefore, the flexible display 151 may also be referred to as the rollable display 151. In this regard, FIG. 7A illustrates front and side views of a display expansion structure of the electronic device provided with the rollable display in accordance with the present disclosure. On the other hand, FIG. 7B illustrates front and rear views of a display reduction structure of the electronic device provided with the rollable display in accordance with the present disclosure. Here, the display expansion structure may be referred to as "Display Out (display-out)" and the display reduction structure may be referred to as "Display In (display-in)".

Referring to FIGS. 3 and 7A, the display 151 includes a first region 1511 coupled to the front surface of the first frame, a second region 1512 coupled to the third frame, and a third region 1513 located between the first region 1511 and the first region 1512. Here, the third frame 103 may be a plate-like member that is slidably coupled to the rear surface of the second frame 102 in the first direction. Specifically, the plurality of frames of the electronic device includes the first frame 101, the second frame 102 slidably moving in the first direction with respect to the first frame, and the third frame 103 located on the rear surface of the second frame and moving in the first direction with respect to the second frame.

Accordingly, when the second frame 102 is slid in the first direction relative to the first frame 101, an area of the third region 1513 which is located in the first direction of the first region 1511 of the flexible display is widened, and the state of the flexible display is switched from the first state to the second state.

Meanwhile, referring to FIGS. 3 and 7B, the display 151 includes the first region 1511 coupled to the front surface of the first frame, and the second region 1512 coupled to the third frame. Here, the third frame 103 may be a plate-like member that is slidably coupled to the rear surface of the second frame 102 in the first direction. Specifically, the plurality of frames of the electronic device includes the first frame 101, the second frame 102 slidably moving in the first direction with respect to the first frame, and the third frame 103 located on the rear surface of the second frame and moving in the first direction with respect to the second frame.

In this regard, the second frame 102 and the third frame 103 are movable in the second direction opposite to the first direction. Accordingly, when the second frame 102 and the third frame 103 move in the second direction, an area of the front surface of the flexible display is reduced and its state is switched from the second state to the first state.

The present disclosure can provide an arrangement structure of a plurality of antennas in an electronic device such as a rollable device, and also provide various communication services using the plurality of antennas. In this regard, one aspect of the present disclosure is to provide an electronic device having a plurality of antennas which can be implemented as a metal frame of the electronic device.

Another aspect of the present disclosure is to provide an antenna structure capable of securing characteristics of antennas disposed in a rollable device.

Another aspect of the present disclosure is to provide an antenna structure capable of maintaining antenna performance when a display region of a rollable device is expanded and reduced.

Another aspect of the present disclosure is to provide an antenna structure capable of securing antenna performance in a display structure with a minimized bezel region in a rollable device.

Another aspect of the present disclosure is to reduce antenna characteristic deviation caused as a slide is opened and closed in case where a plurality of antennas is arranged in a rollable device.

In order to achieve those aspects according to the present disclosure, a description will be given of a display change and an antenna arrangement in a rollable device in which a plurality of antennas can be disposed.

Main technical features of an antenna arrangement structure in a rollable device disclosed in the present disclosure are as follows.

Figure 8A:
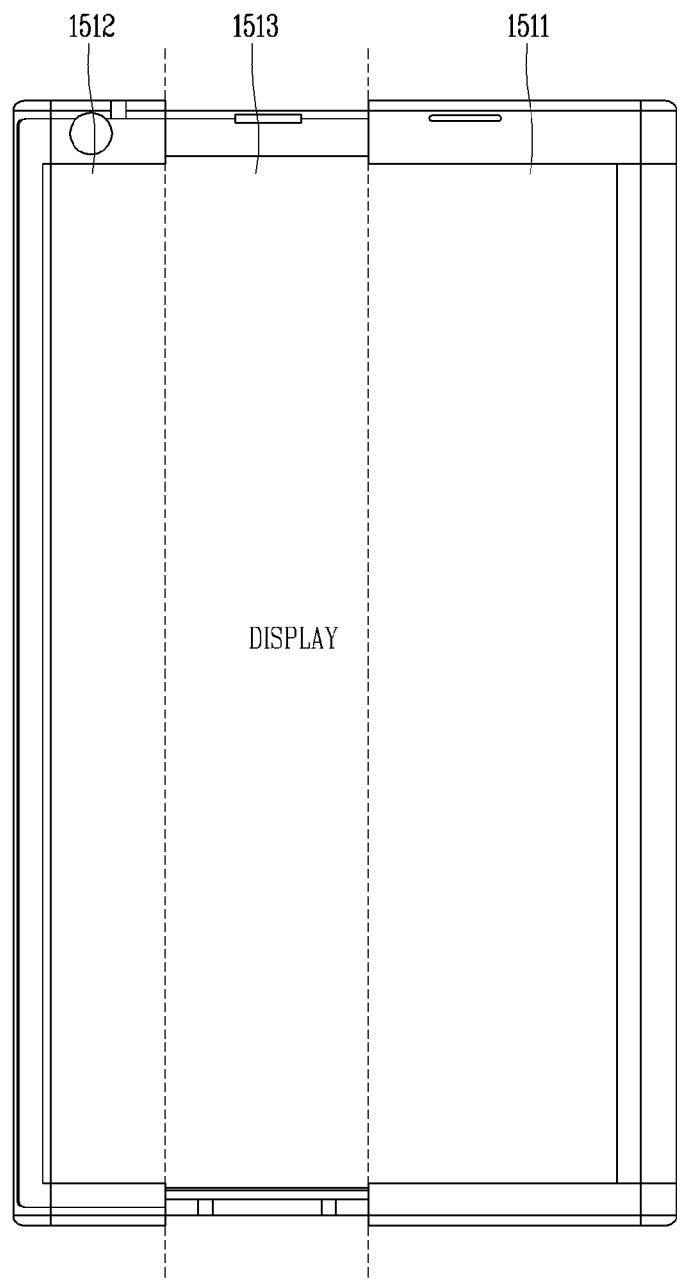
FIG. 8A is a diagram illustrating an antenna arrangement in a display-in state, namely, a closed state of a rollable device.
Figure 8A:
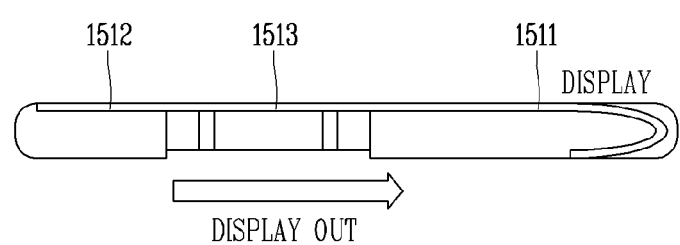
Figure 8B:
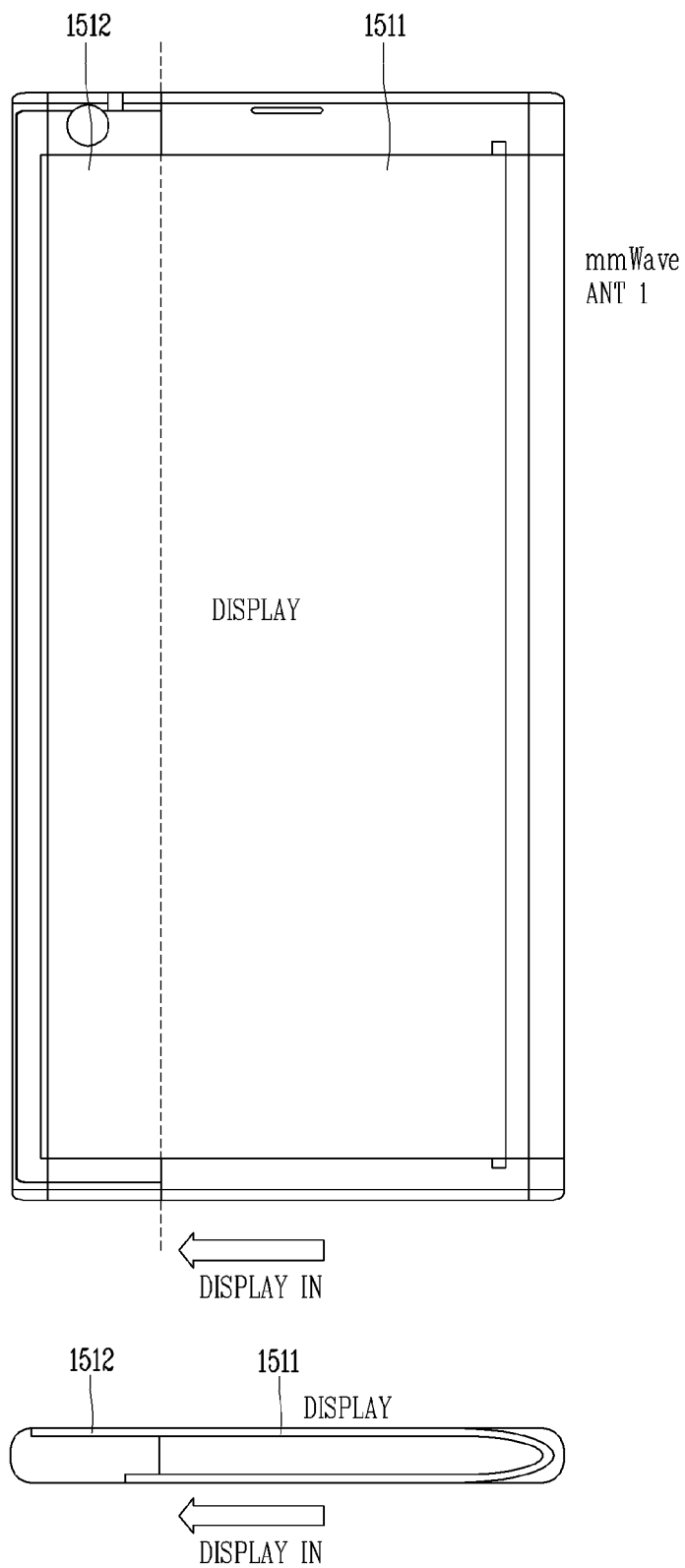
FIG. 8B is a diagram illustrating an antenna arrangement in a display-out state, namely, an open state of the rollable device.

1) Antenna arrangement structure using metal region and new antenna platform to maintain expandable front display 2) One-sided antenna arrangement structure for rollable display 3) Top and bottom antenna arrangement structure for edge-bending display 4) Antenna structure capable of minimizing the number of antennas and area (pattern) in zero-bezel structure, and capable of employing multi-band integrated design structure, adaptive antenna matching, and interference cancellation technology between antennas In this regard, FIG. 8A is a diagram illustrating an antenna arrangement in a display-in state, namely, a closed state of a rollable device. FIG. 8B is a diagram illustrating an antenna arrangement in a display-out state, namely, an open state of the rollable device.

Figure 8C:
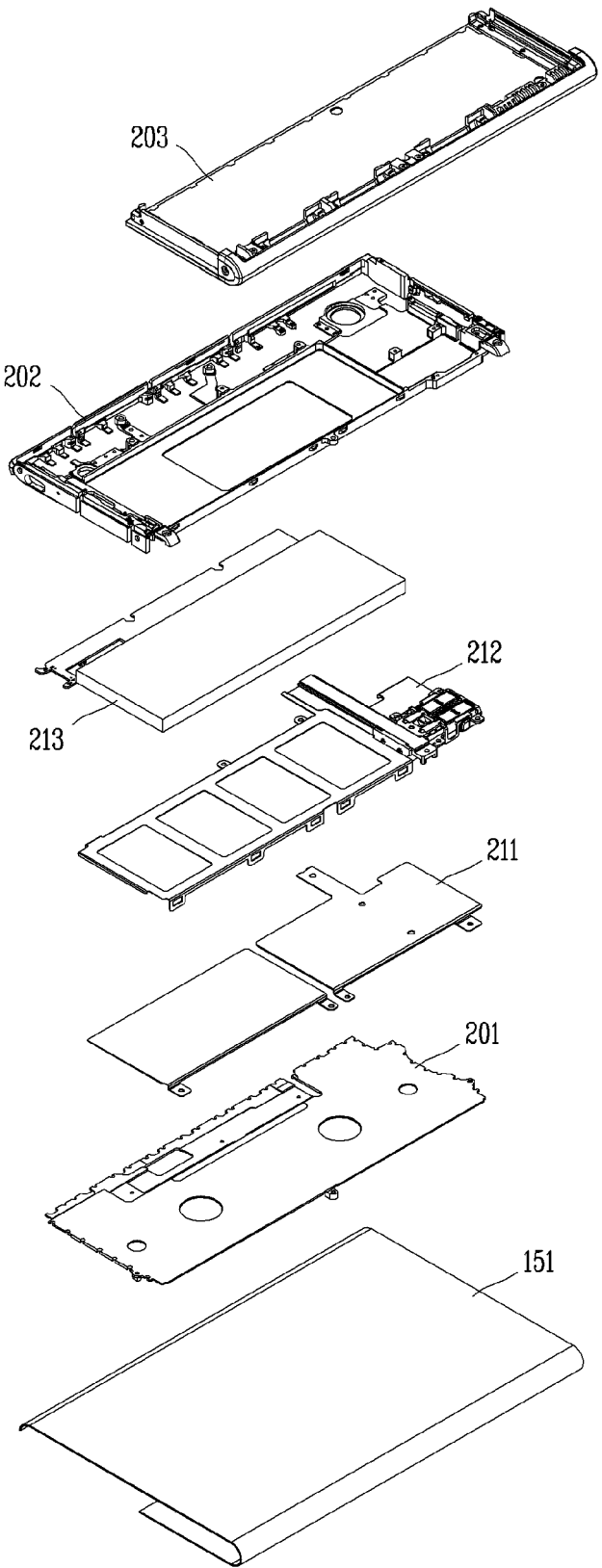
FIG. 8C is an exploded view of parts constituting a rollable device in accordance with the present disclosure.
Figure 8D:
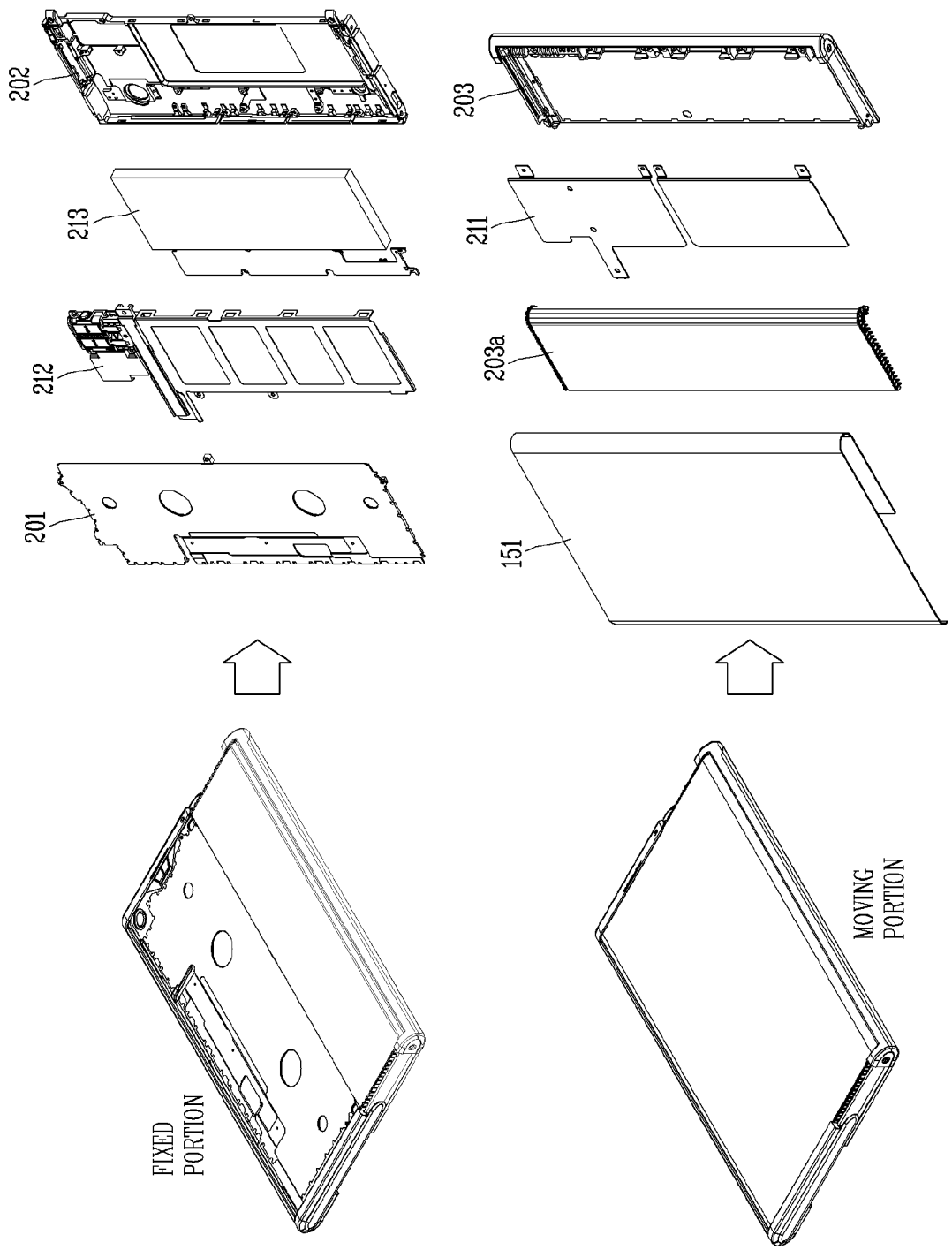
FIG. 8D is a configuration diagram of parts constituting a fixed portion and a moving portion of the rollable device.

FIG. 8C is an exploded view of parts constituting a rollable device in accordance with the present disclosure. FIG. 8D is a configuration diagram of parts constituting a fixed portion and a moving portion of the rollable device.

Referring to FIGS. 8C and 8D, the rollable device may include a display 151, a cover frame 201, a front cover 202, and a rear cover 203. In addition, the rollable device may further include an inner cover 211, a middle cover 212, and a PCB/battery module 213.

The display 151 may include a fixed portion and a moving portion. In this regard, referring to FIGS. 8A to 8D, the first region 1511 and the second region 1512 of the display 151 may correspond to the moving portion. On the other hand, the third region 1513 of the display 151 may correspond to the fixed portion.

The cover frame 201, the middle cover 212, the PCB/battery module 213, and the front cover 202 may define the fixed portion of the rollable device.

The cover frame 201 may be arranged to define the fixed portion of the rollable device. The middle cover 212 is referred to as a middle B housing, and may be disposed between the inner cover 211 and the PCB/battery module 213 with a motor interposed therebetween. The PCB/battery module 213 is a module in which a PCB corresponding to a circuit board and a battery are coupled, and may be disposed between the middle cover 212 and the front cover 202. The front cover 202 may be configured to accommodate the PCB/battery module 213 and engage with the rear cover 203. The front cover 202 may be formed of a metal frame, and segmented metal rims may be disposed on one side region of the front cover 202 to operate as antennas.

The display 151, the inner cover 211, and the rear cover 203 may define the moving portion of the rollable device.

The first region 1511 and the second region 1512 of the display 151 may correspond to the moving portion. The inner cover 211 may be disposed between the cover frame 201 and the middle cover 212 so as to define the moving portion of the rollable device. The rear cover 203 may be coupled to an RF guide 203a. The rear cover 203 may configure a rear body of the rollable device and may define the moving portion of the rollable device.

Figure 9A:
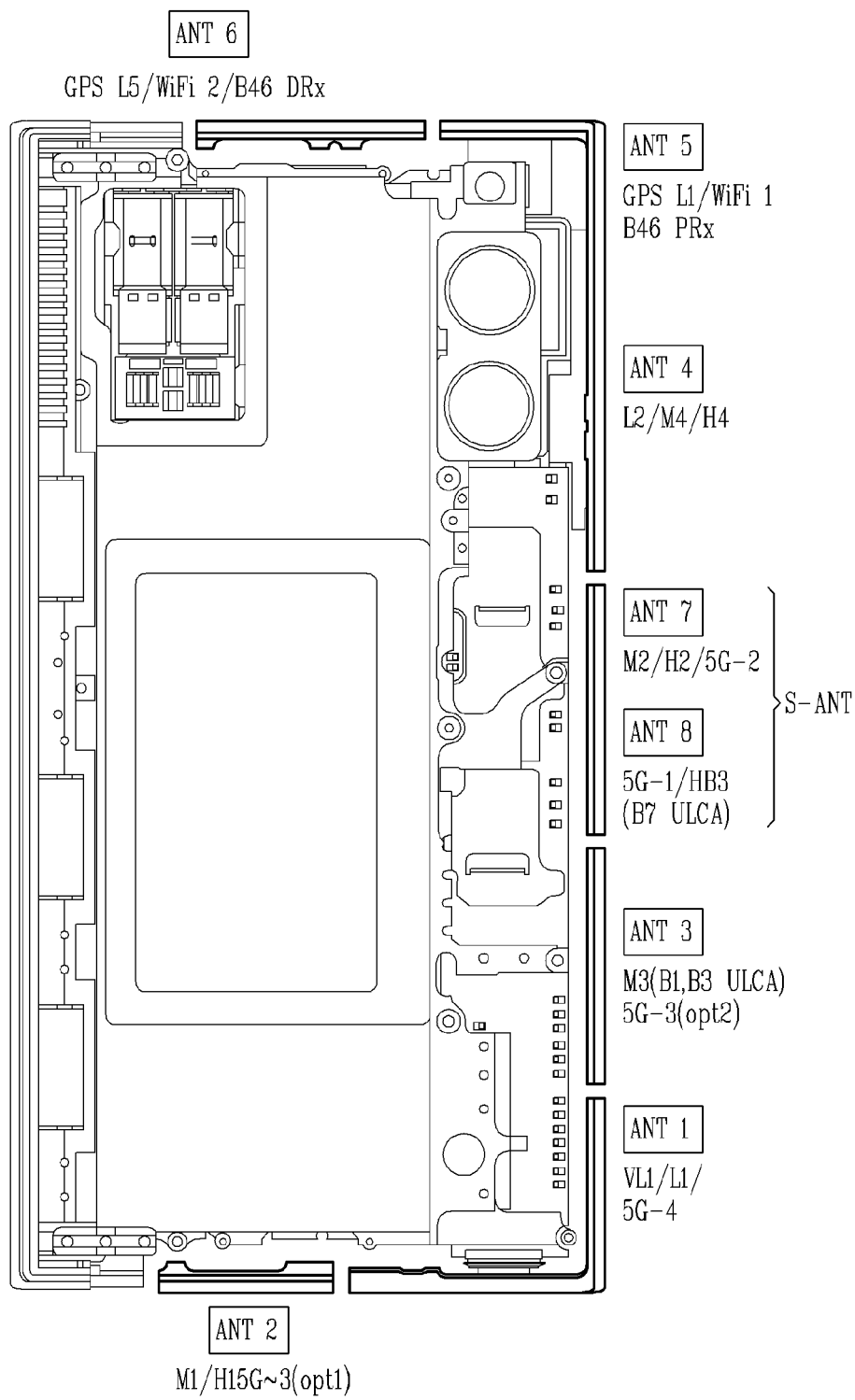
FIG. 9A is a configuration diagram illustrating antennas that can be arranged on a rim region including one side region of an electronic device corresponding to a rollable device.
Figure 9B:
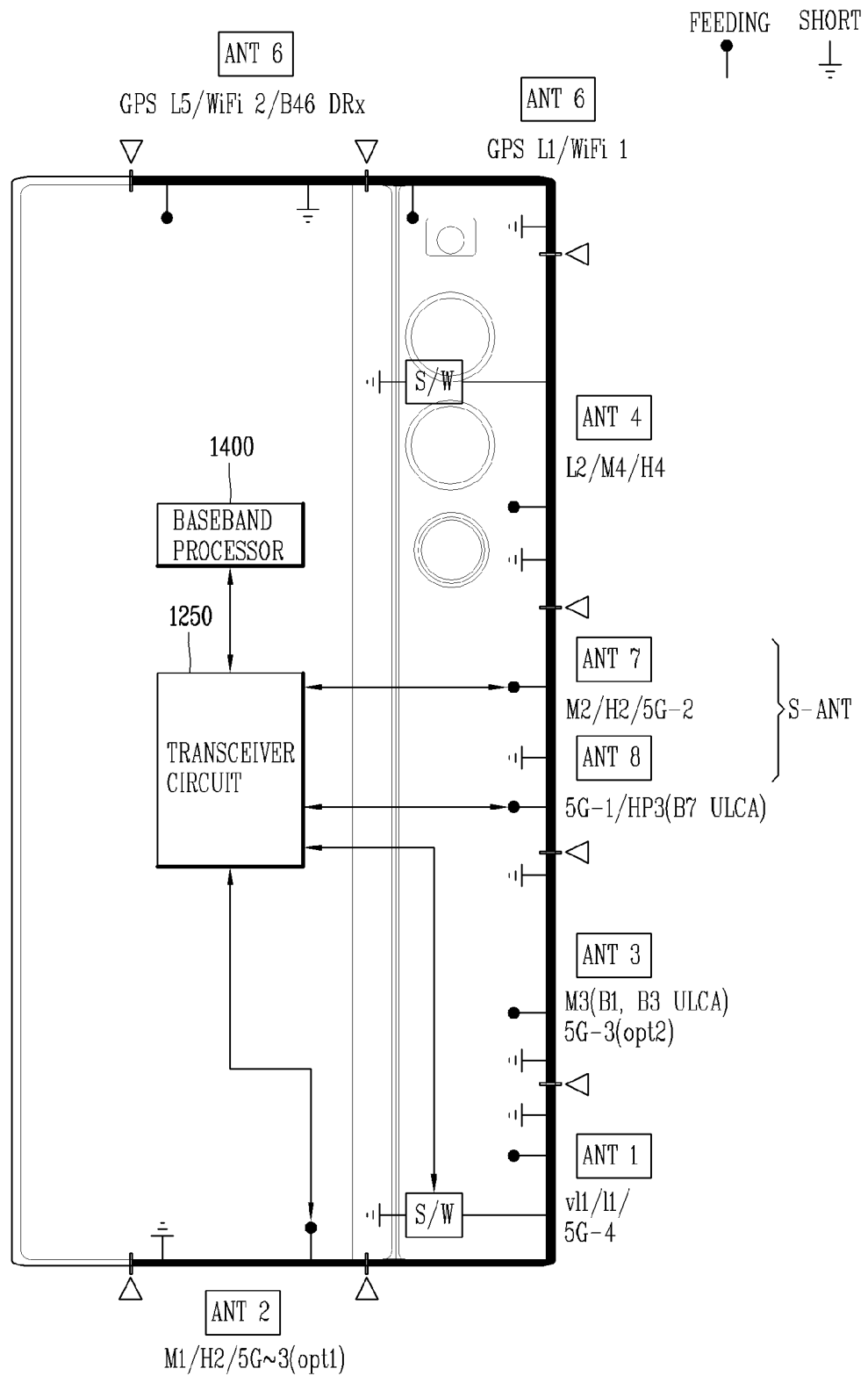
FIG. 9B is a configuration view illustrating an arrangement of antennas, which may be disposed on a rim region including one side region of an electronic device corresponding to a rollable device, a transceiver circuit, and a processor.

FIG. 9A is a configuration diagram illustrating antennas that can be arranged on a rim region including one side region of an electronic device corresponding to a rollable device. FIG. 9B is a configuration view illustrating an arrangement of antennas, which may be disposed on a rim region including one side region of an electronic device corresponding to a rollable device, a transceiver circuit, and a processor.

Referring to FIGS. 3, 4, and 7A to 9B, the electronic device corresponding to the rollable device may include the plurality of frames 101 to 103, the flexible display 151 and an antenna ANT. In this regard, the plurality of frames may include the first frame 101, the second frame 102, and the third frame 103.

The second frame 102 may be configured to be slidable in the first direction relative to the first frame 101. The third frame 103 may be located on the rear surface of the second frame 102 and may be configured to be movable in the first direction relative to the second frame 102. In this regard, the first frame 101 may be located on a side surface of the electronic device and may be configured as a metal frame including a plurality of metal rims.

For example, the side surface portion 1014 of the first frame 101 may be defined by a plurality of metal rims segmented by slits. The plurality of segmented metal rims may operate as different antennas from one another. These different antennas may be disposed on the side surface portion 1014 of the electronic device corresponding to the rollable device, and may also be disposed on upper and lower regions extending from the side surface portion 1014.

The flexible display 151 may include the first region 1511, the second region 1512, and the third region 1513. The first region 1511 may be coupled to the front surface of the first frame 101. The second region 1512 may be coupled to the third frame 103. The third region 1513 may be located between the first region 1511 and the second region 1512.

An antenna ANT may be implemented as one of the plurality of metal rims, and connected to a first feeding unit F1 and a second feeding unit F2, so as to radiate signals through different bands.

The plurality of antennas disclosed herein may include first to sixth antennas ANT1 to ANTE in addition to a shared antenna S-ANT. In this regard, the plurality of antennas ANT may further include a seventh antenna ANT7 operated by the first feeding unit F1 and an eighth antenna ANT8 operated by the second feeding unit F2.

The transceiver circuit 1250 may be operably coupled to the antennas ANT. The transceiver circuit 1250 may be configured to control signals transmitted to the antennas ANT through the first feeding unit F1 and the second feeding unit F2. The transceiver circuit 1250 may be operably coupled to the first to eighth antennas ANT1 to ANT8. The transceiver circuit 1250 may be configured to control signals transmitted to the first to eighth antennas ANT1 to ANT8 through the different feeding units.

The processor 1400 may be operably coupled to the transceiver circuit 1250. The processor 1400 may be a baseband processor corresponding to a modem. The processor 1400 may be configured to perform carrier aggregation (CA) through the antennas ANT. In this regard, the antennas ANT may be configured to operate in a mid-band (MB) and a high-band (HB) by the first feeding unit F1. For example, the processor 1400 may control the transceiver circuit 1250 to perform the CA in the mid-band (MB) and the high-band (HB) through the antennas ANT operated by the first feeding unit F1.

The shared antenna S-ANT may be configured to operate in the high-band (HB) by the second feeding unit F2. For example, the processor 1400 may control the transceiver circuit 1250 to perform the CA in the mid-band (MB) and the high-band (HB) through the shared antenna S-ANT operated by the first feeding unit F1 and the second feeding unit F2. In this case, MIMO may be performed in the high-band HB together with the CA through the shared antenna S-ANT operated by the first feeding unit F1 and the second feeding unit F2.

In this regard, a very-low-band VLB, a low-band LB, a mid-band MB, a high-band HB and an ultra-high-band UHB may be set as follows. In this case, a plurality of communication systems may be provided through the corresponding bands. A first communication system and a second communication system may be provided through the corresponding bands. For example, a 4G LTE communication system and a 5G NR communication system may be provided through the corresponding bands.

The ultra-low-band VLB may be 617 MHz to 750 MHz, but is not limited thereto, and may be changed depending on applications. For example, the low-band LB may be 750 MHz to 960 MHz, but is not limited thereto, and may be changed depending on applications. The mid-band LB may be 1710 MHz to 2200 MHz, but is not limited thereto, and may be changed depending on applications. The high-band HB may be 2300 MHz to 2700 MHz, but is not limited thereto, and may be changed depending on applications. The ultra-high-band VHB may be 3400 MHz to 3700 MHz, but is not limited thereto, and may be changed depending on applications.

The plurality of antennas ANT1 to ANT8 disclosed herein may be disposed on one side region of the electronic device. Accordingly, an antenna arrangement structure suitable for a rollable form factor is proposed by the plurality of antennas ANT1 to ANT8 disclosed herein. That is, a one-sided antenna arrangement due to a rolling structure is proposed. Meanwhile, some of the plurality of antennas ANT1 to ANT8 may be disposed on partial regions of the upper and lower regions of the rollable device. For example, the first antenna ANT1 may be disposed on one side region, that is, the first frame 101 and a part of the lower region.

The plurality of antennas may be disposed on an upper region of the rollable device based on the shared antenna S-ANT.

The shared antenna S-ANT may be disposed on one side region of the electronic device, for example, on the first frame 101. The first antenna ANT1 may be disposed on one side region and the lower region of the electronic device. The first antenna ANT1 may be configured to operate in a first band of a 5G communication system. Meanwhile, the shared antenna S-ANT may be configured to operate in a second band higher than the first band and a third band higher than the second band. In this regard, the first band may be configured to include an ultra-low-band VLB and a low-band LB, but is not limited thereto. The second band may be configured as a mid-band MB, but is not limited thereto. The third band may be configured to include a high-band HB and an ultra-high-band UHB, but is not limited thereto.

The second antenna ANT2 may be spaced apart from one end of the first antenna ANT1 and may be disposed on the lower region. The second antenna ANT2 may be spaced apart from the first antenna ANT1 by a slit, and a dielectric material may be disposed in a slit region. The third antenna ANT3 may be spaced apart from another end of the first antenna ANT1 and may be disposed on the one side region. The third antenna ANT3 may be spaced apart from the first antenna ANT1 by a slit, and a dielectric material may be disposed in a slit region. The third antenna ANT3 may be arranged to be spaced apart from the shared antenna S-ANT by a predetermined distance on the one side region. The third antenna ANT3 may be spaced apart from the shared antenna S-ANT by a slit, and a dielectric material may be disposed in a slit region.

A plurality of antennas may also be disposed on the upper region of the rollable device based on the shared antenna S-ANT.

The fourth antenna ANT4 may be spaced apart from one end of the shared antenna S-ANT, and may be disposed on the one side region. The processor 1400 may control the transceiver circuit 1250 to perform MIMO in the second band and/or the third band through the shared antenna S-ANT and the second to fourth antennas ANT2 to ANT4. In this regard, the processor 1400 may perform CA through antennas operating in both the second band and the third band. In addition, the processor 1400 may perform CA and MIMO simultaneously through those antennas operating in both of the second band and the third band.

In this regard, four MB/HB antennas for supporting 4×4 MIMO may be provided in the present disclosure. An MB/HB first antenna may be implemented as the second antenna ANT2, and may be an antenna exhibiting optimal antenna performance. An MB/HB second antenna may be implemented as the seventh antenna ANT7 to minimize interference with an MB/HB first Tx antenna. The MB/HB third antenna may be designed separately because it includes Tx for UL CA. The MB/HB third antenna may be implemented as the third antenna ANT3. The MB/HB third antenna may include MB3 (B1/B3 Tx ULCA) and HB3 (B7 Tx ULCA). The MB/HB fourth antenna may operate as a shared antenna that also operates as an LB (2nd) antenna. The MB/HB fourth antenna may be implemented as the fourth antenna ANT4. 4×4 MIMO can be supported through the MB/HB first antenna to the MB/HB fourth antenna.

Two LB antennas may be disposed on a side surface of the electronic device to support 2×2 MIMO. In addition, in order to reduce interference between the LB antennas, the two LB antennas may be disposed on an upper end corresponding to the upper region and a lower end corresponding to the lower region. An LB first antenna may be implemented as the first antenna ANT1. From the perspective of a ground, the LB first antenna may be disposed in a region where E-Field is most widely distributed, so as to ensure antenna performance. In addition, an LB second antenna may be implemented as the fourth antenna ANT4 to minimize interference with a lower antenna, thereby ensuring isolation.

Four 5G (Sub-6) antennas may be arranged on a side region of the rollable device. In order to increase data throughput, a 5G (Sub-6) first antenna and a 5G (Sub-6) second antenna may also operate as LTE antennas. Therefore, the number of antennas can be minimized by virtue of the 5G (Sub-6) antennas operating even as the LTE antennas. In addition, the 5G (Sub-6) first antenna and the 5G (Sub-6) second antenna may be a shared antenna S-ANT implemented as one conductive member. In this regard, the 5G (Sub-6) first antenna may be implemented as the seventh antenna ANT7, and the 5G (Sub-6) second antenna may be implemented as the eighth antenna ANT8.

The seventh antenna ANT7 and the eighth antenna ANT8 share one conductive member, and may be configured to connect an antenna body corresponding to the conductive member to a ground frame, in order to reduce mutual interference. As the antenna body and the ground frame are connected to each other, the shared antenna S-ANT operating as the seventh antenna ANT7 and the eighth antenna ANT8 may be implemented as a T-type antenna.

Meanwhile, the 5G second antenna, the 5G third antenna, and the 5G fourth antenna may be arranged in a manner of sharing an antenna with an LTE Legacy. In this regard, the shared antenna S-ANT and the first antenna ANT1 to the third antenna ANT3 may be the shared antennas operating in both 5G (Sub-6) NR band and 4G LTE band. For example, an antenna used as a metal frame may be used as an LTE Legacy antenna, and a 5G (Sub-6) antenna may be designed as a metal pattern on a rear surface portion. However, it is not limited to this structure, and both the 5G (Sub-6) antenna and the LTE Legacy antenna may be implemented as the metal frame.

The fifth antenna ANT5 may be spaced apart from one end of the fourth antenna ANT4 and disposed on one side region and the upper region of the electronic device. The sixth antenna ANT6 may be spaced apart from one end of the fifth antenna ANT5 and may be disposed on the upper region of the electronic device. The processor 1400 may control the transceiver circuit 1250 to perform diversity in the LTE communication system through the fifth antenna ANT5 and the sixth antenna ANT6.

Connectivity antennas such as the fifth antenna ANT5 and the sixth antenna ANT6 may be disposed on a top of the rollable device. A GPS L1 antenna may be implemented as the fifth antenna ANT5, and a GPS L5 antenna may be implemented as the sixth antenna ANT6. Accordingly, the GPS L5 antenna and the GPS L1 antenna can be designed separately. The fifth antenna ANT5, which operates as GPS L1 (1.575 Ghz) and WiFi first antenna, may be disposed on the top so as to be implemented as an antenna strong for body effects. Diversity may be performed in an LTE B46 band through the fifth antenna ANT5 and the sixth antenna ANT6. Accordingly, information included in a signal received through the fifth antenna ANT5 and information included in a signal received through the sixth antenna ANT6 may be the same information (data). The fifth antenna ANT5 may receive a PRx signal through a primary channel. The sixth antenna ANT6 may receive a DRx signal through a diversity channel. Information included in the PRx signal and information included in the DRx signal may be the same information (data).

The plurality of antennas ANT1 to ANT8 may be disposed on the fixed portion of the electronic device corresponding to the rollable device. On the other hand, a driving unit that allows the display region of the rollable device to be switched between the first state and the second state may be disposed on another side region of the rollable device. The driving unit may include a roller 1028 that allows the second frame 102 and the third frame 103 to be movable.

In this regard, when the second frame 102 is slid in the first direction relative to the first frame 101, an area of the third region 1513 which is located in the first direction of the first region 1511 of the flexible display is widened, and the state of the flexible display is switched from the first state to the second state. Here, the first state may be a display-out state, that is, a closed state, and the second state may be a display-in state, that is, an open state.

Hereinafter, a feeding structure and a ground shorting structure of the plurality of antennas disposed on the fixed portion of the rollable device will be described with reference to FIG. 9B.

The first antenna ANT1 is provided with a switch for covering the LB band, for example, a B71 band (617 to 698 MHz) and a B8 band (880 to 960 MHz). The switch of the first antenna ANT1 may be disposed at a position 10 to 12 mm apart from the feeding unit based on a Y axis, so as to ensure a range capable of sweeping frequencies as large as possible. The switch of the first antenna ANT1 may be implemented as a SP4T switch and operate in at least three or more frequency sweep scenarios. The antenna performance can be secured by implementing the first antenna ANT1 corresponding to the LB antenna to have a size of at least 60 mm or more.

With respect to the second antenna ANT2, there may be a restriction that an additional antenna metal pattern cannot be used due to interference of a mechanical structure corresponding to the driving unit of the rollable device. An MB/HB dual mode may be generated by using various antenna paths in an FPCB including an antenna feeding unit. In addition, the second antenna ANT2 may be configured to generate an additional mode for sharing a 5G-3 (Sub-6) antenna in addition to the LTE antenna.

With respect to the second antenna ANT6, there may be a restriction that an additional antenna metal pattern cannot be used due to interference of a mechanical structure corresponding to the driving unit of the rollable device. The sixth antenna ANT6 may generate a GPS L5 (1.2 Ghz) and WiFi dual mode by utilizing various antenna paths in the FPCB including the antenna feeding unit, in order to cover the GPS L5 (1.2 Ghz) and WiFi band.

The third antenna ANT3 may be configured to cover the MB (3rd & B1, B3 ULCA)/5G-3 (option2) band. The third antenna ANT3 may arrange a feeding point at a middle position of an antenna body to avoid interference with the adjacent first antenna ANT1 and eighth antenna ANT5. In addition, a device implemented as a specific element may be inserted into a short portion of an antenna end to select a Loop & IFA mode. The device implemented as the specific element may be a device having specific L and C values.

In this regard, the third antenna ANT3 may be connected to or disconnected from the ground at one end thereof spaced apart from the feeding unit for feeding the third antenna ANT3 and another end. Accordingly, the third antenna ANT3 may operate in a first mode in which the one end and the another end are connected to the ground, or in a second mode in which one of the one end and the another end is connected to the ground. Here, the first mode may be a loop mode and the second mode may be an IFA mode.

The fourth antenna ANT4 may operate as an LB second antenna. The fourth antenna ANT4 may generate an antenna mode using an antenna body corresponding to a conductive member. The fourth antenna ANT4 may also operate as an MB & HB fourth antenna. The fourth antenna ANT4 may be configured by generating an additional antenna metal pattern on a dielectric carrier. In addition, the fourth antenna ANT4 may be spaced apart 10 to 15 mm from the feeding unit based on an Y axis, in order to install the LB switch S/W.

The fourth antenna ANT4 may be configured to be connected to or disconnected from the ground through the switch S/W. In this regard, when the fourth antenna ANT4 operates in the second band and the third band, the fourth antenna ANT4 may be configured to have an antenna pattern disposed on a carrier inside the electronic device. That is, the fourth antenna ANT4 may be configured to radiate signals of the second band and the third band through the antenna pattern disposed on the carrier inside the electronic device. On the other hand, when the fourth antenna ANT4 operates in the first band, the fourth antenna ANT4 may be configured to have a conductive member. That is, the fourth antenna ANT4 may be configured to radiate a signal of the first band through the conductive member.

The fifth antenna ANT5 may operate as a GPS L1 (1.575 Ghz) and WiFi first antenna. The fifth antenna ANT5 may generate an antenna mode for minimizing interference with the fourth antenna ANT4 and the sixth antenna ANTE. Also, an L/C device having a specific L/C value may be inserted into an antenna short portion. The GPS antenna may be vulnerable to noise generated during USB charging and hand-effects of a consumer-use scene, and thus may be placed on a top of the electronic device.

The shared antenna S-ANT may be configured such that one point between the first feeding unit F1 and the second feeding unit F2 is connected to the ground. In this regard, a signal of the second band or the third band may be transmitted by being delivered to the shared antenna S-ANT through the first feeding unit F1. In addition, the signal of the third band may be transmitted by being delivered to the shared antenna S-ANT through the second feeding unit F2.

The shared antenna S-ANT may be functionally configured to include a seventh antenna ANT7 and an eighth antenna ANT8. The seventh antenna ANT7 and the eighth antenna ANT8 share a conductive member corresponding to the same antenna body. A main ground and a metal body may be connected to each other at a midpoint of the antenna body to be used as a common short of the seventh antenna ANT7 and the eighth antenna ANT8. A band to be covered by the seventh antenna ANT7 is lower than a band to be covered by the eighth antenna ANT8. Accordingly, the seventh antenna ANT7 may have a short point so as to have an antenna body longer than that of the eighth antenna ANT8. Also, with respect to the eighth antenna ANT8, since 5G-1 includes Tx, the number of shared LTE Legacy bands can be minimized. In addition, with respect to the eighth antenna ANT8, a 5G-1 band may be arranged in a frequency band adjacent to the LTE HB.

Like other antennas, a switch element that can use an L/C element may be inserted into an end of the shared antenna S-ANT to selectively use the Loop & IFA mode. Accordingly, the shared antenna S-ANT may be configured to be connected to or disconnected from the ground at one point and another point spaced apart from the feeding unit feeding the shared antenna S-ANT. Accordingly, the shared antenna S-ANT may operate in a first mode in which the one point and the another point are connected to the ground, or in a second mode in which one of the one point and the another point is connected to the ground. Here, the first mode may be a loop mode and the second mode may be an IFA mode.

For example, the seventh antenna ANT7 may be configured to be connected to or disconnected from the ground at one point and another point spaced apart from the feeding unit feeding the seventh antenna ANT7. Accordingly, the seventh antenna ANT7 may operate in a first mode in which the one point and the another point are connected to the ground, or in a second mode in which one of the one point and the another point is connected to the ground. Here, the first mode may be a loop mode and the second mode may be an IFA mode.

For example, the eighth antenna ANT8 may be configured to be connected to or disconnected from the ground at one point and another point spaced apart from the power feeding unit feeding the seventh antenna ANT8. Accordingly, the eighth antenna ANT8 may operate in a first mode in which the one point and the another point are connected to the ground, or in a second mode in which one of the one point and the another point is connected to the ground. Here, the first mode may be a loop mode and the second mode may be an IFA mode.

With respect to deployment structures and operations of the plurality of antennas described above, the main technical features of the plurality of antennas will be described as follows.

Figure 10A:
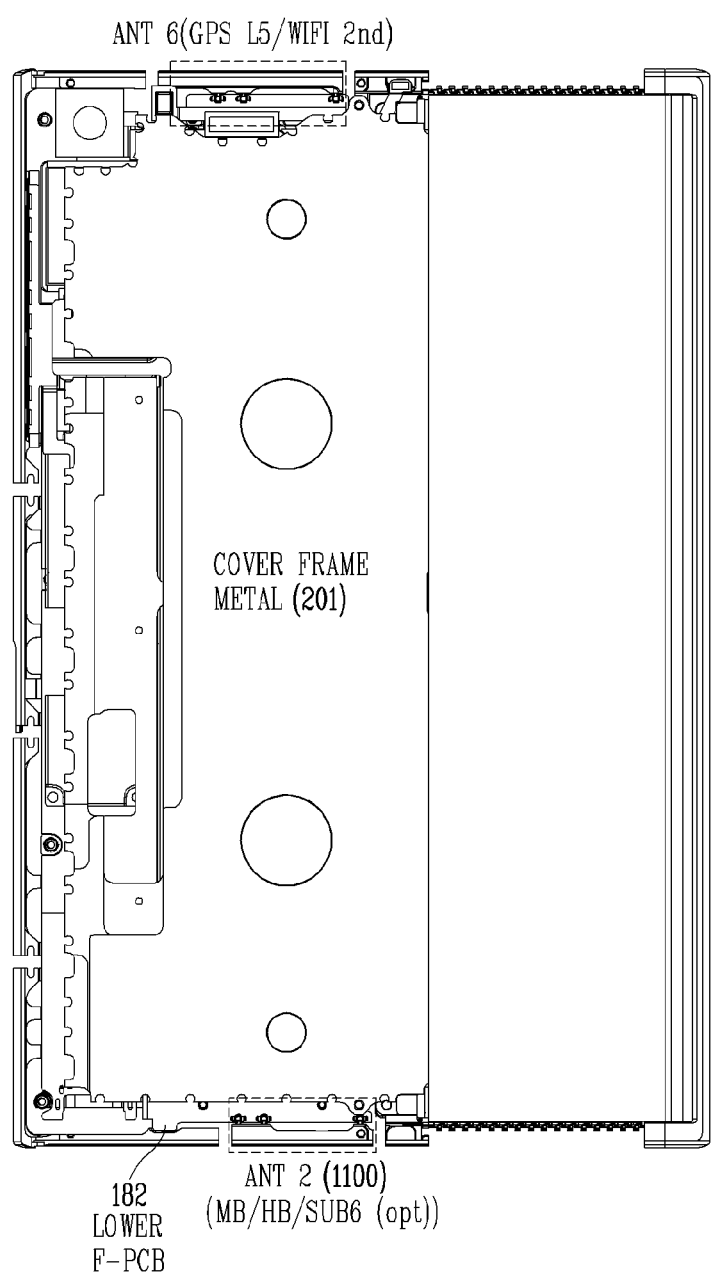
FIG. 10A is a view illustrating a conductive member configured as a metal frame corresponding to a lower region of a rollable device, and a circuit board capable of being disposed in an open region of the metal frame.
Figure 10B:
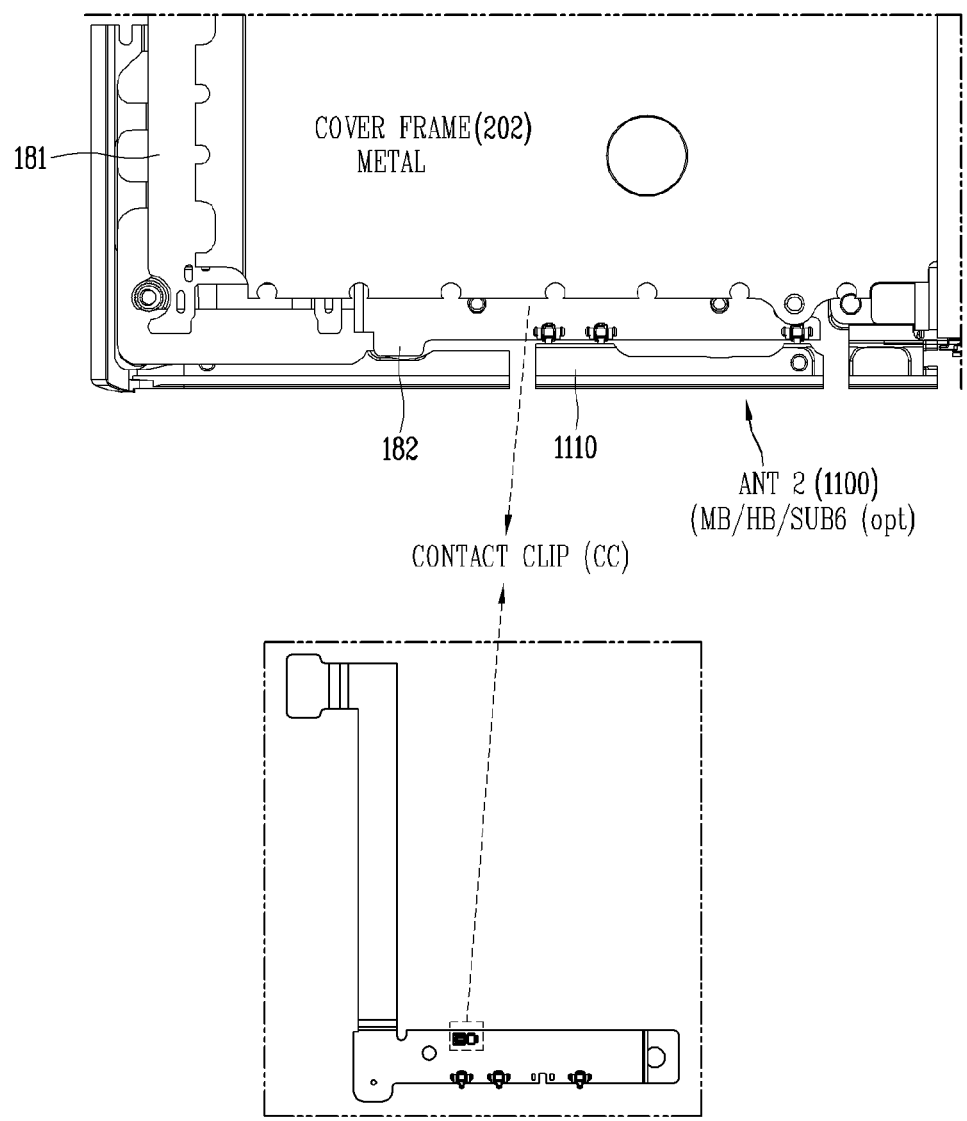
FIG. 10B is an enlarged view of the lower region of the rollable device and the circuit board illustrated in FIG. 10A.

1) Reduction of the total number of antennas by designing a compact antenna and LTE+5G Sub6 combined antenna
  LB antenna miniaturization: Side type antenna and T type antenna structures
  Fixed PIFA: Securing broadband characteristics using coupled monopole type antenna without additional metal pattern
2) Application of low-loss SP4T switch for LB antenna switching
  Securing diversity of band-specific antenna operations through SP4T switch arrangement for broadband coverage
3) Metal pattern-less antenna design by antenna arrangement in one side region of rollable device
  Metal pattern-less antenna design by arranging antennas (e.g., the second antenna ANT2 and the fifth antenna ANT5) on upper and lower ends of rollable device to operate only as conductive members Accordingly, the plurality of antennas disposed in the rollable device disclosed herein has the following technical characteristics.
  One-sided antenna arrangement structure for rollable display
  Antenna space reduction by combining plural bands in single conductive member for securing antenna space upon arrangement on side surfaces.
  Proper deployment of Loop and IFA type structures for minimizing interference between antennas
  Insertion of grounding structure for removing unnecessary resonance due to rollable mechanical structure At least one of the plurality of antennas disposed in the rollable device described herein may be dynamically configured to operate in different bands. In this regard, FIG. 10A is a view illustrating a conductive member configured as a metal frame corresponding to a lower region of a rollable device, and a circuit board capable of being disposed in an open region of the metal frame. FIG. 10B is an enlarged view of the lower region of the rollable device and the circuit board illustrated in FIG. 10A.

Figure 11A:
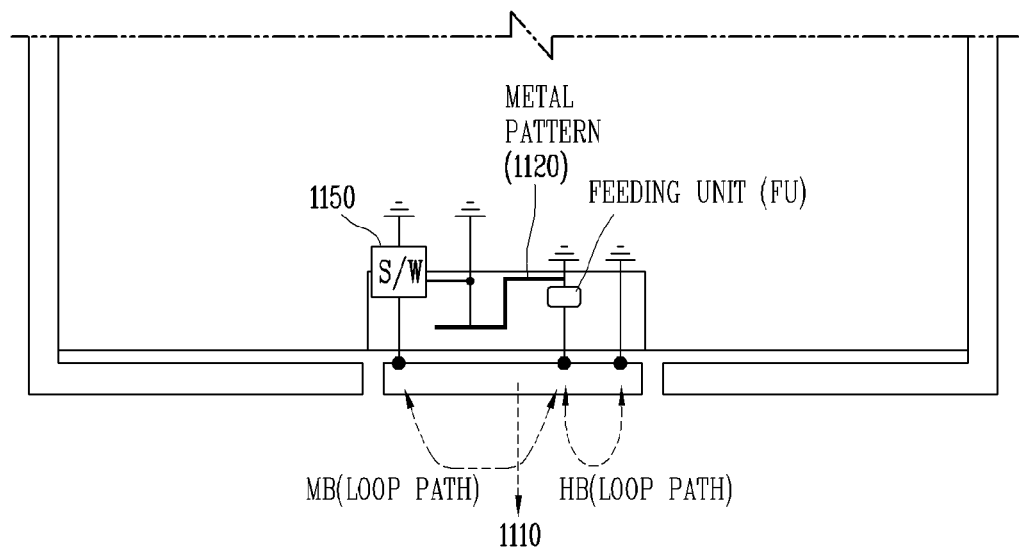
FIG. 11A is a view illustrating a configuration in which an antenna provided in a lower end portion of a rollable device disclosed herein operates in a broad band using the inner metal pattern and a switch.
Figure 11B:
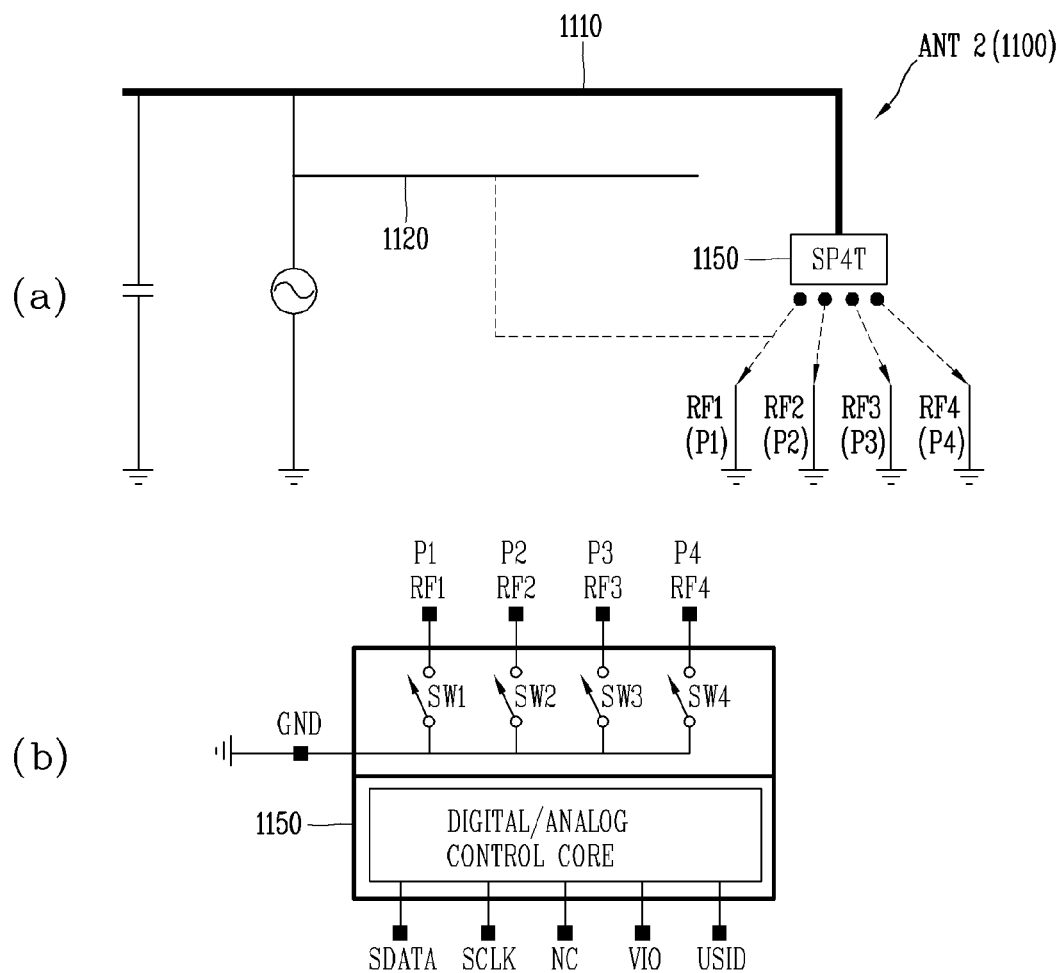
FIG. 11B is a view illustrating a detailed configuration of an equivalent circuit of the antenna configuration of FIG. 11A and a switching unit.

On the other hand, FIG. 11A is a view illustrating a configuration in which an antenna provided on a lower end portion of a rollable device disclosed herein operates in a broad band using the inner metal pattern and a switch. FIG. 11B is a view illustrating a detailed configuration of an equivalent circuit and a switching unit of the antenna configuration of FIG. 11A.

As illustrated in FIG. 8B, when the slide of the rollable device is closed, it may be referred to as a display-in state or a slide-close state. As illustrated in FIGS. 8A and 10A, when the slide of the rollable device is open, it may be referred to as a display-out state or a slide-open state.

The present disclosure is to improve deviation of antenna characteristics in a slide-close state and a side-open state of a rollable device. Specifically, antenna impedance matching characteristics and antenna efficiency may change depending on a change in size of a ground by the driving unit of the rollable device. Referring to FIGS. 8A and 10A, in the slid-open state, the display is expanded by a predetermined length and the ground size increases. In this regard, characteristics of the second antenna ANT2 at the bottom and the sixth antenna ANTE at the top overlapping the driving unit may change greatly.

Accordingly, by changing a switch topology of the switch unit, it is intended to improve the deviation of antenna characteristics in the slide-close state and the slide-open state. In this regard, the second antenna ANT2 disposed at the bottom may operate in a loop mode to operate as an antenna in the MB band and the HB band. In addition, the second antenna ANT2 may operate as an antenna in a 5G Sub-6 band through a metal pattern on the FPCB including the feeding unit.

Referring to FIGS. 8A to 11B, the electronic device corresponding to the rollable device may include the plurality of frames 101 to 103, the flexible display 151 and an antenna. In this regard, the plurality of frames may include the first frame 101, the second frame 102, and the third frame 103.

The second frame 102 may be configured to be slidable in the first direction relative to the first frame 101. The third frame 103 may be located on the rear surface of the second frame 102 and may be configured to be movable in the first direction relative to the second frame 102. In this regard, the first frame 101 or the third frame 103 may be located on a side surface of the electronic device and may be configured as a metal frame including a plurality of metal rims.

For example, the side surface portion 1014 of the first frame 101 may be defined by a plurality of metal rims segmented by slits. The plurality of segmented metal rims may operate as different antennas from one another. These different antennas may be disposed on the side surface portion 1014 of the electronic device corresponding to the rollable device, and may also be disposed on upper and lower regions extending from the side surface portion 1014.

The flexible display 151 may include the first region 1511, the second region 1512, and the third region 1513. The first region 1511 may be coupled to the front surface of the first frame 101. The second region 1512 may be coupled to the third frame 103. The third region 1513 may be located between the first region 1511 and the second region 1512.

The antenna 1100 corresponding to the second antenna ANT2 may be implemented as one of a plurality of metal rims. The antenna 1100 corresponding to the second antenna ANT2 may be configured to be connected to a feeding unit (FU) at one point and connected to the ground through a switching unit (S/W) 1150 at another point. Accordingly, the antenna 1100 corresponding to the second antenna ANT2 may be configured to radiate signals through different bands.

The antenna 1100 may be disposed on a lower region of the electronic device corresponding to the rollable device. In this regard, the antenna 1100 may be configured to operate in the MB band through the conductive member 1110 corresponding to a left region of the feeding unit FU. In this case, a current flow in the antenna 1100 operating in the MB band may form a loop path and it may be referred to as an MB loop path. The antenna 1100 may be configured to operate in the HB band through the conductive member 1110 corresponding to a right region of the feeding unit FU. In this case, a current flow in the antenna 1100 operating in the HB band may form a loop path, and it may be referred to as an HB loop path. In this regard, the position of the feeding unit FU may be offset to the right side from a center of the conductive member 1110 because the HB band is a frequency band higher than the MB band. The antenna 1100 may also be configured to operate in the 5G Sub-6 band by using a metal pattern 1120 connected to the feeding unit FU.

As described above, the electronic device corresponding to the rollable device may include a plurality of antennas ANT1 to ANT5. The first antenna ANT1 may be disposed on one side region and the lower region of the electronic device. That is, the first antenna ANT1 may be configured as a metal frame defining the lower region and the one side region. The first antenna ANT1 may be configured to operate in the first band of the 4G communication system. Meanwhile, the antenna 1100 corresponding to the second antenna ANT2 may be configured to operate in the second band higher than the first band and the third band higher than the second band. In addition, the antenna 1100 corresponding to the second antenna ANT2 may be configured to operate in the Sub-6 band of the 5G communication system.

The antenna 1100 corresponding to the second antenna ANT2 may be configured such that one end portion and another end portion of the conductive member 1110, which is one of the plurality of metal rims, are connected to the ground. One end of the conductive member 1110 may be connected to the ground through the switching unit (S/W) 1150.

The antenna 1100 may include the conductive member 1110 and a metal pattern 1120 formed on the circuit board 182. The metal pattern 1120 may be formed on a circuit board 182 to extend by a predetermined length from the feeding unit FU at one point of the conductive member 1120. One point of the metal pattern 1120 may be connected to the ground and the switching unit (S/W) 1150. For example, the one point of the metal pattern 1120 may be connected to a control terminal of the switching unit (S/W) 1150. A connection state of an output terminal of the switching unit 1150 may change according to a control signal input through the control terminal.

The circuit board 182 may be configured as a separate board from the main circuit board 181 on which the transceiver circuit or the processor is disposed. The circuit board 182 may be implemented as a flexible printed circuit board (FPCB).

The antenna 1100 may be configured to operate in the first to third bands and the Sub-6 band of the 5G communication system through the switching of output terminals of the switching unit (S/W) 1150. The switching unit (S/W) 1150 may be configured as an SP4T switch having first to fourth output terminals.

The electronic device, as aforementioned, may include the transceiver circuit 1250 and the processor 1400. The transceiver circuit 1250 may be operably coupled to the antenna 1100 and configured to control the switching unit (S/W) 1150.

Figure 12A:
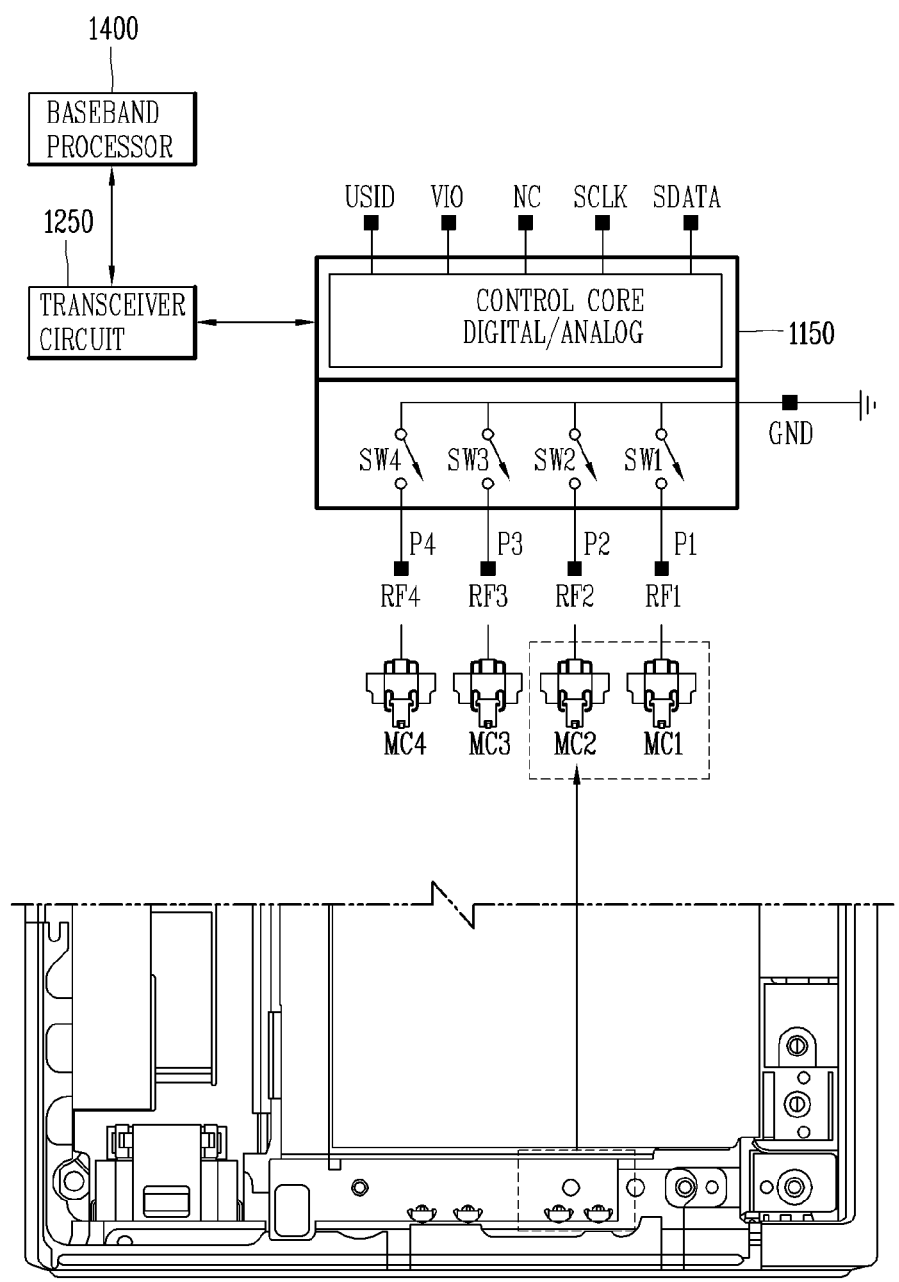
FIG. 12A is a view illustrating a configuration in which a switching unit is connected to the ground through an impedance matching circuit, in accordance with one implementation.
Figure 12B:
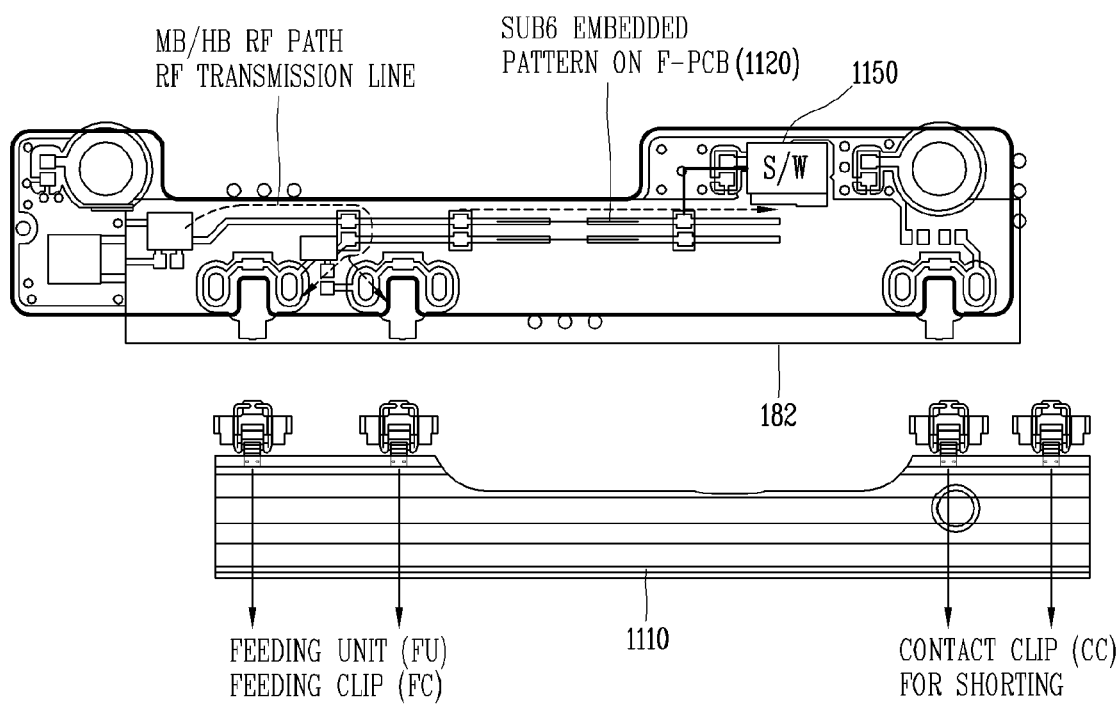
FIG. 12B is a view illustrating a configuration in which a circuit board with a switching unit is connected via a conductive member through a feeding unit.

The transceiver circuit 1250 may control the switching unit 1150 such that a specific output terminal of the switching unit 1150 can be connected to the ground. In this regard, FIG. 12A is a view illustrating a configuration in which a switching unit is connected to the ground through an impedance matching circuit, in accordance with one implementation. FIG. 12B is a view illustrating a configuration in which a circuit board with a switching unit is connected to a conductive member through a feeding unit.

Referring to FIG. 12A, the first to fourth output terminals P1 to P4 of the switching unit (S/W) 1150 may be connected to the ground through first to fourth switches SW1 to SW4. In this regard, the first to fourth switches SW1 to SW4 may be connected to the ground through first to fourth impedance matching circuits MC1 to MC4.

The switching unit (S/W) 1150 disposed on the circuit board 182 may be connected to the ground through the first to fourth impedance matching circuits MC1 to MC4.

Referring to FIG. 12B, the circuit board 182 where the switching unit (S/W) 1150 is disposed may be electrically connected to the conductive member 1110 through the feeding unit FU. Here, the feeding unit FU may be implemented as a feeding clip (FC), but is not limited to this. An RF transmission line of the circuit board 182 may be connected to the conductive member 1100 through the feeding clip FC. The RF transmission line forms an RF path in the MB band and HB band.

The feeding clip FC and a contact clip (CC) may all be connected to the conductive member 1110, but the present disclosure may not be limited thereto. In one example, the feeding clip FC may be connected to the conductive member 1110 and the contact clip CC may be connected to the cover frame 201. As another example, the feeding clip FC may be connected to the conductive member 1110 and the contact clip CC may be connected to the conductive member 1110 and a cover frame 201.

In this regard, a ground pad of the circuit board 182 configured to be connected to the output terminals of the switching unit (S/W) 1150 may be connected to the cover frame 201 of FIG. 8C through the contact clip CC. As another example, the ground pad of the circuit board 182 configured to be connected to the output terminals of the switching unit (S/W) 1150 may be connected to the conductive member 1110 through the contact clip CC.

Referring to FIGS. 9A to 12B, the transceiver circuit 1250 and the processor 1400 may be located on the separate circuit board 181, but the present disclosure may not be limited thereto. Some components of the transceiver circuit 1250 and the processor 1400 may be disposed on the circuit board 182 corresponding to the FPCB. The RFICs such as the switching unit (S/W) 1150 and the transceiver circuit 1250 are configured to be connected to the ground so as to be advantageous for coupling with the antenna. The switching unit (S/W) 1150 can optimize the antenna performance in various bands through first to fourth RF paths RF1 to RF4 corresponding to the first to fourth output terminals P1 to P4.

In this regard, the metal pattern 1120 may be disposed on the circuit board 182 such that the antenna 1100 can operate in the 5G Sub-6 band. Referring to FIGS. 10A to 12B, one point of the metal pattern 1120 may be electrically connected to the first output terminal of the switching unit (S/W) 1150. When the first output terminal of the switching unit (S/W) 1150 is connected to the ground through the first impedance matching circuit MC1, the antenna 1100 may operate in the Sub-6 band.

Figure 13:
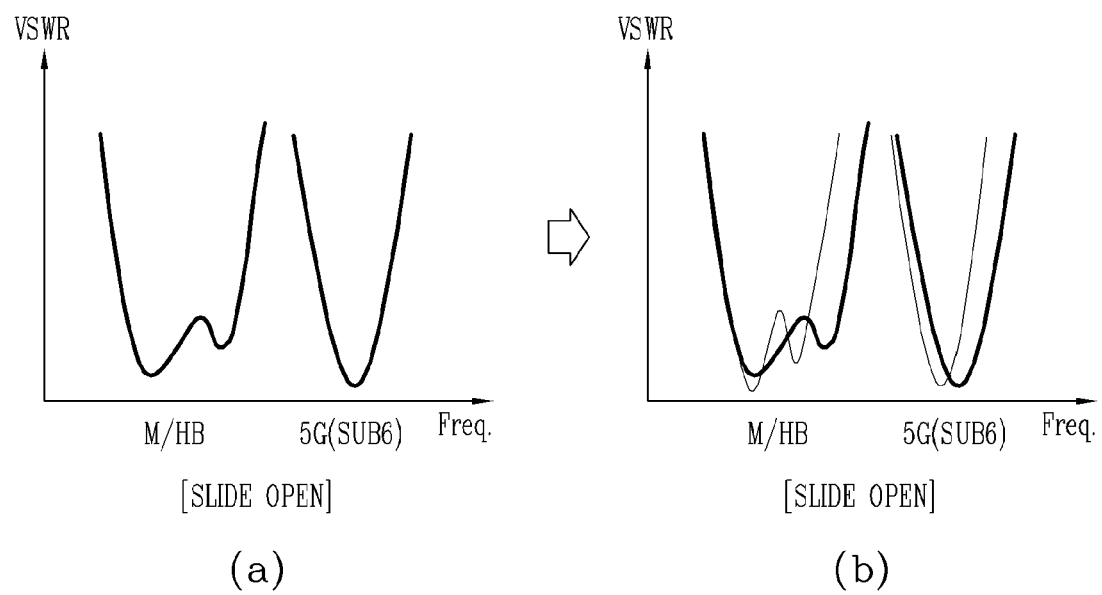
FIG. 13 is a view illustrating comparison results of voltage standing wave ratio (VSWR) characteristics of an antenna according to a closed state and an open state of a slide of a rollable device.

As aforementioned, the antenna 1100 can operate in different bands by controlling the connection state of the output terminals of the switching unit 1150. In this regard, FIG. 13 is a view illustrating comparison results of voltage standing wave ratio (VSWR) characteristics of an antenna according to a slide-close state and a slide-open state of a rollable device. (a) of FIG. 13 illustrates that the antenna operates to resonate in the MB/HB band and the Sub-6 band in the slide-close state of the rollable device. Referring to FIG. 11A and (a) of FIG. 13, the antenna 1100 forms a loop path branching from the feeding unit FU to both sides. The antenna 1100 may operate in a resonance mode in which it double-resonates in the MB/HB band along the loop path branching to the both sides. In addition, the antenna 1100 may operate in a mode in which it resonates in the 5G Sub-6 band along the inner metal pattern 1120.

On the other hand, referring to (b) of FIG. 13, an operating band of the antenna decreases in the slide-open state of the rollable device. In addition, a resonance frequency of the antenna shifts to a low band in the slide-open state of the rollable device. In this regard, (i) in (b) of FIG. 13 shows the VSWR characteristic of the antenna in the MB/HB band in the slide-close state of the rollable device. (ii) in (b) of FIG. 13 shows the VSWR characteristic of the antenna in the Sub-6 band in the slide-close state of the rollable device. (i) and (ii) in (b) of FIG. 13, are the same as the VSWR characteristics of the antenna shown in (a) of FIG. 13. (iii) in (b) of FIG. 13 shows the VSWR characteristic of the antenna in the MB/HB band in the slide-open state of the rollable device. (iv) in (b) of FIG. 13 shows the VSWR characteristic of the antenna in the Sub-6 band in the slide-open state of the rollable device. As aforementioned, referring to (b) of FIG. 13, the operating band of the antenna decreases in the slide-open state of the rollable device. In addition, the resonance frequency of the antenna shifts to the low band in the slide-open state of the rollable device. For example, the resonance frequency shifts to a low band by about 10 MHz when the slide of the rollable device is switched into the open state.

Figure 14A:
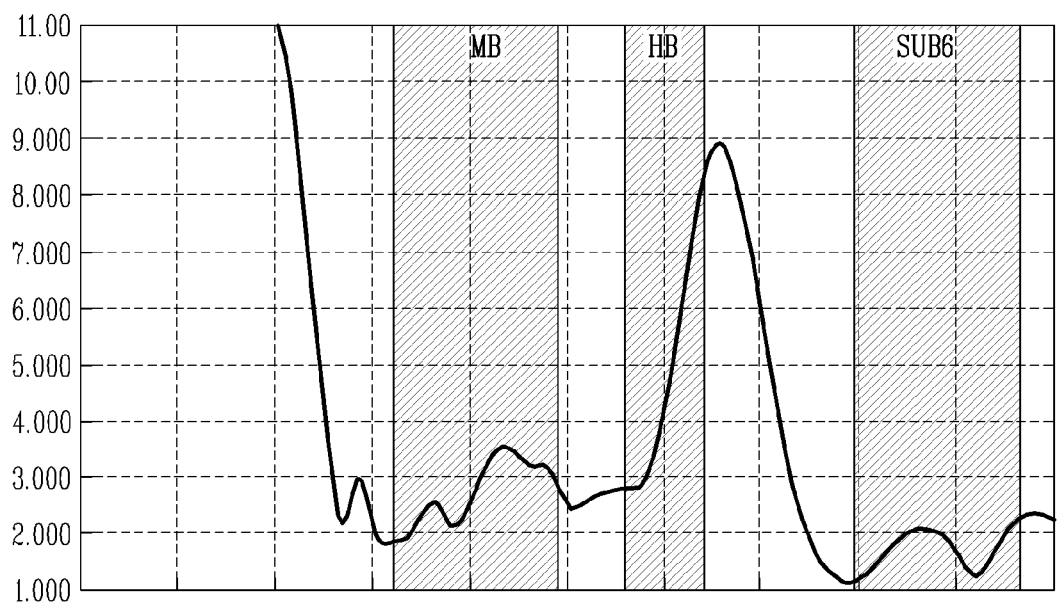
FIGS. 14A to 14C are views illustrating VSWR characteristics in a closed state and an open state of a slide of a rollable device, and upon controlling a switching unit in the open state, respectively.
Figure 14B:
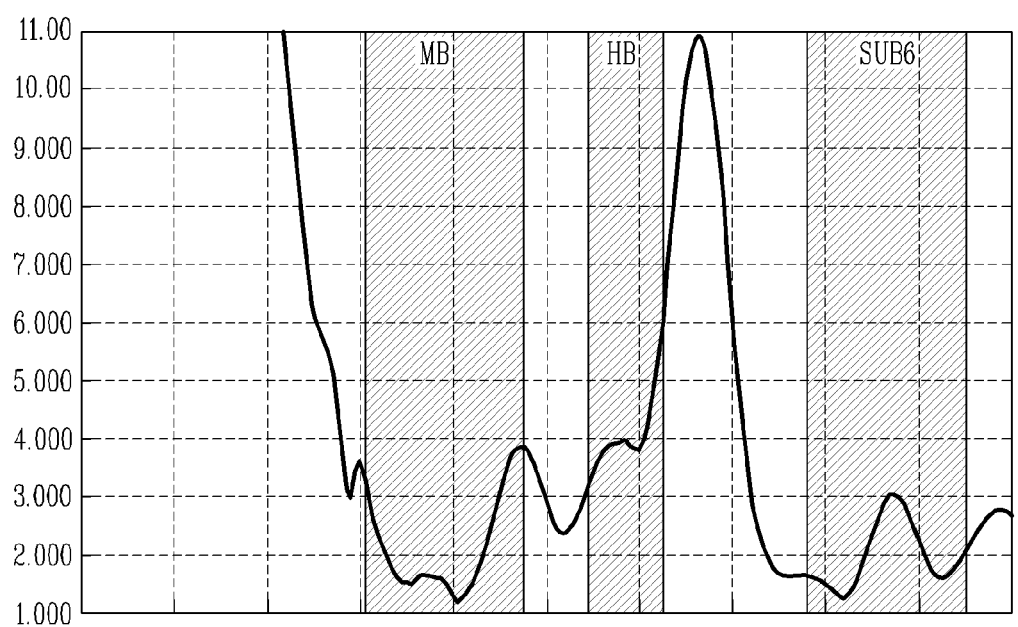
Figure 14C:
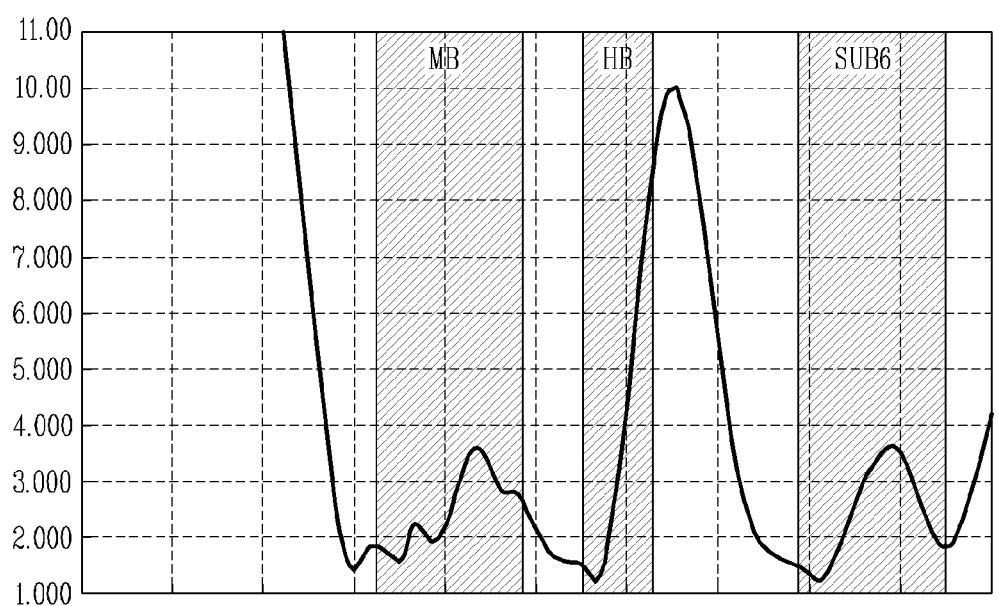
Figure 15:
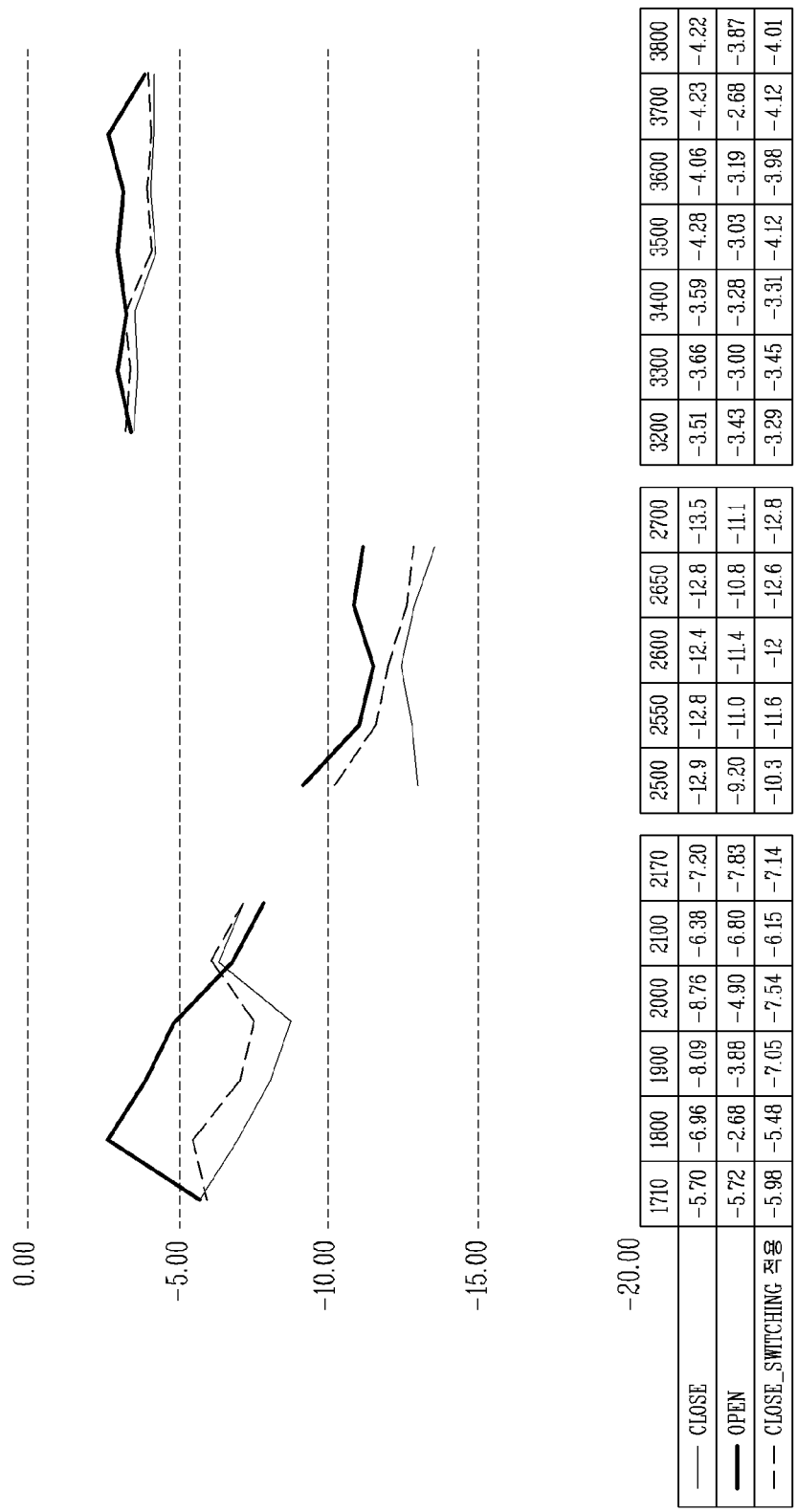
FIG. 15 is a view illustrating band-specific gain control characteristics in a closed state and an open state of a slide of a rollable device, and upon controlling a switching unit in the open state.

On the other hand, FIGS. 14A to 14C are views illustrating VSWR characteristics in a slide-close state and a slide-open state of a rollable device, and upon controlling a switching unit in the open state, respectively. FIG. 15 is a view illustrating band-specific gain control characteristics in a slide-close state and a slide-open state of a rollable device, and upon controlling a switching unit in the open state.

Referring to FIG. 14A, the antenna resonates in the MB band, the HB band, and the Sub-6 band in the slide-close state of the rollable device.

Referring to FIG. 14B, in the slide-open state of the rollable device, the antenna resonates in the MB, HB, and Sub-6 bands but its VSWR characteristic is deteriorated in the HB band. Referring to FIGS. 12 to 14B, the operating band of the antenna decreases in the slide-open state of the rollable device. In addition, the resonance frequency of the antenna shifts to the low band in the slide-open state of the rollable device.

Referring to FIG. 15, the gain characteristic in the MB band is improved upon switching the slide-close state into the slide-open state. The gain characteristic in the HB band is also improved upon switching the slide-close state into the slide-open state. In this regard, when the slide, namely, the folder is open, the MB/HB bandwidth decreases based on VSWR 3:1 but a quality factor of the antenna increases, resulting in increasing the gain. However, an antenna gain deviation due to the switching between the slide (folder)-close state and the slide (folder)-open state.

Therefore, there is a problem in that the gain deviation of the antenna increases in the MB band and the HB band due to the switching between the slide-close state and the slide-open state. Therefore, even in the slide-open state, the antenna gain deviation can be decreased while improving the VSWR characteristic by controlling the output terminals of the switching unit.

In this regard, referring to FIG. 14C, the VSWR characteristic in the MB band can be improved by controlling the output terminals of the switching unit even when the slide is open. Also, the VSWR characteristic in the HB band, specifically, in the HB band adjacent to the MB band can be improved by controlling the output terminals of the switching unit even when the slide is open. Referring to FIG. 15, the antenna gain deviation can be improved in the MB band and the HB band by controlling the output terminal of the switching unit even when the slide is open.

Also, referring to FIGS. 14A and 15, the VSWR characteristic and the antenna gain deviation even in the Sub-6 band can be improved by controlling the output terminals of the switching unit even when the slide is open.

In another implementation, if the VSWR characteristic is not a problem in a specific band, the switching unit (S/W) 1150 may not be controlled even if the slide is switched into the open state without considering the antenna gain deviation. However, the antenna gain deviation due to the slide-open/slide-close state is not large in a specific band of the MB band, the BH band, and the Sub-6 band. Therefore, in such bands, it is necessary to control the switching unit (S/W) 1150 to compensate for the decrease of the antenna VSWR when the slide is open.

In this regard, referring to FIGS. 8A to 15, the transceiver circuit 1250 may control the switching unit 1150 such that the first output terminal can be connected to the ground through the first impedance matching circuit. Accordingly, the transceiver circuit 1250 may control the switching unit (S/W) 1150 so that the antenna 1100 operates in the Sub-6 band. Therefore, the antenna resonance shift characteristic in the Sub-6 band can be improved by controlling the first output terminal of the switching unit (S/W) 1150.

The transceiver circuit 1250 may control the switching unit (S/W) 1150 such that the second to fourth output terminals can be connected to the ground through the second to fourth impedance matching circuits MC2 to MC4, respectively. Accordingly, the transceiver circuit 1250 can control the switching unit (S/W) 1150 so that the antenna 1100 operates in different bands.

The transceiver circuit 1250 may control the switching unit (S/W) 1150 such that the second output terminal is connected to the ground through the second impedance matching circuit. Accordingly, the transceiver circuit 1250 can control the switching unit (S/W) 1150 so that the antenna 1100 operates in a first sub-band within the second band. Therefore, the antenna resonance shift characteristic and impedance matching characteristic in the MB band can be improved by controlling the first output terminal of the switching unit (S/W) 1150. Here, the first sub-band within the second band may be a B3 band within the MB band, but is not limited thereto. That is, the first sub-band within the second band may be in the range of 1710 to 1880 MHz band, but is not limited thereto.

The transceiver circuit 1250 may control the switching unit (S/W) 1150 such that the third output terminal is connected to the ground through the third impedance matching circuit. Accordingly, the transceiver circuit 1250 can control the switching unit (S/W) 1150 so that the antenna operates in a second sub-band within the second band. Therefore, the antenna resonance shift characteristic and impedance matching characteristic in the MB band can be improved by controlling the third output terminal of the switching unit (S/W) 1150. In this regard, the second sub-band in the second band may be a frequency band higher than the first sub-band in the second band. Here, the second sub-band within the second band may be a B1 band within the MB band, but is not limited thereto. That is, the second sub-band within the second band may be in the range of 1920 to 2170 MHz band, but is not limited thereto.

The transceiver circuit 1250 may control the switching unit (S/W) 1150 such that the fourth output terminal is connected to the ground through the fourth impedance matching circuit. Accordingly, the transceiver circuit 1250 may control the switching unit (S/W) 1150 so that the antenna 1100 operates in the third band. Here, the third band may be a B7 band within the HB band, but is not limited thereto. That is, the second sub-band within the second band may be in the range of 2500 to 2700 MHz band, but is not limited thereto.

Referring to FIGS. 9A and 9B, the EN-DC operation, the MIMO operation, the CA operation or a combination thereof may be performed using the plurality of antennas disclosed herein. In this regard, referring to FIGS. 8A to 15, the antenna 1100 may be configured as the second antenna ANT2 that is spaced apart from one end portion of the first antenna ANT1 and disposed on the lower region. The plurality of antennas may further include the third antenna ANT3 in addition to the first antenna ANT1 and the second antenna ANT2. The third antenna ANT3 may be spaced apart from another end portion of the first antenna ANT1 and may be disposed on one side region.

The processor 1400 may be operably coupled to the transceiver circuit 1250. The processor 1400 may be configured to perform the EN-DC operation through the first to third antennas ANT1 to ANT3. In this regard, the EN-DC operation may be performed using at least two of the first to third antennas ANT1 to ANT3. Alternatively, one of the first to third antennas ANT1 to ANT3 may be connected to a plurality of feeding units, and the connected one antenna can perform the EN-DC operation.

The plurality of antennas may include the fourth antenna ANT4. The fourth antenna ANT4 may be spaced apart from one end portion of the second conductive member 1120 adjacent to the third antenna ANT3 and disposed on the one side region.

The processor 1400 may control the transceiver circuit 1250 to perform MIMO and CA through the first to fourth antennas ANT1 to ANT4. In this regard, the MIMO may be performed in the MB band of the 4G communication system through different antennas. In addition, the MIMO may be performed in the HB band of the 4G communication system through different antennas. The MIMO may also be performed in the Sub-6 band of the 5G communication system through different antennas.

The CA may be carried out through at least two of the first to fourth antennas ANT1 to ANT4. On the other hand, the CA may be carried out through one of the first to fourth antennas ANT1 to ANT4. For example, the second antenna ANT2 may perform the CA through the MB band and the HB band. Alternatively, the second antenna ANT2 may perform the CA through at least one of the MB and HB bands and the Sub-6 band.

Meanwhile, the MIMO and the CA may be performed simultaneously. In this regard, the CA may be performed while the MIMO is performed using at least two of the first to fourth antennas ANT1 to ANT4.

The plurality of antennas may further include the fifth antenna ANT5 and the sixth antenna ANT6. The fifth antenna ANT5 may be spaced apart from one end portion of the fourth antenna ANT4 and disposed on one side region and the upper region of the electronic device. The sixth antenna ANT6 may be spaced apart from one end portion of the fifth antenna ANT5 and may be disposed on the upper region of the electronic device. The processor 1400 may control the transceiver circuit 1250 to perform diversity in the LTE communication system through the fifth antenna ANT5 and the sixth antenna ANT6.

The plurality of antennas may further include the seventh antenna ANT7 and the eighth antenna ANT8 operating as a plurality of antennas through the single second conductive member 1120. The seventh antenna ANT7 may operate as a radiator through the first feeding unit F1 connected to one point of the second conductive member 1120 spaced apart from one end portion of the fourth antenna ANT4. The seventh antenna ANT7 may be configured to operate in the 4G communication system through the first feeding unit F1 connected to the one point of the second conductive member 1120. The eighth antenna ANT8 may be configured to operate in the 5G communication system through the second feeding unit F2 connected to another point of the second conductive member 1120. Accordingly, the seventh antenna ANT7 and the eighth antenna ANT8 may share the second conductive member 1120 as the same radiator.

Referring to FIGS. 2B to 4, 8A to 8D, and 10A and 10B, the antenna 1100 may be disposed on the fixed portion of the rollable device. In this regard, when the second frame 102 is slid in the first direction relative to the first frame 101, an area of the third region 1513 which is located in the first direction of the first region 1511 of the flexible display is widened, and the state of the flexible display is switched from the first state to the second state. Here, the first state may be a "display-out" state, that is, a slide-close state (folder-close state). On the other hand, the second state may be a "display-in" state, that is, a slide-open state (folder-open state). As described above, the antenna 1100 may be disposed on the fixed portion of the rollable device. In this regard, even when the area of the third area 1513 is increased and the first state is switched to the second state, the VSWR characteristic and the gain deviation characteristic of the antenna can be improved by controlling the switching unit connected to the antenna 1100. Also, a driving unit that allows the display region of the rollable device to be switched between the first state and the second state may be disposed on another side region of the rollable device.

Referring to FIGS. 2B to 4, 8A, and 15, the processor 1400 can improve the antenna characteristics by controlling the switching unit (S/W) 1150 according to a display state. In this regard, the processor 1400 may control the switching unit (S/W) 1150 when the display region of the rollable device is switched from the first state to the second state. The processor 1400 may control the transceiver circuit 1250 so that one of the first to fourth output terminals of the switching unit (S/W) 1150 is connected to the ground.

The processor 1400 may control the antenna 1100 based on resource allocation in the 4G communication system and the 5G communication system. In this regard, the processor 1400 may determine a resource region allocated through a physical downlink control channel (PDCCH).

In the case where the resources of the 5G Sub-6 band have been allocated, the processor 1400 may control the transceiver circuit 1250 so that the first output terminal of the switching unit (S/W) 1150 is connected to the ground through the first impedance matching circuit. In case where the resources of the 4G LTE band have been allocated, the processor 1400 may control the transceiver circuit 1250 according to a frequency band of the allocated resources. Thus, the processor 1400 can control the transceiver circuit 1250 such that one of the second to fourth output terminals of the switching unit (S/W) 1150 is connected to the ground through one of the second to fourth impedance matching circuits.

As described above, the processor 1400 can improve the antenna characteristics by controlling the switching unit (S/W) 1150 according to the display state. The processor 1400 may control the switching unit (S/W) 1150 when the display region of the rollable device is switched from the first state to the second state. The processor 1400 may control the transceiver circuit 1250 so that the first to fourth output terminals of the switching unit (S/W) 1150 are opened with respect to the ground.

The plurality of antennas disclosed herein may perform various EN-DC operations through the plurality of front-end modules (FEMs) and the transceiver circuit. In this regard, FIG. 16 is a view illustrating MIMO configuration which can be allowed during an EN-DC operation in LTE and NR communication systems, and transmission and reception frequency bands for each band of the LTE and NR communication systems.

Referring to (a) of FIG. 16, an DN-DC operation may be carried out during a transmitting (Tx) operation of LTE and NR communication systems. Meanwhile, a MIMO operation may be carried out during a receiving (Rx) operation of the LTE and NR communication systems. Specifically, during an LTE Rx operation, 2×2 MIMO or 4×4 MIMO may be performed. In addition, during an NR Rx operation, 4×4 MIMO may be performed.

Referring to (b) of FIG. 16, a transmission band and a reception band of a B5 band and an N5 band corresponding to the LB band may be 824 to 849 MHz and 869 to 894 MHz, respectively. A transmission band and a reception band of a B66 band and an N66 band corresponding to the MB band may be 1710 to 1780 MHz and 2110 to 2200 MHz, respectively. A transmission band and a reception band of a B2 band and an N2 band corresponding to the MB band may be 1850 to 1910 MHz and 1930 to 1990 MHz, respectively. Accordingly, an FDD operation in which the transmission band and the reception band are separated into frequency bands can be performed through the LB band and the MB band, and transmission and reception of signals can be simultaneously performed.

A transmission band and a reception band of a B41 band and an N41 band corresponding to the HB band may be 2496 to 2690 MHz. Therefore, a TDD operation can be performed through the B41 band and the N41 band corresponding to the HB band. A transmission band and a reception band of an N78 band corresponding to the UHB band may be 3300 to 3800 MHz. Therefore, a TDD operation can be performed through the B41 band and the N41 band corresponding to the UHB band. Accordingly, the TDD operation in which a transmission section and a reception section are separated in a time domain may be performed through the HB band and UHB band.

Figure 17A:
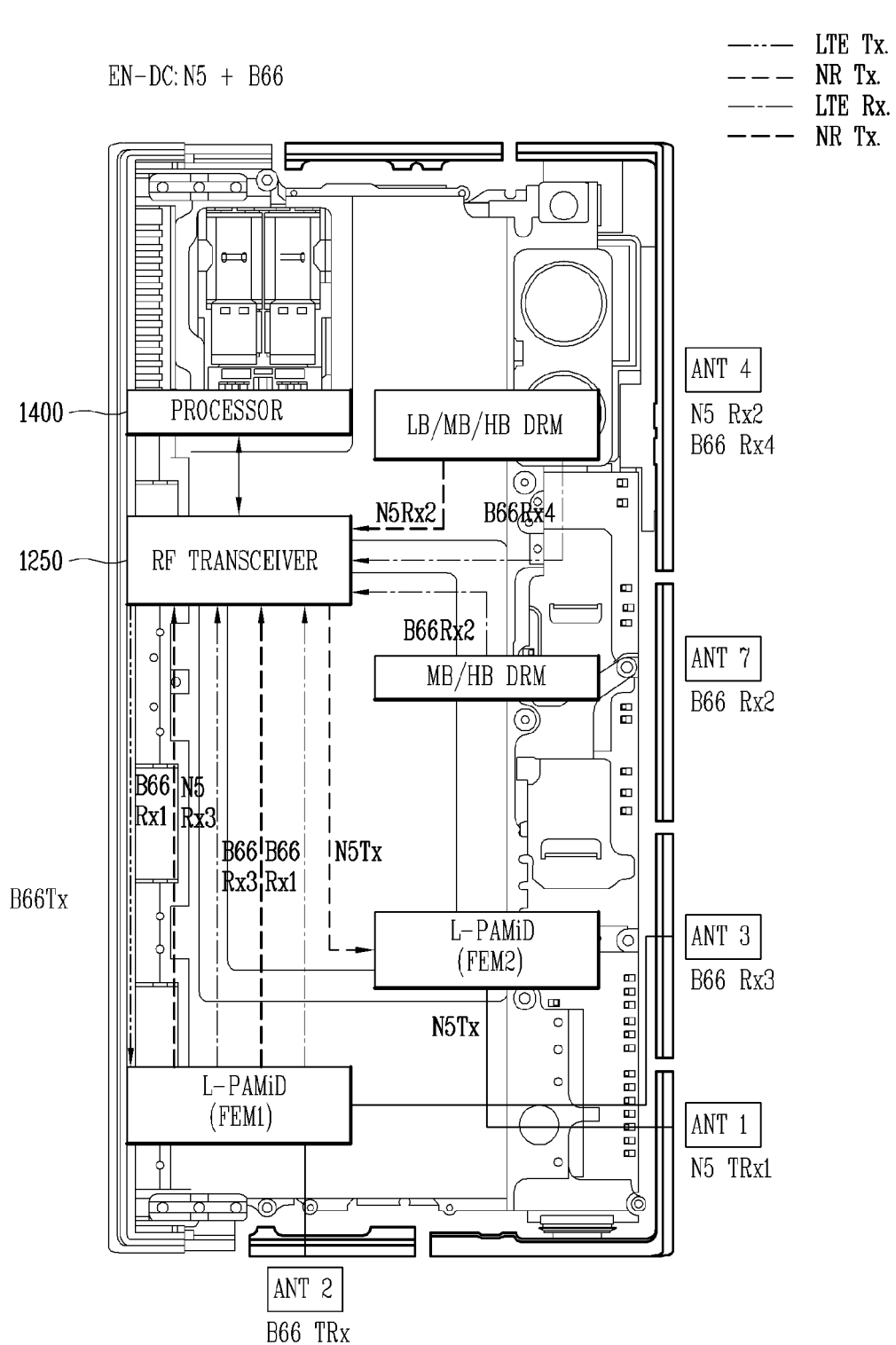
FIGS. 17A to 17C are views illustrating a configuration of an electronic device that performs an EN-DC operation of NR+LTE in accordance with various implementations.
Figure 17B:
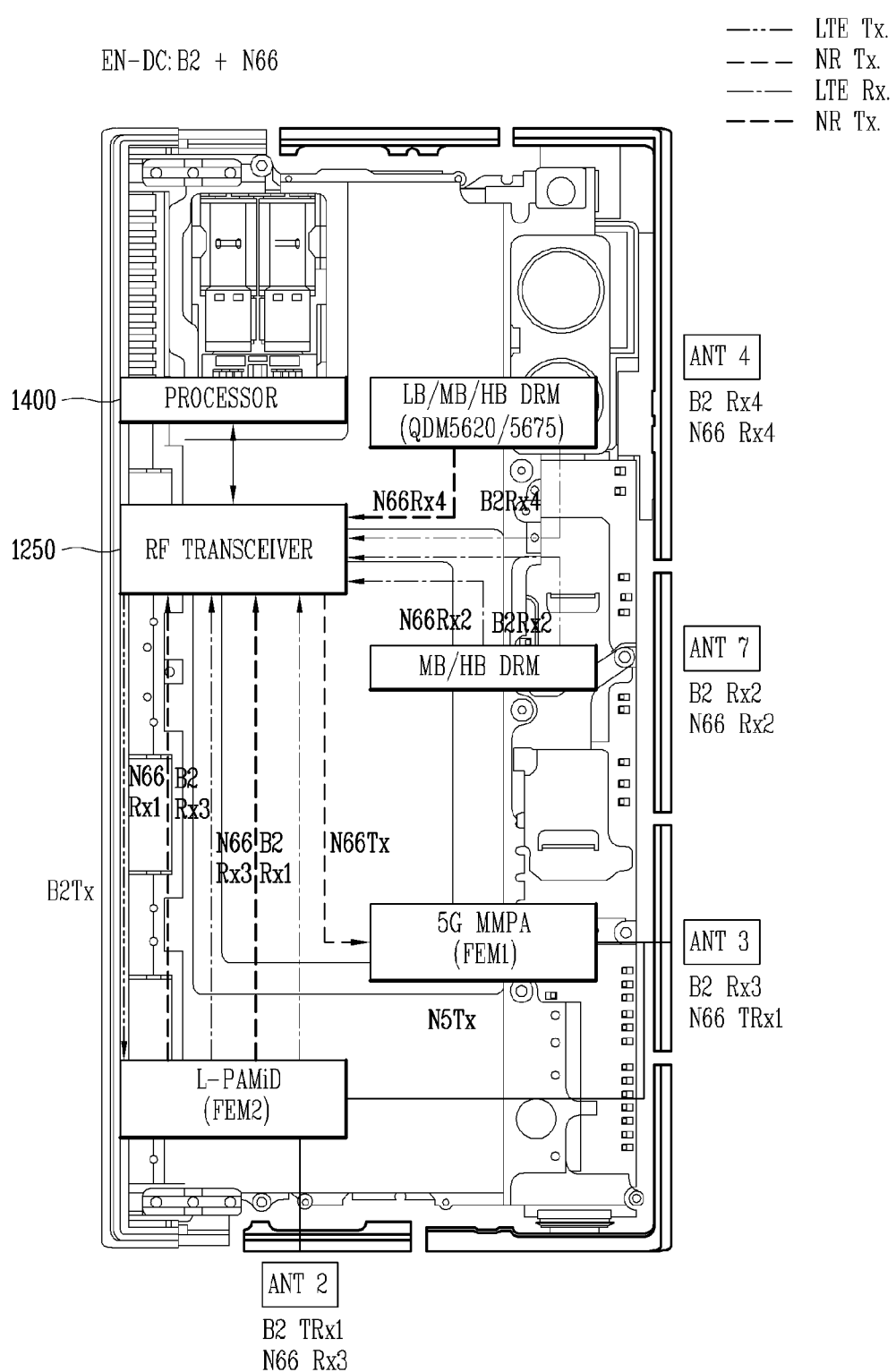
Figure 17C:
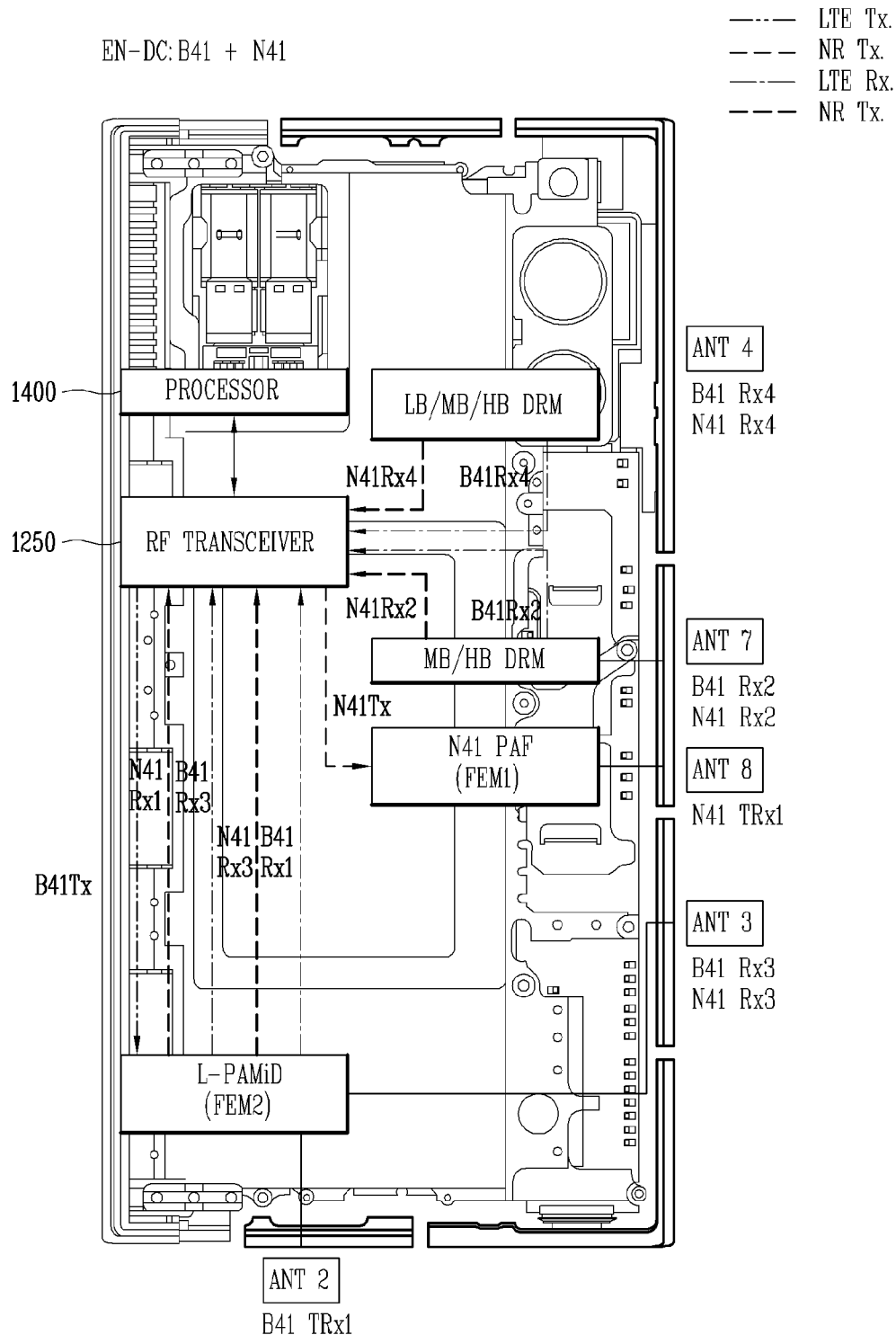

FIGS. 17A to 17C are views illustrating a configuration of an electronic device that performs an EN-DC operation of NR+LTE in accordance with various implementations.

Referring to FIG. 17A, an EN-DC operation of LB NR+MB LTE may be performed. In this regard, the processor 1400 may control the transceiver circuit 1250 to maintain an EN-DC state with the 5G communication system and the 4G communication system in the first band and the second band through the first antenna ANT1 and the second antenna ANT2. For example, the processor 1400 may transmit the first signal of the first band and the second signal of the second band through the first antenna ANT1 and the second antenna ANT2. Also, the processor 1400 may simultaneously transmit and receive the first signal of the first band and the second signal of the second band through the first antenna ANT1 and the second antenna ANT2. Here, the first signal of the first band may be a signal of an N5 band, which is the LB band, and the second signal of the second band may be a signal of a B66 band, which is the MB band.

The processor 1400 may perform MIMO while performing the EN-DC operation. The processor 1400 may control the transceiver circuit 1250 to perform MIMO in the first band through the first antenna ANT1 and the fourth antenna ANT4 while maintaining the EN-DC state through the fourth antenna ANT4. In this regard, MIMO may be performed in the N5 band through the first antenna ANT1 and the fourth antenna ANT4. In addition, MIMO may be performed in the B66 band through the second antenna ANT2, the third antenna ANT3, the fourth antenna ANT4, and the seventh antenna ANT7.

Meanwhile, signals of different bands may be branched through a plurality of front-end modules. In this regard, the electronic device may further include the first front-end module FEM1 and the second front-end module FEM2. The first front-end module FEM1 may be operably coupled to the third antenna ANT3. The second front-end module FEM2 may be operably coupled to the second antenna ANT2. The first front-end module FEM1 may be a power amplifier modules including duplexer (PAMiD) operating in the 4G communication system. In addition, the second front-end module FEM2 may be a power amplifier modules including duplexer (PAMiD) operating in the 5G communication system.

The transceiver circuit 1250 may control the first front-end module FEM1 such that the first antenna ANT1 transmits and receives the signal of the first band. For example, the transceiver circuit 1250 may control the first front-end module FEM1 such that the first antenna ANT1 transmits and receives the signal of the N5 band.

In addition, the transceiver circuit 1250 may control the second front-end module FEM2 such that the second antenna ANT2 transmits and receives the signal of the second band and the third antenna ANT3 receives the signal of the second band. As an example, the transceiver circuit 1250 may control the second front-end module FEM2 such that the second antenna ANT2 transmits and receives the signal of the B66 band and the third antenna ANT3 receives the signal of the B66 band.

Referring to FIG. 17B, an EN-DC operation of MB NR+MB LTE may be performed.

In this regard, the processor 1400 may control the transceiver circuit 1250 to maintain an EN-DC state with the 5G communication system and the 4G communication system in the second band through the second antenna ANT2 and the third antenna ANT3. For example, the processor 1400 may transmit the first signal of the second band and the second signal of the second band through the second antenna ANT2 and the third antenna ANT3. Also, the processor 1400 may transmit and receive the first signal of the second band and the second signal of the second band through the second antenna ANT2 and the third antenna ANT3. Here, the first signal of the second band may be a signal of a B2 band, which is the MB band, and the second signal of the second band may be a signal of an N66 band, which is the MB band.

The processor 1400 may perform MIMO while performing the EN-DC operation. The processor 1400 may control the transceiver circuit 1250 to perform MIMO in the second band through the shared antenna S-ANT and the second to fourth antennas ANT2 to ANT4 while maintaining the EN-DC state in the second band through the shared antenna S-ANT and the fourth antenna ANT4. In this regard, MIMO may be performed in the N66 band through the shared antenna S-ANT and the second to fourth antennas ANT2 to ANT4. In addition, MIMO may be performed in the B2 band through the shared antenna S-ANT and the second to fourth antennas ANT2 to ANT4.

Meanwhile, signals of different bands may be branched through a plurality of front-end modules. In this regard, the electronic device may further include the first front-end module FEM1 and the second front-end module FEM2. The first front-end module FEM1 may be operably coupled to the first antenna ANT1. The second front-end module FEM2 may be operably coupled to the second antenna ANT2. The first front-end module FEM1 may be a power amplifier modules including duplexer (PAMiD) operating in the 5G communication system. In addition, the second front-end module FEM2 may be a power amplifier modules including duplexer (PAMiD) operating in the 4G communication system.

The transceiver circuit 1250 may control the first front-end module FEM1 such that the third antenna ANT3 transmits and receives the signal of the second band. For example, the transceiver circuit 1250 may control the first front-end module FEM1 such that the third antenna ANT3 transmits and receives the signal of the N66 band.

In addition, the transceiver circuit 1250 may control the second front-end module FEM2 such that the second antenna ANT2 transmits and receives the signal of the second band and the third antenna ANT3 receives the signal of the second band. As an example, the transceiver circuit 1250 may control the second front-end module FEM2 such that the second antenna ANT2 transmits and receives the signal of the B2 band and the third antenna ANT3 receives the signal of the B2 band.

Referring to FIG. 17C, an EN-DC operation of MB NR+MB LTE may be performed.

In this regard, the processor 1400 may control the transceiver circuit 1250 to maintain an EN-DC state with the 5G communication system and the 4G communication system in the third band through the second antenna ANT2 and the third antenna ANT3. For example, the processor 1400 may transmit the first signal of the third band and the second signal of the third band through the second antenna ANT2 and the third antenna ANT3. Also, the processor 1400 may transmit and receive the first signal of the third band and the second signal of the third band through the second antenna ANT2 and the third antenna ANT3. Here, the first signal of the second band may be a signal of a B2 band, which is the MB band, and the second signal of the second band may be a signal of an N66 band, which is the MB band.

The processor 1400 may perform MIMO while performing the EN-DC operation. The processor 1400 may control the transceiver circuit 1250 to perform MIMO in the third band through the shared antenna S-ANT and the second to fourth antennas ANT2 to ANT4 while maintaining the EN-DC state in the third band through the shared antenna S-ANT and the fourth antenna ANT4. In this regard, MIMO may be performed in the N41 band through the shared antenna S-ANT and the second to fourth antennas ANT2 to ANT4. In addition, MIMO may be performed in the B41 band through the shared antenna S-ANT and the second to fourth antennas ANT2 to ANT4.

Meanwhile, signals of different bands may be branched through a plurality of front-end modules. In this regard, the electronic device may further include the first front-end module FEM1 and the second front-end module FEM2. The first front-end module FEM1 may be operably coupled to the shared antenna S-ANT. The second front-end module FEM2 may be operably coupled to the second antenna ANT2 and the third antenna ANT3. The first front-end module FEM1 may be a power amplifier module (PAM) operating in the 5G communication system. In addition, the second front-end module FEM2 may be a power amplifier modules including duplexer (PAMiD) operating in the 4G communication system.

The transceiver circuit 1250 may control the first front-end module FEM1 such that the shared antenna S-ANT transmits and receives the signal of the third band. For example, the transceiver circuit 1250 may control the first front-end module FEM1 such that the third antenna ANT3 transmits and receives the signal of the N41 band.

In addition, the transceiver circuit 1250 may control the second front-end module FEM2 such that the second antenna ANT2 transmits and receives the signal of the third band and the third antenna ANT3 receives the signal of the third band. As an example, the transceiver circuit 1250 may control the second front-end module FEM2 such that the second antenna ANT2 transmits and receives the signal of the B41 band and the third antenna ANT3 receives the signal of the B41 band.

Figure 18A:
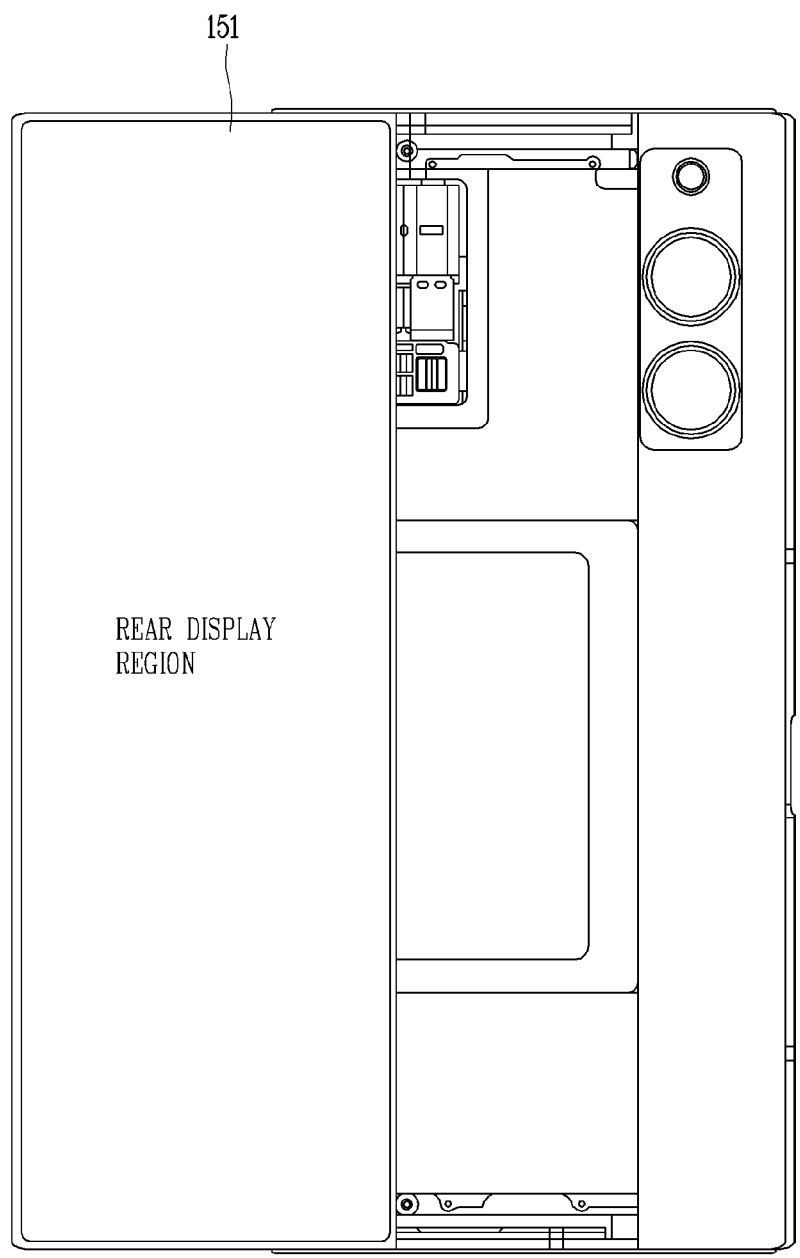
FIGS. 18A and 18B are views illustrating a configuration of a rollable device in a state where a display is disposed in a slide-open state, and a configuration of the rollable device in a state excluding the display.
Figure 18B:
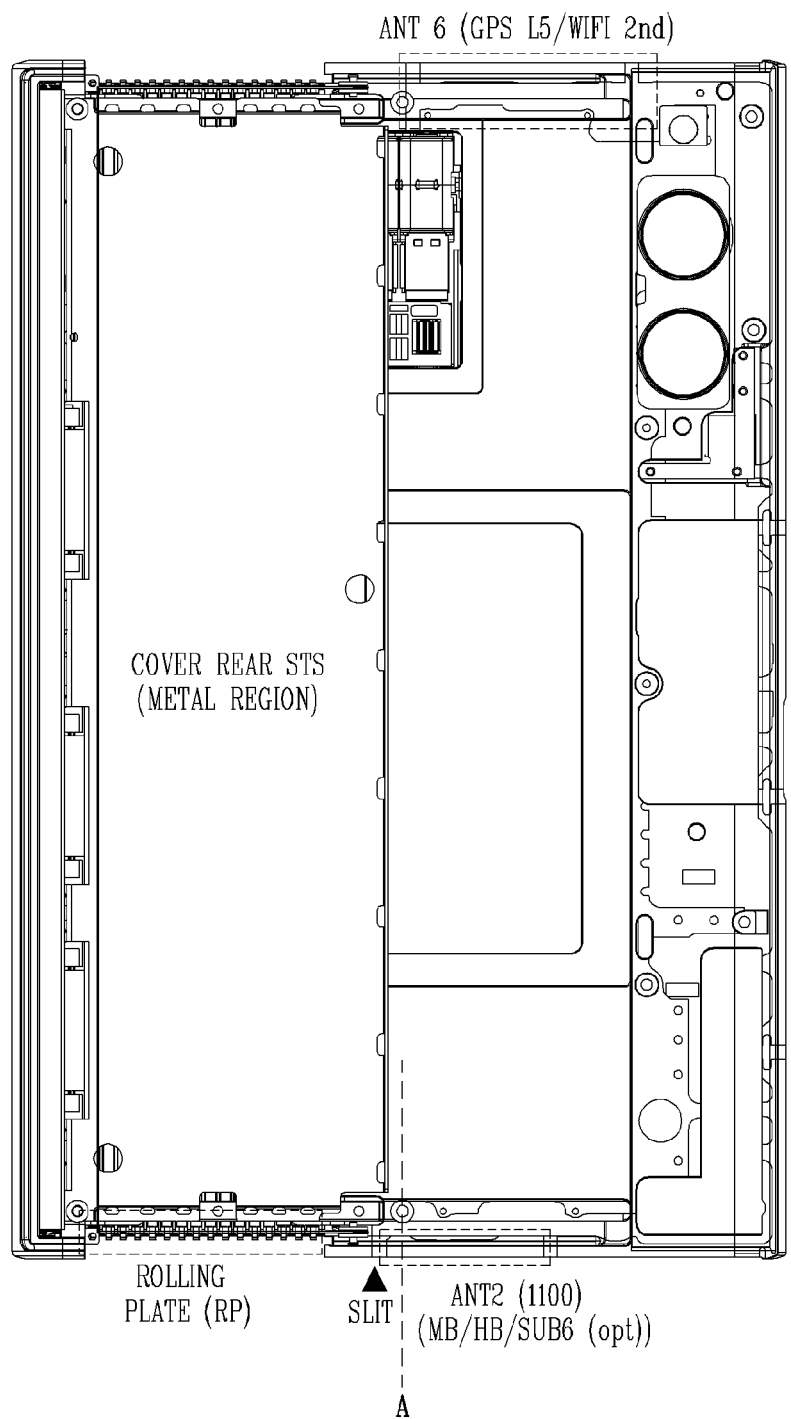

In the rollable device disclosed herein, the display region may extend in the slide-open state. In this regard, FIGS. 18A and 18B are views illustrating a configuration of a rollable device in a state where a display is disposed in a slide-open state, and a configuration of the rollable device in a state excluding the display. On the other hand, FIGS. 19A and 19B are cross-sectional views at a position A of FIG. 18B in the slide-open state and the slide-closed state.

Referring to FIG. 18A, the display 1151 may be disposed even on the rear surface of the rollable device in the slide-open state. Referring to FIG. 18B, a rolling plate and the rear cover 203 may be located on the display 151, which is provided on the rear surface of the rollable device, in the slide-open state. That is, in the slide-open state, the rolling plate and the rear cover 203 may be exposed, excluding the display 151 on the rear surface of the rollable device.

The rear cover 203 may be configured as a metal region, and made of an STS material. The second antenna (ANT2) 1100 may be disposed with being spaced apart from one side region, on which the plurality of antennas is disposed, by a slit. The second antenna (ANT2) 1100 may be disposed on the lower region of the rollable device, and may operate in the MB and HB bands of the 4G communication system and the Sub-6 band of the 5G communication system. The sixth antenna ANT6 may be disposed on the upper region of the rollable device. The sixth antenna ANT6 may be configured to operate in a GPS L5 band and a WiFi band.

Figure 19A:
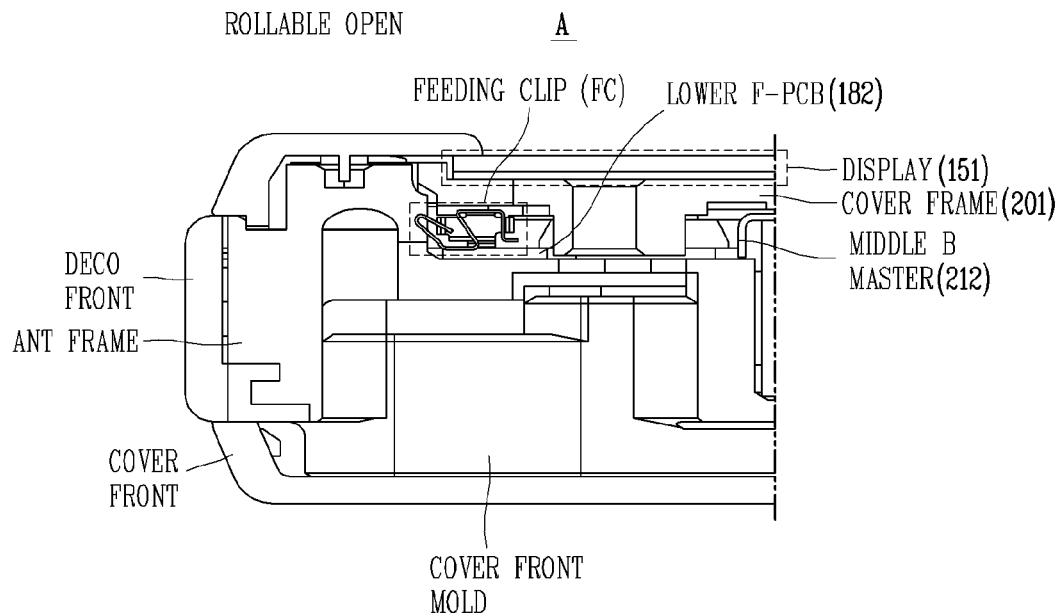
FIGS. 19A and 19B are cross-sectional views at a position A of FIG. 18b in the slide-open state and a slide-closed state.
Figure 19B:
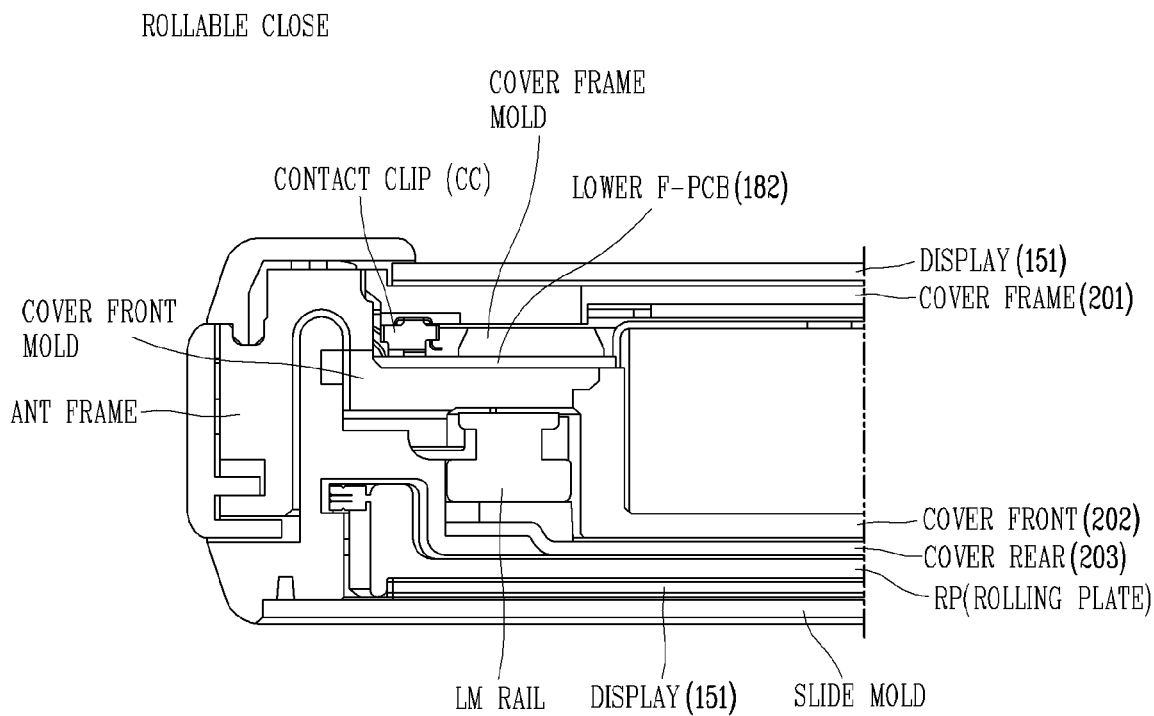

FIG. 19A illustrates a cross section in a Z axis at a position A in the slide-open state. The cover frame 201 and the middle cover 212 may be disposed beneath the display 151 in the slide-open state. The feeding clip FC may be disposed on the circuit board 182 corresponding to the lower FPCB. An RF transmission line of the circuit board 182 may be connected to the conductive member through the feeding clip FC.

In the slide-open state, the ground region may expand due to a mechanical structure corresponding to the moving portion. For example, the ground region may expand due to the rolling plate, the display 151, and a slide mold. As the ground region expands, the antenna characteristics may change in the slide-open state. Therefore, in order to compensate for different antenna deviation characteristics depending on the slid-close/open state of the rollable device disclosed herein, the antenna characteristic for each band can be optimized through the switching unit.

FIG. 19B illustrates a cross section in a Z axis at a position A in the slide-close state. The cover frame 201, the front cover 202, and the rear cover 203 may be disposed beneath the display 151 in the slide-close state. The display 151 may also be disposed on the rear surface of the rollable device, and the rolling plate and the rear cover 203 may be disposed on the upper region.

Referring to FIGS. 10A, 10B, 19A and 19B, the ground pad of the circuit board 182 which is configured to be connected to the output terminals of the switching unit (S/W) 1150 may be connected to the cover frame 201 through the contact clip CC.

In this regard, a metal pattern may be disposed on the lower FPCB to operate in the Sub-6 band. Accordingly, an operating frequency can be adjusted by controlling the resonance mode of the second antenna (ANT2) 1100. In addition, the ground connection with the cover frame 201 may be made through the contact clip CC in order to remove unwanted resonance, which is caused due to unwanted radiation, with other antennas including the second antenna (ANT2) 1100.

Referring to FIGS. 10A, 10B, 19A, and 19B, a dielectric mold may be disposed between the metal rim and the metal frame at the lower region of the electronic device. In this regard, when the dielectric mold is disposed, the sizes of the first antenna ANT1 and the second antenna ANT2 may be reduced, compared to when the dielectric mold is not disposed. Accordingly, as the dielectric constant value of the dielectric mold increases, the sizes of the first antenna ANT1 and the second antenna ANT2 disposed at the lower end portion can be reduced. For example, as illustrated in FIG. 13, the size of the first antenna ANT1 operating in the low band such as the N5 band may be reduced. The size of the first antenna ANT1 operating in the low band, such as the N5 band, may be reduced by the dielectric mold between the metal rim of the lower region and the metal frame. In this regard, the dielectric mold between the metal rim of the lower region and the metal frame may extend to be disposed even on the lower region of one side region where the first antenna ANT1 is disposed.

Figure 1C:
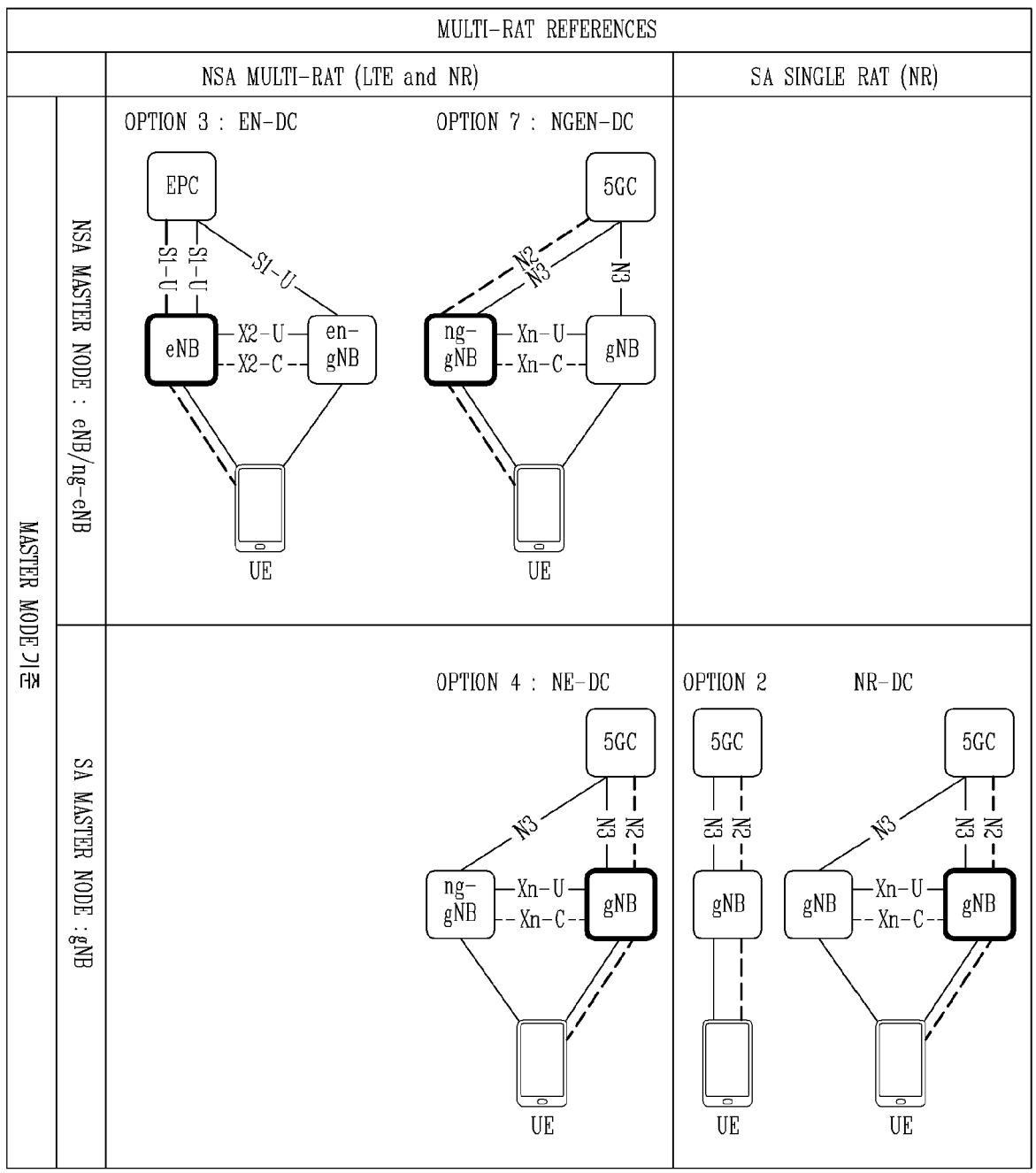
FIG. 1C is a view illustrating a configuration in which the electronic device according to the one implementation is interfaced with a plurality of base stations or network entities.

A dual connectivity configuration and MIMO operation may be performed using a plurality of antennas disposed on a side region of the rollable device disclosed herein. The dual connectivity state may be specified to operate in an EN-DC, NGEN-DC, or NR-DC configuration as shown in FIG. 1C. EN-DC or NGEN-DC band combinations may include at least one E-UTRA operating band. Specifically, operating bands for intra-band contiguous EN-DC, intra-band non-contiguous EN-DC, inter-band EN-DC in FR1, inter-band EN-DC including FR2, inter-band EN-DC including FR1 and FR2, and inter-band EN-DC between FR1 and FR2 may be defined.

A UE channel bandwidth for EN-DC may be defined. In this regard, a UE channel bandwidth for intra-band EN-DC in FR1 may be defined. Channel arrangements for DC may be defined. In this regard, channel spacing for intra-band EN-DC carriers may be defined.

The configuration for EN-DC may be defined. Specifically, configurations for intra-band contiguous EN-DC, intra-band non-contiguous EN-DC, inter-band EN-DC in FR1, inter-band EN-DC including FR2, inter-band EN-DC including FR1 and FR2, and inter-band EN-DC between FR1 and FR2 may be defined.

As an example, UL EN-DC configuration may be defined for 2, 3, 4, 5, or 6 bands in FR1. In this regard, the UL EN-DC configuration for 2, 3, 4, 5, or 6 bands in FR1 may be made of a combination of EUTRA and NR configurations. This EN-DC, NGEN-DC, or NR-DC configuration may also be defined for downlink (DL) as well as uplink (UL).

Transmitter power may be defined in relation to EN-DC. UE maximum output power and UE maximum output power reduction may be defined for each configuration of the above-described EN-DCs. UE additional maximum output power reduction may be defined in relation to EN-DC. Configured output power for EN-DC and configured output power for NR-DC may be defined.

The foregoing description has been given of the electronic device which is provided with a plurality of transceivers and antennas to perform MIMO and/or CA operations. In this regard, the electronic device performing the MIMO and/or CA operations may operate as a DC-EN configuration so as to be in the EN-DC state with the eNB and gNB. Hereinafter, description will be given of a wireless communication system including an electronic device and a base station performing such MIMO and/or CA operations. In this regard, FIG. 20 is an exemplary block diagram of a wireless communication system to which methods proposed in the present disclosure are applicable.

Figure 20:
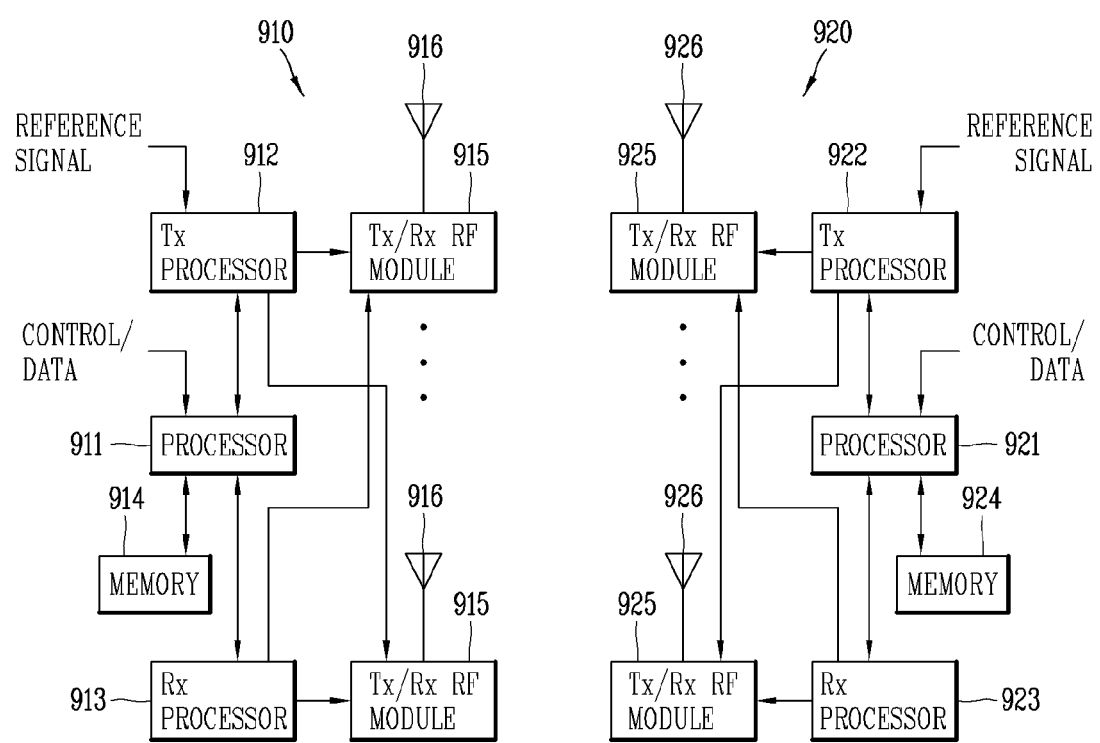
FIG. 20 is an exemplary block diagram of a wireless communication system to which methods proposed in the present disclosure are applicable.

Referring to FIG. 20, the wireless communication system includes a first communication device 910 and/or a second communication device 920. "A and/or B" may be interpreted to denote the same as "comprising at least one of A and B". The first communication device may represent a base station, and the second communication device may represent a terminal (or the first communication device may represent a terminal, and the second communication device may represent a base station).

The base station (BS) may be replaced with a term such as a fixed station, a Node B, an evolved-NodeB (eNB), a Next Generation NodeB (gNB), a base transceiver system (BTS), an access point (AP), or a general NB (gNB), a 5G system, a network, an AI system, a road side unit (RSU), robot or the like. In addition, a terminal may be fixed or mobile, and may include a user equipment (UE), a mobile station (MS), a user terminal (UT), a mobile subscriber station (MSS), a subscriber station (SS), and an advanced mobile (AMS), a wireless terminal (WT), a machine-type communication (MTC) device, an machine-to-machine (M2M) device, a device-to-device (D2D) device, a vehicle, a robot, an AI module or the like.

The first communication device and the second communication device include a processor 911, 921, a memory 914, 924, at least one Tx/Rx RF module 915, 925, a Tx processor 912, 922, an Rx processor 913, 923, and an antenna 916, 926. The processor implements the functions, processes and/or methods described above. More specifically, in a DL communication (communication from the first communication device to the second communication device), upper layer packets from a core network (NGC) are provided to the processor 911. The processor implements the function of an L2 layer. In the DL, the processor provides multiplexing and radio resource allocation between a logical channel and a transport channel to the second communication device 920, and is responsible for signaling to the second communication device. A transmit (TX) processor 912 implements various signal processing functions for a L1 layer (i.e., physical layer). The signal processing functions facilitate forward error correction (FEC) in the second communication device, and include coding and interleaving. The encoded and modulated symbols are divided into parallel streams, and each stream is mapped to an OFDM subcarrier, and multiplexed with a reference signal (RS) in a time and/or frequency domain, and combined together using an Inverse Fast Fourier Transform (IFFT) to create a physical channel carrying a time-domain OFDMA symbol stream. An OFDM stream is spatially precoded to produce multiple spatial streams. Each spatial stream may be provided to different antennas 916 through individual Tx/Rx modules (or transceivers 915). Each Tx/Rx module may modulate an RF carrier with each spatial stream for transmission. In the second communication device, each Tx/Rx module (or transceiver) 925 receives a signal through each antenna 926 of each Tx/Rx module. Each Tx/Rx module recovers information modulated onto an RF carrier, and provides it to the receive (RX) processor 923. The RX processor implements various signal processing functions of layer 1. The RX processor may perform spatial processing on the information to recover any spatial streams destined for the second communication device. If multiple spatial streams are directed to the second communication device, they may be combined into a single OFDMA symbol stream by multiple RX processors. The RX processor converts the OFDMA symbol stream from a time domain to a frequency domain using fast Fourier transform (FFT). The frequency domain signal includes an individual OFDMA symbol stream for each subcarrier of the OFDM signal. The symbols and reference signal on each subcarrier are recovered and demodulated by determining the most likely signal placement points transmitted by the first communication device. Such soft decisions may be based on channel estimate values. The soft decisions are decoded and deinterleaved to recover data and control signals originally transmitted by the first communication device on the physical channel. The corresponding data and control signals are provided to the processor 921.

The UL (communication from the second communication device to the first communication device) is processed at the first communication device 910 in a similar manner to that described in connection with a receiver function at the second communication device 920. Each Tx/Rx module 925 receives a signal via each antenna 926. Each Tx/Rx module provides an RF carrier and information to the RX processor 923. The processor 921 may be associated with the memory 924 that stores program codes and data. The memory may be referred to as a computer readable medium.

Meanwhile, technical effects of an electronic device having a plurality of antennas operating according to the present disclosure will be described as follows.

According to the present disclosure, various communication systems can be supported by providing a plurality of antennas, which can be implemented as a metal frame of an electronic device.

According to the present disclosure, an antenna structure capable of securing characteristics of antennas disposed in a rollable device can be provided, thereby minimizing interference among the plurality of antennas while optimizing performance of the plurality of antennas.

According to the present disclosure, an antenna structure capable of maintaining antenna performance in a rollable device can be provided, thereby maintaining stable communication performance even when a display region is expanded or reduced.

According to the present disclosure, an antenna structure capable of securing antenna performance in a display structure with a minimized bezel region in a rollable device can be provided, thereby minimizing an antenna arrangement space.

According to the present disclosure, antenna performance can be improved without changing a mechanical structure and design factors of an electronic device such as a rollable device.

According to the present disclosure, antenna characteristic deviation can be reduced by dynamically changing an antenna configuration through a switching unit as a slide is opened and closed in case where a plurality of antennas is arranged in a rollable device.

According to the present disclosure, antenna characteristics can be optimized for each band by dynamically changing an antenna configuration through a switching unit as a slide is opened and closed in case where a plurality of antennas is arranged in a rollable device.

According to the present disclosure, E-UTRAN NR Dual Connectivity (EN-DC), Carrier Aggregation (CA), and Multiple-Input and Multi-Output (MIMO) can be supported in a rollable device without changing a mechanical structure and a design shape.

Further scope of applicability of the present disclosure will become apparent from the detailed description given hereinafter. It should be understood, however, that the detailed description and specific examples, such as the preferred implementation of the invention, are given by way of illustration only, since various changes and modifications within the spirit and scope of the invention will be apparent to those skilled in the art.

Further scope of applicability of the present disclosure will become apparent from the detailed description given hereinafter. It should be understood, however, that the detailed description and specific examples, such as the preferred implementation of the invention, are given by way of illustration only, since various changes and modifications within the spirit and scope of the invention will be apparent to those skilled in the art.

With regard to the present disclosure described above, the design of an antenna including processors 180, 1250, and 1400 and a controller for controlling the same in an electronic device 180 having a plurality of antennas, and a control method thereof may be implemented as codes readable by a computer on a medium written by a program. The computer-readable media includes all types of recording devices in which data readable by a computer system can be stored. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the processor 180 of the terminal. Therefore, it should also be understood that the above-described implementations are not limited by any of the details of the foregoing description, unless otherwise specified, but rather should be construed broadly within its scope as defined in the appended claims. Therefore, all changes and modifications that fall within the metes and bounds of the claims, or equivalents of such metes and bounds are therefore intended to be embraced by the appended claims.

The invention claimed is:
1. An electronic device, comprising:
a plurality of frames including a first frame, a second frame slidable in a first direction relative to the first frame, and a third frame located on a rear surface of the second frame and movable in the first direction relative to the second frame, wherein one of the first frame and the third frame is configured as a metal frame formed on a side surface of the electronic device and having a plurality of metal rims;
- a flexible display having a first region coupled to a front surface of the first frame, a second region coupled to the third frame, and a third region located between the first region and the second region; and
- an antenna implemented as one of the plurality of metal rims, and connected to a feeding unit at one point and connected to a ground through a switching unit at another point to radiate signals through different bands.

2. The electronic device of claim 1, wherein the antenna is disposed on a lower region of the electronic device,
- wherein the electronic device further comprises a first antenna disposed on one side region thereof, and
- wherein the first antenna is configured to operate in a first band of a Fourth Generation (4G) communication system, and the antenna is configured to operate in a second band higher than the first band and a third band higher than the second band.

3. The electronic device of claim 1, wherein the antenna is configured such that one end portion and another end portion of a conductive member, as one of the plurality of metal rims, are connected to the ground, and the one end portion of the conductive member is connected to the ground through the switching unit.

4. The electronic device of claim 2, wherein the antenna is configured to operate in the first to third bands and a Sub-6 band of a fifth generation (5G) communication system by way of switching output terminals of the switching unit.

5. The electronic device of claim 4, wherein the antenna comprises:
- the conductive member; and
- a metal pattern formed on a circuit board to extend from the feeding unit by a predetermined length at one point of the conductive member, and
- wherein the one point of the metal pattern is connected to a ground of the circuit board.

6. The electronic device of claim 5, wherein the switching unit is configured as an SP4T switch having first to fourth output terminals, and
- wherein the electronic device further comprises a transceiver circuit operably coupled to the antenna and configured to control the switching unit.

7. The electronic device of claim 6, wherein the transceiver circuit is configured to control the switching unit to connect the first output terminal to the ground through a first impedance matching circuit, such that the antenna operates in the Sub-6 band, and
- control the switching unit to connect the second to fourth output terminals to the ground through second to fourth impedance matching circuits, respectively, such that the antenna operates in different bands.

8. The electronic device of claim 7, wherein the transceiver circuit is configured to control the switching unit to connect the second output terminal to the ground through the second impedance matching circuit, such that the antenna operates in a first sub-band within the second band, and
- control the switching unit to connect the third output terminal to the ground through the third impedance matching circuit, such that the antenna operates in a second sub-band within the second band, and
- wherein the second sub-band is a frequency band higher than the first sub-band.

9. The electronic device of claim 8, wherein the transceiver circuit is configured to control the switching unit to connect the fourth output terminal to the ground through the fourth impedance matching circuit, such that the antenna operates in the third band.

10. The electronic device of claim 9, wherein the antenna is a second antenna spaced apart from one end portion of the first antenna, and disposed on the lower region, and
- wherein the electronic device further comprises:
  - a third antenna spaced apart from another end portion of the first antenna and disposed on the one side region; and
  - a processor operably coupled to the transceiver circuit and configured to perform an E-UTRAN NR Dual Connectivity (EN-DC) operation through the first to third antennas.

11. The electronic device of claim 10, further comprising a fourth antenna spaced apart from one end portion of the second conductive member adjacent to the third antenna and disposed on the one side region,
- wherein the processor controls the transceiver circuit to perform Multiple-Input and Multiple-Output (MIMO) and Carrier Aggregation (CA) through the first to fourth antennas.

12. The electronic device of claim 11, further comprising:
- a fifth antenna spaced apart from one end portion of the fourth antenna and disposed on the one side region and an upper region of the electronic device; and
- a sixth antenna spaced apart from one end portion of the fifth antenna and disposed on the upper region,
- wherein the processor controls the transceiver circuit to perform diversity in a Long-Term Evolution (LTE) communication system through the fifth and sixth antennas.

13. The electronic device of claim 12, further comprising:
- a seventh antenna configured to operate in the 4G communication system through a first feeding unit connected to one point of a second conductive member spaced apart from the one end portion of the fourth antenna; and
- an eighth antenna configured to operate in the 5G communication system through a second feeding unit connected to another point of the second conductive member,
- wherein the seventh antenna and the eighth antenna share the second conductive member as the same radiator.

14. The electronic device of claim 10, wherein the third region of the flexible display located in a first direction of the first region is widened in area and the flexible display is switched from a first state into a second state, in case where the second frame moves in the first direction relative to the first frame,
- wherein the antenna is disposed on a fixed portion of the electronic device corresponding to the rollable device, and
- wherein a driving unit that allows a display region of the rollable device to be switched between the first state and the second state is disposed on another side region of the rollable device.

15. The electronic device of claim 14, wherein the processor controls the transceiver circuit such that one of the first to fourth output terminals of the switching unit is connected to the ground in case where the display region of the rollable device is switched from the first state into the second state.

16. The electronic device of claim 14, wherein the processor determines a resource region allocated through a Physical Downlink Control Channel (PDCCH), and controls the transceiver circuit such that the first output terminal of the switching unit is connected to the ground through the first impedance matching circuit in case where resources of a 5G Sub-6 band have been allocated.

17. The electronic device of claim 16, wherein the processor controls the transceiver circuit such that one of the second to fourth output terminals of the switching unit is connected to the ground through one of the second to fourth impedance matching circuits according to a frequency band of allocated resources in case where the resources of a 4G LTE band have been allocated.

18. The electronic device of claim 16, wherein the processor controls the transceiver circuit such that the first to fourth output terminals of the switching unit are open with respect to the ground in case where the display region of the rollable device is switched from the second state into the first state.

19. The electronic device of claim 5, wherein a Radio Frequency (RF) transmission line of the circuit board is connected to the conductive member through a feeding clip, and wherein a ground pad of the circuit board configured to be connected to the output terminals of the switching unit is connected to a cover frame through a contact clip.

20. The electronic device of claim 6, wherein the metal pattern is formed on the circuit board so that the antenna operates in the 5G Sub-6 band, and wherein the antenna operates in the Sub-6 band when one point of the metal pattern is electrically connected to the first output terminal of the switching unit and the first output terminal of the switching unit is connected to the ground through the first impedance matching circuit.

* * * * *